United States Patent
Iritani et al.

(10) Patent No.: US 8,790,812 B2
(45) Date of Patent: Jul. 29, 2014

(54) BATTERY PACK

(75) Inventors: Kunio Iritani, Anjo (JP); Masahiro Shimoya, Kariya (JP); Sumio Susa, Anjo (JP); Hiroshi Ueshima, Anjo (JP)

(73) Assignee: Denso Corporation, Kariya (JP)

( * ) Notice: Subject to any disclaimer, the term of this patent is extended or adjusted under 35 U.S.C. 154(b) by 499 days.

(21) Appl. No.: 13/101,282

(22) Filed: May 5, 2011

(65) Prior Publication Data

US 2011/0274958 A1   Nov. 10, 2011

(30) Foreign Application Priority Data

May 10, 2010   (JP) ................... 2010-108609
Jul. 5, 2010     (JP) ................... 2010-153197
Jul. 5, 2010     (JP) ................... 2010-153198

(51) Int. Cl.
    *H01M 2/18*       (2006.01)

(52) U.S. Cl.
    USPC ............ 429/148; 429/120; 429/163; 429/149

(58) Field of Classification Search
    USPC .................... 429/120, 163, 148, 149
    See application file for complete search history.

(56) References Cited

U.S. PATENT DOCUMENTS

| | | | |
|---|---|---|---|
| 5,800,942 | A | 9/1998 | Hamada et al. |
| 6,569,561 | B1 | 5/2003 | Kimura et al. |
| 2001/0026886 | A1 | 10/2001 | Inui et al. |
| 2002/0028375 | A1 | 3/2002 | Morishita et al. |
| 2005/0287426 | A1 | 12/2005 | Kim et al. |
| 2006/0049799 | A1* | 3/2006 | Hamada et al. ............... 320/112 |
| 2006/0063067 | A1 | 3/2006 | Kim |
| 2006/0202661 | A1 | 9/2006 | Kim et al. |
| 2006/0246348 | A1* | 11/2006 | Hamada et al. ............... 429/148 |
| 2009/0173559 | A1 | 7/2009 | Nakamura |

FOREIGN PATENT DOCUMENTS

| | | |
|---|---|---|
| JP | H09-120809 | 5/1997 |
| JP | 2000-90988 | 3/2000 |
| JP | 2000-096946 | 4/2000 |
| JP | 2000-200626 | 7/2000 |
| JP | 2001-35548 | 2/2001 |
| JP | 2001-176472 | 6/2001 |
| JP | 2005-108747 | 4/2005 |
| JP | 2006-012847 | 1/2006 |
| JP | 2006-093144 | 4/2006 |

(Continued)

OTHER PUBLICATIONS

Office Action mailed Feb. 25, 2014 in corresponding Japanese Application No. 2010-153197 and English-language translation.

(Continued)

*Primary Examiner* — Jane Rhee
(74) *Attorney, Agent, or Firm* — Nixon & Vanderhye P.C.

(57) ABSTRACT

A battery pack has multiple wall-shaped projecting portions, which are provided on side surfaces of battery cells perpendicular to a layer direction X, extend in a flow direction of cooling fluid and arranged in a direction perpendicular to the flow direction of the cooling fluid, to form fluid passages between neighboring battery cells. It further has multiple enlarged projecting portions, which are provided at intermediate portions of the wall-shaped projecting portions extending in the flow direction of the cooling fluid and brought into contact with the neighboring battery cells to receive action force therefrom. An outer dimension of the enlarged projecting portions in the direction, in which the multiple wall-shaped projecting portions are arranged, is made larger than a thickness dimension of the wall-shaped projecting portions.

20 Claims, 26 Drawing Sheets

(56) References Cited

FOREIGN PATENT DOCUMENTS

| | | |
|---|---|---|
| JP | 2006-253144 | 9/2006 |
| JP | 2007-200778 | 8/2007 |
| JP | 2008-4289 | 1/2008 |
| JP | 2009-170259 | 7/2009 |
| JP | 2009-187781 | 8/2009 |
| JP | 2009-259455 | 11/2009 |

OTHER PUBLICATIONS

Office Action mailed Feb. 25, 2014 in corresponding Japanese Application No. 2010-153198 and partial English-language translation.

* cited by examiner

COOLING FLUID

BATTERY PACK

CROSS REFERENCE TO RELATED APPLICATION

This application is based on Japanese Patent Applications No. 2010-108609 filed on May 10, 2010, No. 2010-153197 filed on Jul. 5, 2010, and No. 2010-153198 filed on Jul. 5, 2010, the disclosures of which are incorporated herein by reference.

FIELD OF THE INVENTION

The present invention relates to a battery pack, which is an aggregate of multiple layered battery cells.

BACKGROUND OF THE INVENTION

A battery pack is conventionally known in the art, for example, as disclosed in Japanese Patent Publication No. 2001-283937. According to the battery pack, multiple battery cells are electrically connected in series and multiple projecting portions (wall shaped projecting portions) are provided on opposing surfaces of the respective battery cells, each of which is formed in a flat shape and layered one another. The projecting portions, which are provided on the neighboring battery cells and opposing to each other, are brought into contact with each other, so that passages for cooling fluid are formed between the battery cells except for the projecting portions. According to another example, the multiple projecting portions (column shaped projecting portions) are dotted on the opposing surfaces of the flat shaped battery cells at predetermined intervals.

According to the above prior art, the multiple projecting portions provided on the opposing surfaces of the battery cells are so designed that the projecting portions resist binding force applied to the respective battery cells of the battery pack. As a result, since the battery cells can not sufficiently carry out a cooling function, excessive amount of the cooling fluid would become necessary. Therefore, it is a problem that an excessive driving power may become necessary for a fluid machine for generating such amount of the cooling fluid or noise may become too large.

SUMMARY OF THE INVENTION

The present invention is made in view of the above problems. It is an object of the present invention to provide a battery pack, according to which strength for resisting the binding force applied to battery cells is assured and cooling performance of the battery cells can be improved.

According to a feature of the present invention, for example, as defined in the appended claim 1, a battery pack has multiple battery cells built-up in a layer direction and held as one unit by a binding force in the layer direction, and fluid passages respectively formed between neighboring battery cells, so that cooling fluid flows through the fluid passages to cool-down the respective battery cells.

The battery pack further has; multiple wall-shaped projecting portions provided on a side surface of the battery cell perpendicular to the layer direction, each of which extends in a flow direction of the cooling fluid, the multiple wall-shaped projecting portions being arranged in a direction perpendicular to the flow direction so as to form the fluid passages respectively between the neighboring battery cells; and multiple enlarged projecting portions provided at intermediate portions of each wall-shaped projecting portion extending in the flow direction, the enlarged projecting portions being in contact with the neighboring battery cell to receive action force from the neighboring battery cell. In the above battery pack, an outer dimension of the enlarged projecting portion in the direction in which multiple wall-shaped projecting portions are arranged is made larger than a thickness dimension of the wall-shaped projecting portion.

According to the present invention, since a necessary number of enlarged projecting portions, each of which has a necessary size, are provided on the side surface of the battery cell, it is possible to carry out a function for stably applying a necessary binding force to the battery cells. In addition, since heat transfer area of the side surface of the battery cell for carrying out a cooling function can be increased by the multiple wall-shaped projecting portions, cooling performance can be increased. Since the wall-shaped projecting portions can be made as thinner as possible, within a range of sufficiently carrying out the cooling performance, it is possible to enlarge the heat transfer area without decreasing cross sectional area of the fluid passages for the cooling fluid. As a result, it is possible to carry out the necessary cooling performance with smaller amount of the cooling fluid, with smaller amount of driving power for a fluid machine, and with lower noise. It is, therefore, possible not only to improve the cooling performance of the battery cells but also to assure the strength resisting the binding force applied to the battery cells.

According to another feature of the present invention, for example, as defined in the appended claim 8, a battery pack has multiple battery cells built-up in a layer direction and held as one unit by a binding force in the layer direction, and fluid passages respectively formed between neighboring battery cells, so that cooling fluid flows through the fluid passages to cool-down the respective battery cells.

The battery pack further has; multiple wall-shaped projecting portions provided on a side surface of the battery cell perpendicular to the layer direction, each of which extends in a flow direction of the cooling fluid, the multiple wall-shaped projecting portions being arranged in a direction perpendicular to the flow direction so as to form the fluid passages respectively between the neighboring battery cells; and multiple enlarged projecting portions provided on the side surface of the battery cell perpendicular to the layer direction, each of which extends in the flow direction of the cooling fluid, the enlarged projecting portions being arranged at predetermined intervals in the direction perpendicular to the flow direction, and the enlarged projecting portions being in contact with the neighboring battery cell to receive action force from the neighboring battery cell.

In such a battery pack, a width dimension of each enlarged projecting portion in the direction in which the multiple wall-shaped projecting portions are arranged is made larger than a thickness dimension of the wall-shaped projecting portion, and multiple wall-shaped projecting portions are located in each space between the enlarged projecting portions, which are arranged at the predetermined intervals.

According to the present invention of the above feature, a necessary number enlarged projecting portions, each of which has a necessary thickness dimension, are provided on the side surface of the battery cell and arranged at necessary intervals. Since the enlarged projecting portions are dispersed on the side surface, it is possible to carry out a function for stably applying the necessary binding force to the battery cells. In addition, the heat transfer area, which carries out the cooling performance on the side surface of the battery cell, can be increased by the multiple wall-shaped projecting portions provided between the enlarged projecting portions, the cooling performance can be increased. Since the wall-shaped projecting portions can be made as thinner as possible, within a range of sufficiently carrying out the cooling performance, it is possible to enlarge the heat transfer area without decreasing cross sectional area of the fluid passages for the cooling fluid. As a result, it is possible to carry out the necessary cooling performance with smaller amount of the cooling fluid, with smaller amount of driving power for a fluid machine, and with lower noise. It is, therefore, possible not only to improve the cooling performance of the battery cells but also to assure the strength resisting the binding force applied to the battery cells.

According to a further feature of the present invention, for example, as defined in the appended claim 18, a battery pack has multiple battery cells built-up in a layer direction and held as one unit, and fluid passages respectively formed between neighboring battery cells, so that cooling fluid flows through the fluid passages to cool-down the respective battery cells.

The battery pack further has multiple wall-shaped projecting portions provided on side surfaces of the battery cells opposing to each other in the layer direction and arranged at predetermined intervals. In such a battery pack, the multiple wall-shaped projecting portions are brought into contact with an outer packaging member of the opposing battery cell or the wall-shaped projecting portions of the neighboring battery cells, to form the fluid passages between the side surfaces of the opposing battery cells. The multiple wall-shaped projecting portions are provided on the side surfaces of the battery cells opposing in the layer direction and arranged at respective intervals in a flow direction of the cooling fluid and in a direction perpendicular to the flow direction, and the respective wall-shaped projecting portions, which are located in each of multiple lines arranged in the direction perpendicular to the flow direction, are displaced in the flow direction of the cooling fluid between the lines neighboring to each other in such perpendicular direction.

According to the present invention of the above feature, the multiple wall-shaped projecting portions are arranged at respective intervals in the flow direction of the cooling fluid and in the direction perpendicular to the flow direction. In addition, multiple lines of the wall-shaped projecting portions are arranged in the direction perpendicular to the flow direction. The lines neighboring in the perpendicular direction are displaced in the flow direction. According to the above structure, such a passage area, in which no wall-shaped projecting portions is existing, is formed at a downstream side of each wall-shaped projecting portion. It is, thereby, possible to form the meandering flow in the fluid passages of the battery cells. It is possible to suppress enlargement of the boundary layer of the cooling fluid flow at wall portions of the battery cells as well as at wall portions of the wall-shaped projecting portions, and to improve heat transfer performance at the downstream sides of the respective wall-shaped projecting portions. As a result, the cooling performance of the battery cells can be increased. In addition, according to the layout of the above wall-shaped projecting portions, it is possible to bring out the necessary cooling performance with smaller amount of the cooling fluid, with smaller amount of driving power for the fluid machine, and with lower noise.

According to a still further feature of the present invention, for example, as defined in the appended claim 25, a battery pack has multiple battery cells built-up in a layer direction and held as one unit, and fluid passages respectively formed between neighboring battery cells, so that cooling fluid flows through the fluid passages to cool-down the respective battery cells. The battery pack further has multiple wall-shaped projecting portions provided on side surfaces of the battery cells opposing to each other in the layer direction and arranged at predetermined intervals, each of the wall-shaped projecting portions extending in a flow direction of the cooling fluid. In such a battery pack, the multiple wall-shaped projecting portions are brought into contact with an opposing outer packaging member of the battery cell or the wall-shaped projecting portions of the neighboring battery cells, to form the fluid passages between the opposing side surfaces of the battery cells, and each of the wall-shaped projecting portions has a curved portion, which is bent in a way of describing an arc around a virtual axis parallel to the flow direction of the cooling fluid.

According to the present invention of the above feature, since the wall-shaped projecting portions are brought into contact with the neighboring battery cell to form the fluid passages between the opposing side surfaces of the battery cells, it is possible to stably apply the binding force to the respective battery cells. In addition, since the wall-shaped projecting portion has the curved portion, which is bent in the way of describing the arc around the virtual axis parallel to the flow direction of the cooling fluid, the heat transfer area for carrying out the cooling performance by the multiple wall-shaped projecting portions provided on the side surfaces of the battery cells can be increased, to thereby increase the cooling performance of the battery cells. Accordingly, it is possible to provide the battery pack, which can realize not only the function for binding the respective battery cells but also the function for improving the cooling performance by suppressing the flow resistance. Furthermore, since the wall-shaped projecting portions can be made as thinner as possible within a range of sufficiently carrying out the cooling performance, it is possible to enlarge the heat transfer area without decreasing the cross sectional area of the fluid passages. As a result, it is possible to bring out the necessary cooling performance with smaller amount of the cooling fluid, with smaller amount of driving power for the fluid machine and with lower noise.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

A battery pack of the present invention is applied to a hybrid vehicle having a driving power source combining an internal combustion engine with an electric motor operated by electric power charged in a battery or applied to an electric vehicle having a driving power source of an electric motor. The battery forming the battery pack is composed of, for example, a nickel metal-hydride secondary battery, a lithium-ion secondary battery, an organic radial battery and so on. The battery is accommodated in a battery casing, which is located in a space beneath a vehicle seat, a space between rear seats and a trunk room, a space between a driver seat and a passenger seat, and so on.

Figure 1:
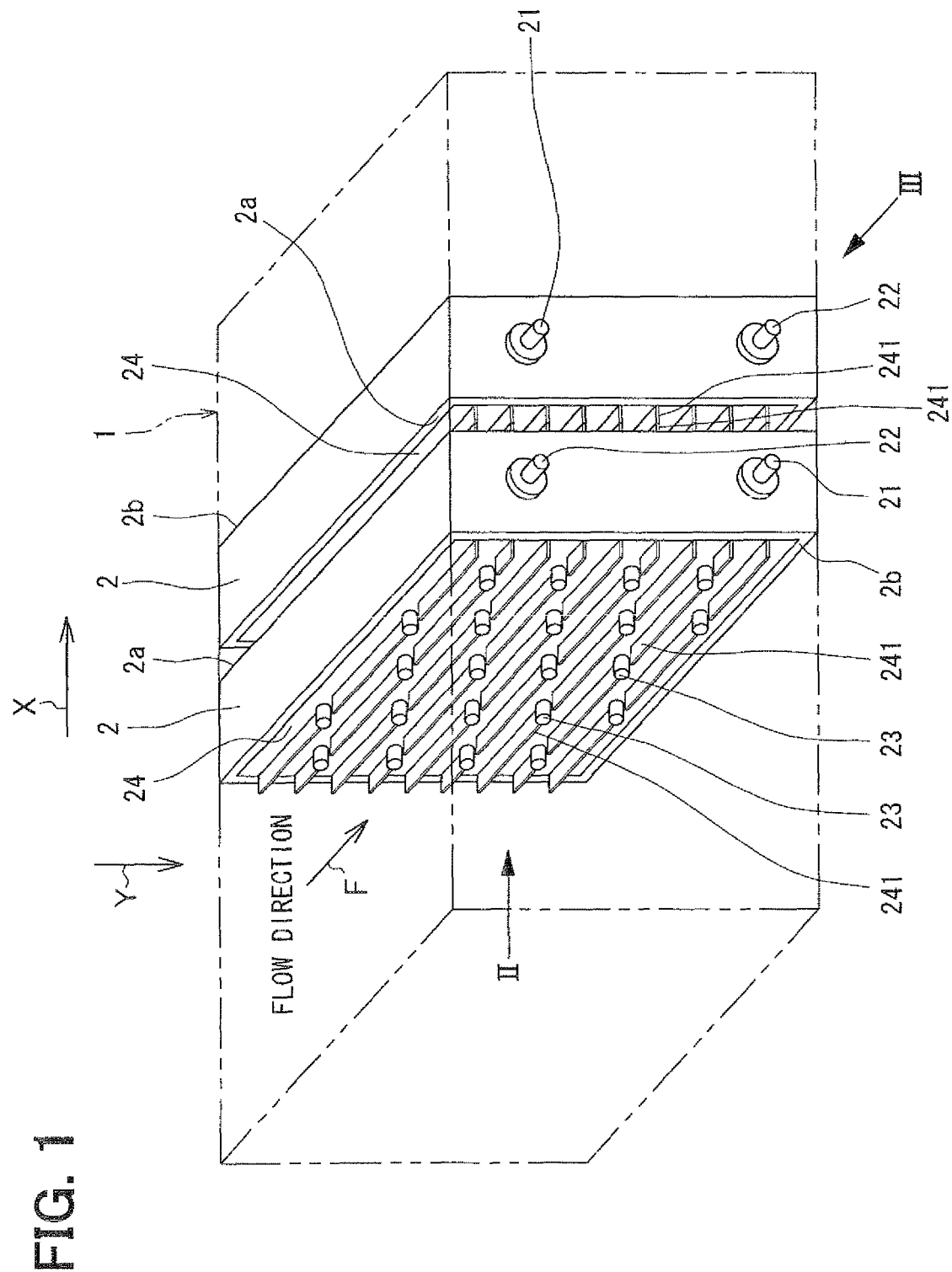
FIG. 1 is a schematic perspective view showing a layered structure of battery cells, which form a battery pack, according to a first embodiment of the present invention.
Figure 2:
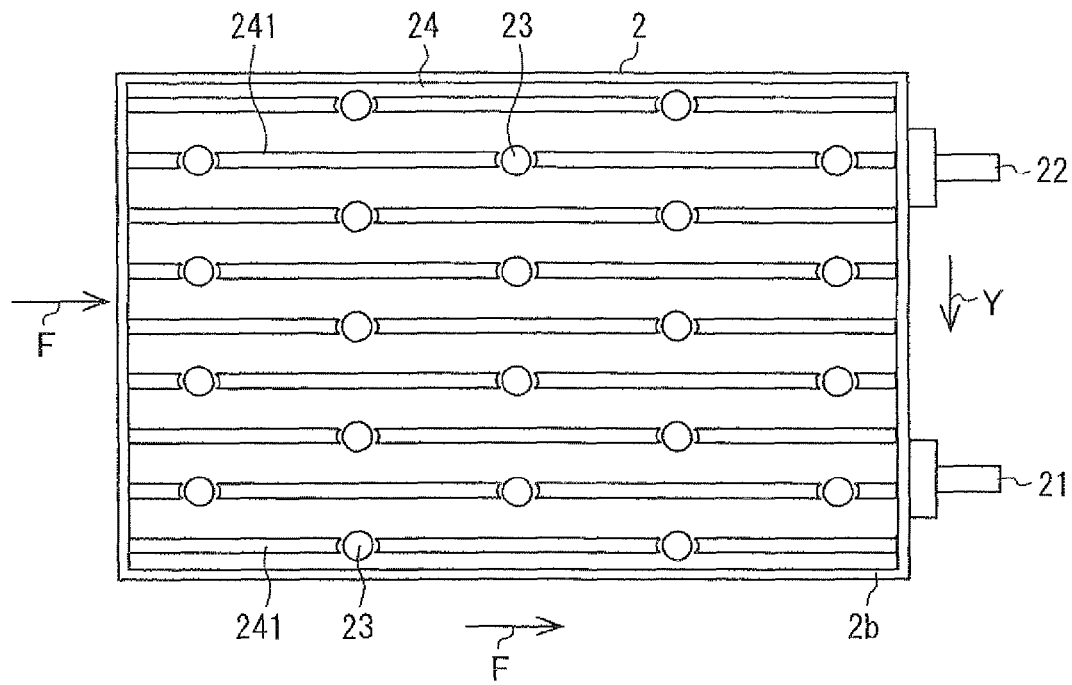
FIG. 2 is a schematic front view showing the battery pack when viewed in a direction of an arrow II in FIG. 1.
Figure 3:
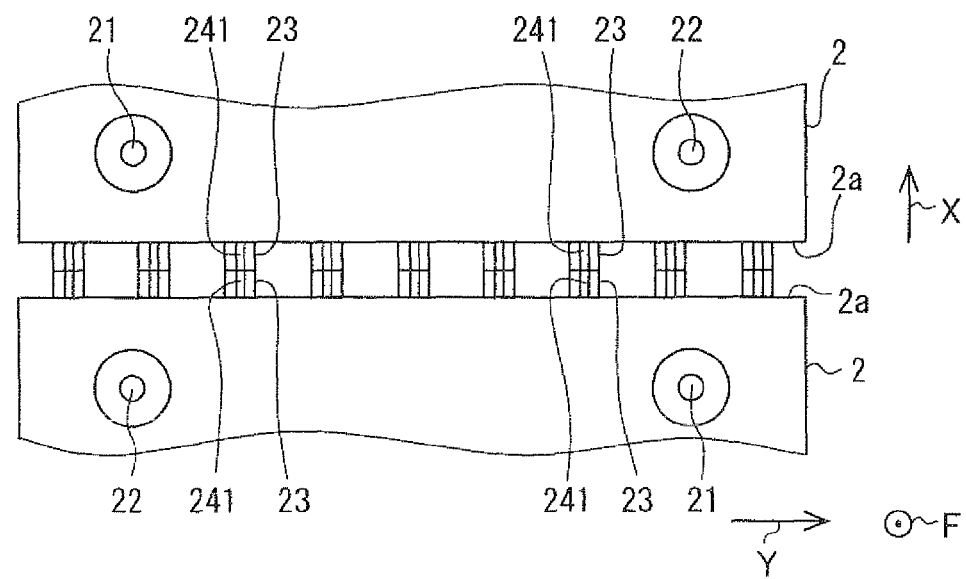
FIG. 3 is a schematic side view showing a part of the battery pack when viewed in a direction of an arrow III in FIG. 1.
Figure 4:
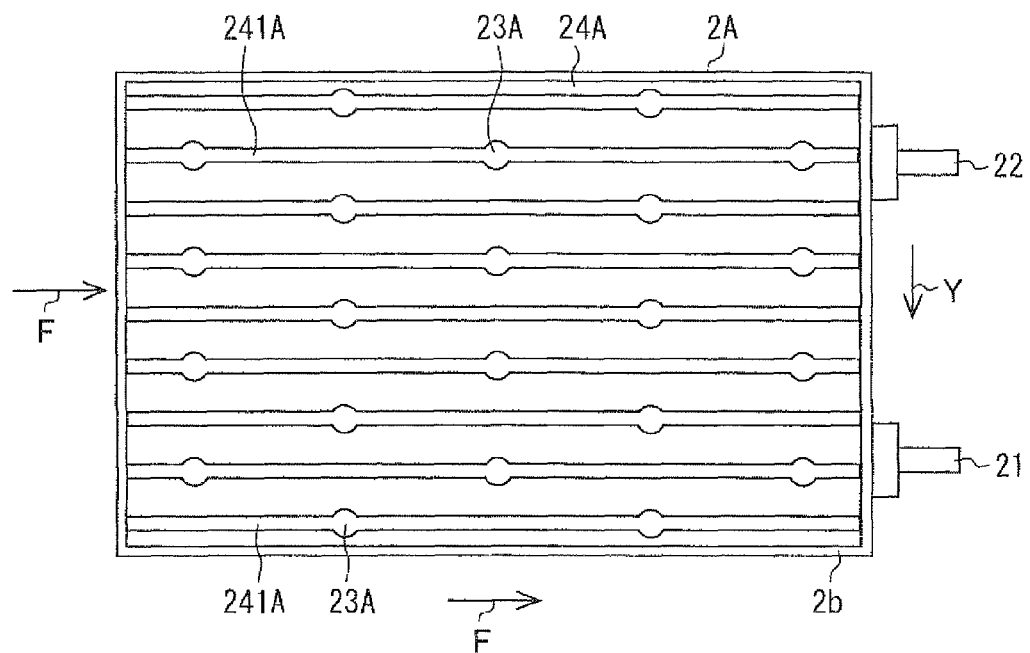
FIG. 4 is a schematic front view showing a battery pack according to a modification of the first embodiment.

A first embodiment of the present invention will be explained with reference to FIGS. 1 to 4. FIG. 1 is a schematic perspective view showing a layered structure of battery cells 2, which form a battery pack 1 of the first embodiment. FIG. 2 is a schematic front view showing the battery pack when viewed in a direction of an arrow II in FIG. 1. FIG. 3 is a schematic side view showing a part of the battery pack 1 when viewed in a direction of an arrow III in FIG. 1. FIG. 4 is a schematic front view showing battery cells 2A according to a modification of the battery cells 2. In each of drawings, a direction of multiple layered battery cells 2 is referred to as a layer direction X. A direction, in which each battery cell 2 of a rectangular shape is horizontally extending, is referred to as a flow direction F of cooling fluid. A direction, which is perpendicular to both of the layer direction X and the flow direction F of the cooling fluid, is referred to as an alignment direction Y (or simply referred to as a direction Y) in which multiple wall-shaped projecting portions are arranged.

The battery pack 1, which is an aggregate of the multiple battery cells 2 indicated by a two-dot-chain line in FIG. 1, is controlled by electronic parts and components (not shown) used for charging and discharging or temperature control of the multiple battery cells 2. The battery cells 2 are cooled down by air from an air blower unit (not shown). In the battery pack 1, the multiple battery cells 2 are electrically connected in series to each other and integrally built-up (layered) such that side surfaces of the respective battery cells 2 are opposed to each other. The battery pack is accommodated in the battery casing (not shown). The above electronic parts and components are such electronic parts and components as well as various kinds of electronic control units, which control relays, an electric motor of the air blower unit, inverters and so on.

The battery casing is a rectangular-shaped housing made of resin or steel, at least one side wall of which is detachably formed so that maintenance work may be easily carried out. An attachment portion, with which the battery casing is fixed to a vehicle chassis by bolts, as well as a component accommodating portion (not shown) is provided in the battery casing.

The component accommodating portion accommodates therein; a battery monitoring unit (not shown), to which detected results from various kinds of sensors for monitoring battery condition (for example, voltage, temperature and so on) are inputted; a control device for controlling relays communicated with the battery monitoring unit and operation of the electric motor of the air blower unit; a wire harness assembly for connecting various components with each other; and so on. The battery monitoring unit is a battery ECU (an electronic control unit for the battery) for monitoring the conditions of the battery cells 2 and connected to the respective battery cells 2 via multiple wirings.

As shown in FIG. 1, the battery pack 1 is the aggregate of the battery cells 2, wherein side surfaces 2a and 2b of the battery cells 2 perpendicular to the layer direction X (the side surfaces in parallel to the directions Y and F) are pressed to each other by a binding device (not shown), so that the multiple layered battery cells 2 of the rectangular shapes are integrally held. In the multiple battery cells 2 forming the battery pack 1, a pair of binding plates (not shown) arranged at both ends of the battery pack 1 in the layer direction X are connected to each other by rods (not shown), so that the respective battery cells 2 receive a compression force (binding force) by external force directing toward inside from the both ends and thereby the battery cells 2 are bound. For example, the compression force is applied to the multiple battery cells 2 by four rods, so that the battery cells 2 are integrally fixed to each other. The rods are made of material having high strength, such as metal or hard resin, so that the multiple battery cells 2 are integrated as one unit by a stable force.

The battery cells 2 forming the battery pack 1 will be explained. Each of the battery cells 2 is formed in a shape of a flat cuboid, outer surfaces of which are covered by an outer packaging member. Two terminal portions including a positive electrode 21 and a negative electrode 22 are provided at a distance in the direction Y and the terminal portions protrude from the outer packaging member in the flow direction F.

All of the battery cells 2 accommodated in the battery casing are connected in series by respective bus bars (not shown), which respectively connect the terminals of the neighboring battery cells 2, so that electric current flows from the negative electrode 22 of the battery cell 2 located at one end of the battery pack 1 in the layer direction X to the positive electrode 21 of the battery cell 2 located at the other end of the battery pack 1 in the layer direction X via the bus bars, wherein the electric current goes and returns in the battery pack 1 in the direction Y. As above, the respective neighboring battery cells 2 in the layer direction X are electrically connected to each other. In other words, all of the battery cells 2 forming the battery pack 1 are electrically connected in series by the bus bars, so that the electric current flows in a zigzag pattern or a meandering pattern from the terminal portion of the battery cell 2 located at one end of the layer direction X to the terminal portion of the battery cell 2 located at the other end of the layer direction X.

Multiple wall-shaped projecting portions 241 extending in the flow direction F are formed on the side surfaces 2a and 2b of the battery cells 2 perpendicular to the layer direction X. The multiple wall-shaped projecting portions 241 are arranged at predetermined intervals in the direction Y perpendicular to the flow direction F. The multiple wall-shaped projecting portions 241 form multiple fluid passages between the neighboring battery cells 2, through which the cooling fluid flows.

Multiple enlarged projecting portions 23 (also referred to as column-shaped projecting portions) are also formed on the side surfaces 2a and 2b of the battery cells 2 at intermediate points of the wall-shaped projecting portions 241 extending in the flow direction F. The enlarged projecting portions 23 are so arranged that the enlarged projecting portions 23 are brought into contact with the neighboring battery cell 2 when the binding force of the layer direction X is applied to the battery cells 2 by the binding device, so that the enlarged projecting portions 23 receive action force from the neighboring battery cell 2. The enlarged projecting portions 23 are so formed that an outside dimension thereof in the direction Y (in which the multiple wall-shaped projecting portions are arranged) is larger than a thickness dimension of the wall-shaped projecting portion 241. According to the present embodiment, the enlarged projecting portion 23 forms a boss portion of a cylindrical shape. However, the shape of the enlarged projecting portion should not be limited to such a shape.

As shown in FIGS. 1 and 2, the multiple enlarged projecting portions 23 (two or three in the drawings) are provided in the intermediate points of each wall-shaped projecting portion 241 at predetermined intervals. In other words, the wall-shaped projecting portions 241 are provided at both sides of one enlarged projecting portion 23 in the flow direction F. Since the enlarged projecting portions 23 are provided in a zigzag pattern on the side surfaces 2a and 2b of the battery cells 2 perpendicular to the layer direction X, each of the wall-shaped projecting portions 241 is located next to the respective enlarged projecting portion 23 in the direction Y. According to such a structure, the enlarged projecting portions 23 and the wall-shaped projecting portions 241 are alternately arranged in the direction Y, in which the multiple wall-shaped projecting portions 241 are located.

A projecting height of the enlarged projecting portion 23 in the layer direction X is made to be equal to or slightly larger than that of the wall-shaped projecting portion 241. As a result, as shown in FIG. 3, when the binding force of the layer direction X is applied to the battery cells 2 by the binding device, at least the enlarged projecting portions 23 of the neighboring battery cells 2 are brought into contact with each other and act to each other. In this condition, the wall-shaped projecting portions 241 of the neighboring battery cells 2 may be in contact with or separated from each other.

Accordingly, the respective enlarged projecting portions 23 have binding strength, which resist against the binding force applied to the respective battery cells 2. The respective wall-shaped projecting portions 241 correspond to such portions, which contact with the cooling fluid and expand heat transfer area of the battery cells 2, and function as heat transfer path for radiating heat from the battery cells 2 to the cooling fluid.

According to the present embodiment, the enlarged projecting portions 23 are projections formed at the outer packaging member of the battery cell 2, while the wall-shaped projecting portions 241 are formed on a plate member 24 which is a separate part from the battery cell 2. The multiple wall-shaped projecting portions 241 and multiple openings, which the respective enlarged projecting portions 23 pass through, are formed in respective metal-made plate members 24 by press work. Namely, the plate members 24 are the metal-made plates with fins having apertures, through which all of the enlarged projecting portions 23 are inserted.

The separate plate members 24 are integrally fixed to the side surfaces 2a and 2b of the battery cells 2 perpendicular to the layer direction X, for example, by integral molding process. The outer packaging member, to which the enlarged projecting portions 23 are integrally formed, is made of any kind of resin having insulating performance, for example, polypropylene, polyethylene, polystyrene, chloroethene, fluorocarbon resin, PBT, polyamide, polyamide-imide resin (PAI resin), ABS resin (copolymer resin of acrylonitrile-butadiene-styrene), polyacetal, polycarbonate, polybutylene terephthalate, polyethylene terephthalate, polyphenylene sulfide, carbonic acid, epoxy resin, acrylic, and so on.

Since the separate plate members 24 are used, the wall-shaped projecting portions 241 and/or the enlarged projecting portions 23 can be made of different material from that for the outer packaging members of the battery cells 2. For example, when the wall-shaped projecting portions 241 are formed on the separate plate having high heat conduction, cooling performance of the battery cells can be increased.

In a modification, the wall-shaped projecting portions 241 may be formed as fins provided on the outer packaging members of the battery cells 2, while the enlarged projecting portions 23 may be formed on the separate members from the battery cells 2.

According to another modification, for example, as shown in FIG. 4, enlarged projecting portions 23A and wall-shaped projecting portions 241A may be integrally formed by the same material (a common member 24A). According to such a structure, it is not necessary to form the enlarged projecting portions 23A on the outer packaging members of battery cells 2A.

In addition, the common member 24A may be a separate plate member from the battery cells 2. According to such a modification, the common member 24A (on which the enlarged projecting portions 23A and the wall-shaped projecting portions 241A are formed) may be integrally formed by insert molding at the side surfaces of the battery cells, which are perpendicular to the layer direction X.

As shown in FIG. 4, the common member 24A may be a spacer 24A, which is interposed between the neighboring battery cells 2. According to such a structure, when the binding force is applied to the aggregate in which the battery cells 2 and the spacers are alternately arranged, it is possible not only to improve the cooling performance of the battery cells 2 but also to assure the strength resisting the binding force applied to the battery cells 2.

Furthermore, the enlarged projecting portions 23 as well as the wall-shaped projecting portions may be integrally formed with the outer packaging members of the battery cells 2. According to such a modification, it is possible to reduce a number of parts and components as well as a manufacturing cost.

In addition, in a case that the enlarged projecting portions 23 or the wall-shaped projecting portions 241 as well as the outer packaging members of the battery cells 2 are made of conducting material, at least one of contacting portions may be preferably coated with insulating material. The contacting portions include such portions of the enlarged projecting portions 23 or the wall-shaped projecting portions 241, which are in contact with the neighboring battery cells, on one hand. The contacting portions include, on the other hand, such portions of the neighboring battery cells, which are in contact with the enlarged projecting portions 23 or the wall-shaped projecting portions 241. The coating of the insulating material at such contacting portions may be formed by vapor deposition, coating, integral molding, and so on. According to such a structure, since the contacting portions of the neighboring battery cells are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells 2.

Advantages of the battery pack 1 of the present embodiment will be explained. The battery pack 1 has multiple wall-shaped projecting portions 241 and multiple enlarged projecting portions 23. The wall-shaped projecting portions 241 are provided at the side surfaces of the battery cells 2, which are perpendicular to the layer direction X, extend in the flow direction F of the cooling fluid and multiple wall-shaped projecting portions 241 are arranged in the direction Y perpendicular to the flow direction F of the cooling fluid, so as to form the fluid passages between the neighboring battery cells 2. The multiple enlarged projecting portions 23 are provided in the intermediate points of the wall-shaped projecting portion 241 extending in the flow direction F and in contact with the neighboring battery cell 2, so that action force from the neighboring battery cell 2 is applied to the enlarged projecting portions 23. The enlarged projecting portions 23 are so formed that the outside dimension thereof in the direction Y (in which the multiple wall-shaped projecting portions are arranged) is larger than the thickness dimension of the wall-shaped projecting portion 241.

According to the above structure, the heat transfer area, at which the cooling function is carried out at the side surfaces of the battery cells 2, is increased by the wall-shaped projecting portions which extend in the flow direction F of the cooling fluid and arranged in the direction Y perpendicular to the flow direction F. Since the wall-shaped projecting portions 241 are made thinner as much as possible, within a range of sufficiently carrying out the cooling function, the heat transfer area can be increased without decreasing cross sectional areas of the fluid passages for the cooling fluid. As a result, it is possible to bring out the necessary cooling performance with smaller amount of the cooling fluid, with smaller amount of driving power for a fluid machine, and with lower noise.

In addition, since the multiple enlarged projecting portions 23, which are in contact with the neighboring battery cells 2 and receive the action forces therefrom, are provided in the intermediate points of the wall-shaped projecting portion 241 extending in the flow direction F, the binding forces to be received at the side surfaces of the battery cells 2 are not excessively unevenly distributed but decentralized. According to this feature, it is possible to reduce concentration of the biding forces on specified points. It is, therefore, possible to assure the strength of the respective battery cells 2 against the binding forces.

In addition, since the outside dimension of the enlarged projecting portions 23 in the direction Y (in which the multiple wall-shaped projecting portions are arranged) is larger than the thickness dimension of the wall-shaped projecting portion 241, the outside dimension of the enlarged projecting portions 23 can be increased to such a value at which the necessary strength against the binding force can be assured. As a result, it is possible to provide the battery pack according to which the strength against the binding force is increased so that influence by vibrations and so on may not be applied to the battery pack. It is, therefore, possible not only to increase the cooling performance of the battery cells 2 but also to assure the strength against the binding force applied to the battery cells 2.

In addition, the wall-shaped projecting portions 241 also function as heat radiating fins. When the thickness thereof is made as smaller as possible, within the range for sufficiently carrying out the cooling performance, heat radiating amount from the wall-shaped projecting portions 241 can be increased without decreasing the cross sectional areas of the fluid passages of the cooling fluid. As above, the heat radiating performance can be increased.

In addition, the multiple enlarged projecting portions 23 are provided in the intermediate points of the wall-shaped projecting portion 241 in its extending direction, and the outside dimension of the enlarged projecting portions 23 in the direction Y (in which the multiple wall-shaped projecting portions are arranged) is made larger than the thickness dimension of the wall-shaped projecting portion 241. The fluid passages are formed between the neighboring battery cells 2. As a result, the cross sectional area of such a portion of the fluid passage, at which the enlarged projecting portion 23 and the wall-shaped projecting portion 241 are opposed to each other, becomes smaller than that of such another portion of the fluid passage, at which the two wall-shaped projecting portions 241 are opposed to each other. Thereby, the fluid flowing in the fluid passage gets near to the wall-shaped projecting portion 241, when the fluid flows through the portion at which the enlarged projecting portion 23 and the wall-shaped projecting portion 241 are opposed to each other. The fluid flowing in the fluid passage is likely to generate meandering fluid flow. As a result, boundary layer of heating surface of the fluid flow can be made thinner by such meandering fluid flow, and thereby the heat transfer performance can be increased. In other words, the cooling performance can be increased.

In addition, the enlarged projecting portions 23 and the wall-shaped projecting portions 241 are alternately arranged in the direction Y, in which the multiple wall-shaped projecting portions are arranged. And the fluid passages are formed between the neighboring battery cells 2. As a result, the cross sectional area of such a portion of the fluid passage, at which the enlarged projecting portions 23 are formed in the flow direction F, becomes smaller than that of other portions of the fluid passage. The fluid passage is thereby so formed that the portions having the smaller cross sectional area and the portions having the larger cross sectional area are alternately arranged in the flow direction F of the cooling fluid. Therefore, the fluid flowing through the fluid passage turns to the side of the wall-shaped projecting portion 241 at the portion at which the enlarged projecting portion 23 is formed, then turns back, and turns again to the side of the wall-shaped projecting portion 241 at the portion at which the enlarged projecting portion 23 is formed. Thus, the meandering fluid flow is formed, so that the boundary layer of the heating surface of the fluid flow can be made thinner. The heat transfer performance can be increased and thereby the cooling performance can be increased.

Second Embodiment

Figure 5:
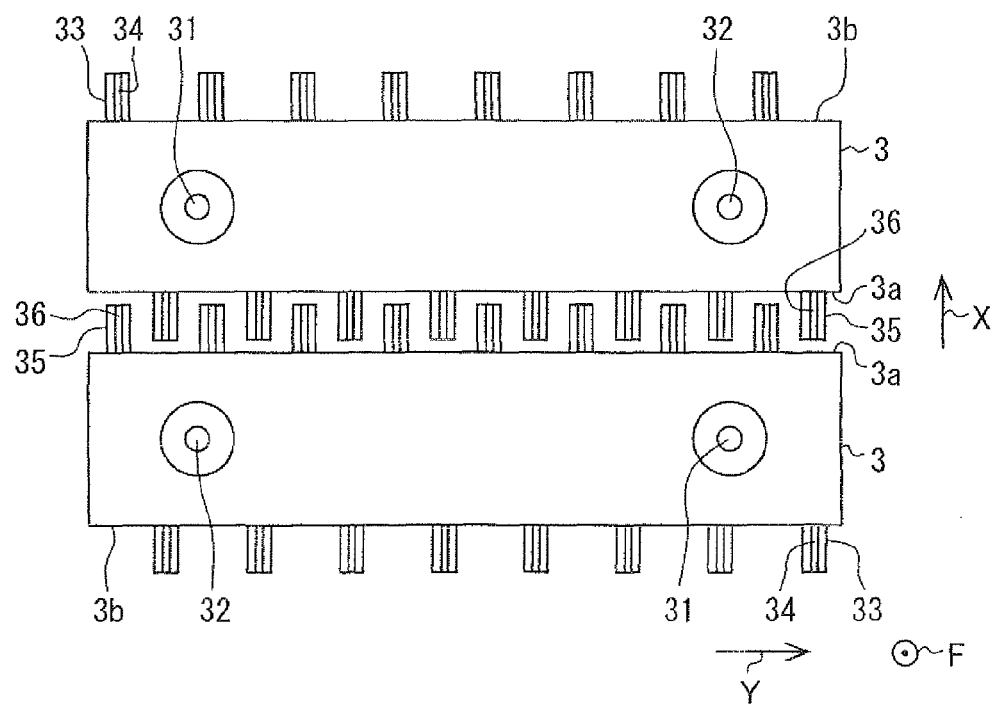
FIG. 5 is a schematic side view showing a part of a battery pack for explaining a structure of battery cells according to a second embodiment.

A battery pack of a second embodiment, according to which battery cells 3 (which is a modification of the first embodiment) is used, will be explained with reference to FIG. 5. FIG. 5 is a schematic side view showing a part of the battery pack for explaining a layered structure of the battery cells forming the battery pack of the second embodiment.

As shown in FIG. 5, the layered structure of the battery cells 3 differs from that of the battery cells 2 shown in FIG. 3 in that, when the binding force in the layer direction X is applied by the binding device, neither enlarged projecting portions 33 nor enlarged projecting portions 35 are brought into contact with each other, but the respective enlarged projecting portions 33 and 35 are brought into contact with side surfaces 3b and 3a, respectively, so as to bring out the strength against the binding force. The other structures are the same to the first embodiment and the same advantages can be obtained.

Third Embodiment

Figure 6:
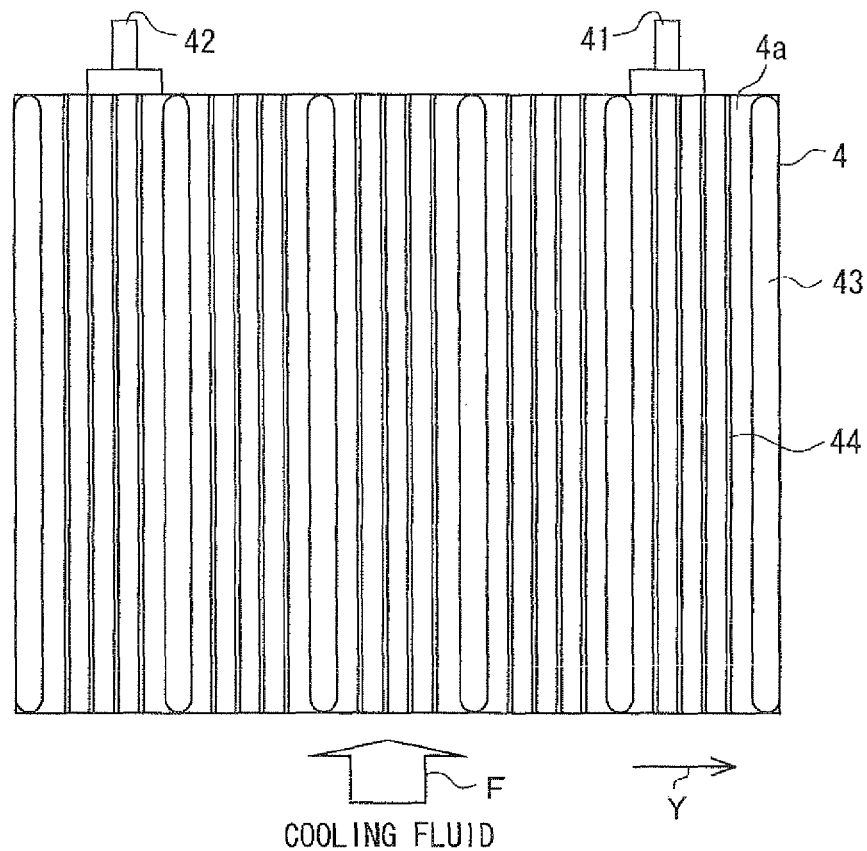
FIG. 6 is a schematic front view showing a battery cell of a battery pack according to a third embodiment.
Figure 7:
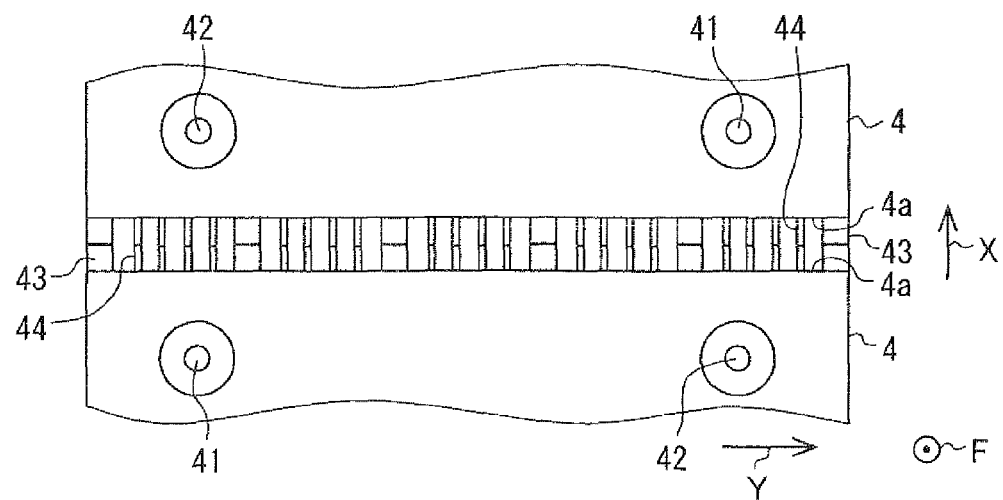
FIG. 7 is a schematic side view for explaining a layered structure of neighboring battery cells of the battery pack according to the third embodiment.

A layered structure of battery cells according to a third embodiment, which is a modification of the first embodiment, will be explained with reference to FIGS. 6 and 7. FIG. 6 is a schematic front view for explaining the battery cells 4 forming a battery pack of the third embodiment. FIG. 7 is a schematic side view showing a part of the battery pack for explaining the layered structure of neighboring battery cells 4 according to the third embodiment.

The layered structure of the neighboring battery cells 4 of the third embodiment differs from that of the first embodiment in a shape of enlarged projecting portions 43 as well as physical relationship between the enlarged projecting portions 43 and wall-shaped projecting portions 44. The other structures are the same to the first embodiment and the same advantages can be obtained. Hereinafter, only such portions different from the first embodiment will be explained.

Each of the enlarged projecting portions 43 is provided on a side surface 4a of the battery cell (which is perpendicular to the layer direction X) in a rail shape, which extends in the flow direction F of the cooling fluid along the entire side surface 4a of the battery cell in the flow direction. Multiple enlarged projecting portions 43 are provided at intervals in the direction Y perpendicular to the flow direction F of the cooling fluid. When the binding force is applied to the respective battery cells 4 by the binding device in the layer direction X, the multiple enlarged projecting portions 43 are brought into contact with the neighboring battery cell 4 and receive the action force therefrom. In addition, a width dimension of each enlarged projecting portion 43 in the direction Y (in which the multiple wall-shaped projecting portions are arranged) is made larger than a thickness dimension of the wall-shaped projecting portion 44. In other words, since the thickness of the enlarged projecting portion 43 is larger than that of the wall-shaped projecting portion 44, the enlarged projecting portion 43 has a larger strength so that the enlarged projecting portion 43 is hardly deformed by the force applied in the layer direction X.

According to the present embodiment, as shown in FIGS. 6 and 7, the multiple (six in the present embodiment) enlarged projecting portions 43 are arranged in the direction Y (in which the multiple wall-shaped projecting portions are arranged) at the predetermined intervals. The multiple (four in the present embodiment) wall-shaped projecting portions 44 are arranged between the enlarged projecting portions 43, which are arranged at the predetermined intervals. Therefore, a number of the enlarged projecting portions 43 is smaller than that of the wall-shaped projecting portions 44. In other words, the number of the enlarged projecting portions 43 per unit area of the side surface 4a of the battery cell is smaller than that of the wall-shaped projecting portions 44 per the unit area.

Since a thickness of each enlarged projecting portion 43 is made larger in the direction Y, the enlarged projecting portions 43 have strength enough to resist force in a compressing direction by the binding force, when the respective enlarged projecting portions 43 of the neighboring battery cells 4 are brought into contact with each other. The multiple wall-shaped projecting portions 44 arranged between the enlarged projecting portions 43 have function to increase the heat transfer area in the fluid passages for the cooling fluid between the neighboring battery cells 4, to thereby increase the heat radiating performance.

The enlarged projecting portions 43 and the wall-shaped projecting portions 44 are evenly arranged in the direction Y perpendicular to the flow direction F on the entire area of the side surface 4a of the battery cell. Respective top surfaces of the wall-shaped projecting portions 44 of the neighboring battery cells 4 are opposing to each other. The top surfaces of the wall-shaped projecting portions 44 of the neighboring battery cells 4 may be in contact with each other or separated from each other.

According to the third embodiment, the enlarged projecting portions 43 are projections formed on the outer packaging members of the battery cells 4, while the wall-shaped projecting portions 44 are formed on a plate member, which is a separate member from the battery cells 4. The multiple wall-shaped projecting portions 44 as well as rectangular openings, through which the enlarged projecting portions 43 pass, are formed in the plate member of metal by press work or the like. In other words, the plate member is such a metal plate having fins and openings, through which each of the enlarged projecting portions 43 can be inserted.

The plate member is integrally fixed to the side surface 4a of the battery cell perpendicular to the layer direction X, for example, by integral molding process. In the same manner to the first embodiment, the outer packaging member, to which the enlarged projecting portions 23 are integrally formed, is made of any kind of resin having insulating performance.

According to a modification of the present embodiment, the wall-shaped projecting portions 44 may be provided on the outer packaging member of the battery cell 4 in a form of fins, while the enlarged projecting portions 43 may be formed on the plate member separate from the battery cell 4.

According to another modification of the present embodiment, both of the enlarged projecting portions 43 and the wall-shaped projecting portions 44 may be formed on a common member. The common member may be a plate member separate from the battery cell 4. In such a case, the common member (on which the enlarged projecting portions and the wall-shaped projecting portions are formed) may be integrally formed by insert molding at the side surface of the battery cell, which is perpendicular to the layer direction X.

Furthermore, the common member may be a spacer, which is interposed between the neighboring battery cells 4. According to such a structure, when the binding force is applied to the aggregate in which the battery cells 4 and the spacers are alternately arranged, it is possible not only to improve the cooling performance of the battery cells 4 but also to assure the strength resisting the binding force applied to the battery cells 4.

Furthermore, the enlarged projecting portions 43 as well as the wall-shaped projecting portions 44 may be integrally formed with the outer packaging members of the battery cells 4. According to such a modification, it is possible to reduce a number of parts and components as well as a manufacturing cost.

In addition, in a case that the enlarged projecting portions 43 or the wall-shaped projecting portions 44 as well as the outer packaging members of the battery cells 4 are made of conducting material, at least one of contacting portions may be preferably coated with insulating material. The contacting portions include such portions of the enlarged projecting portions 43 or the wall-shaped projecting portions 44, which are in contact with the neighboring battery cells, on one hand. The contacting portions include, on the other hand, such portions of the neighboring battery cells, which are in contact with the enlarged projecting portions 43 or the wall-shaped projecting portions 44. The coating of the insulating material at such contacting portions may be formed by vapor deposition, coating, integral molding, and so on. According to such a structure, since the contacting portions of the neighboring battery cells are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells 4.

Advantages of the battery pack of the present embodiment will be explained. The battery pack has multiple wall-shaped projecting portions 44 and multiple enlarged projecting portions 43. The wall-shaped projecting portions 44 are provided at the side surface 4a of the battery cell, which is perpendicular to the layer direction X, and extend in the flow direction F of the cooling fluid. The multiple wall-shaped projecting portions 44 are arranged, in the direction Y perpendicular to the flow direction F of the cooling fluid, so as to form the fluid passages between the neighboring battery cells 4. The enlarged projecting portions 43 are provided at the side surface 4a of the battery cell, which is perpendicular to the layer direction X, and extend in the flow direction F of the cooling fluid. The multiple enlarged projecting portions 43 are arranged at the intervals in the direction Y perpendicular to the flow direction F of the cooling fluid. The enlarged projecting portions 43 are in contact with the neighboring battery cell 4, so that action force from the neighboring battery cell 4 is applied to the enlarged projecting portions 43. The enlarged projecting portions 43 are so formed that the outside dimension thereof in the direction Y (in which the multiple wall-shaped projecting portions are arranged) is larger than the thickness dimension of the wall-shaped projecting portion 44. The multiple wall-shaped projecting portions 44 are arranged between the enlarged projecting portions 43, which are arranged at the intervals.

According to the above structure, since the multiple enlarged projecting portions 43 having the necessary thickness are arranged on the side surface 4a of the battery cell at the necessary intervals, it is possible to stably bring out the function for applying the necessary binding force to the battery cells 4. In addition, the heat transfer area for the cooling function at the side surface 4a of the battery cell is increased by the multiple wall-shaped projecting portions 44 provided between the enlarged projecting portions 43, so that the cooling performance can be increased. Since the thickness of the wall-shaped projecting portions 44 can be made as smaller as possible, within a range for sufficiently carrying out the cooling performance, the heat transfer area can be increased without reducing the cross sectional area of the fluid passages for the cooling fluid. As a result, it is possible to bring out the necessary cooling performance with smaller amount of the cooling fluid, with smaller amount of driving power for the fluid machine, and with lower noise. It is, therefore, possible not only to increase the cooling performance of the battery cells 4 but also to assure the strength against the binding force applied to the battery cells 4.

The wall-shaped projecting portions 44 function as the heat radiating fin members. Therefore, when the thickness of the wall-shaped projecting portions is made as smaller as possible, it becomes possible not only to enlarge the cross sectional area of the fluid passages for the cooling fluid but also to increase the heat radiating amount from the wall-shaped projecting portions 44 so as to increase the cooling performance.

Fourth Embodiment

Figure 8:
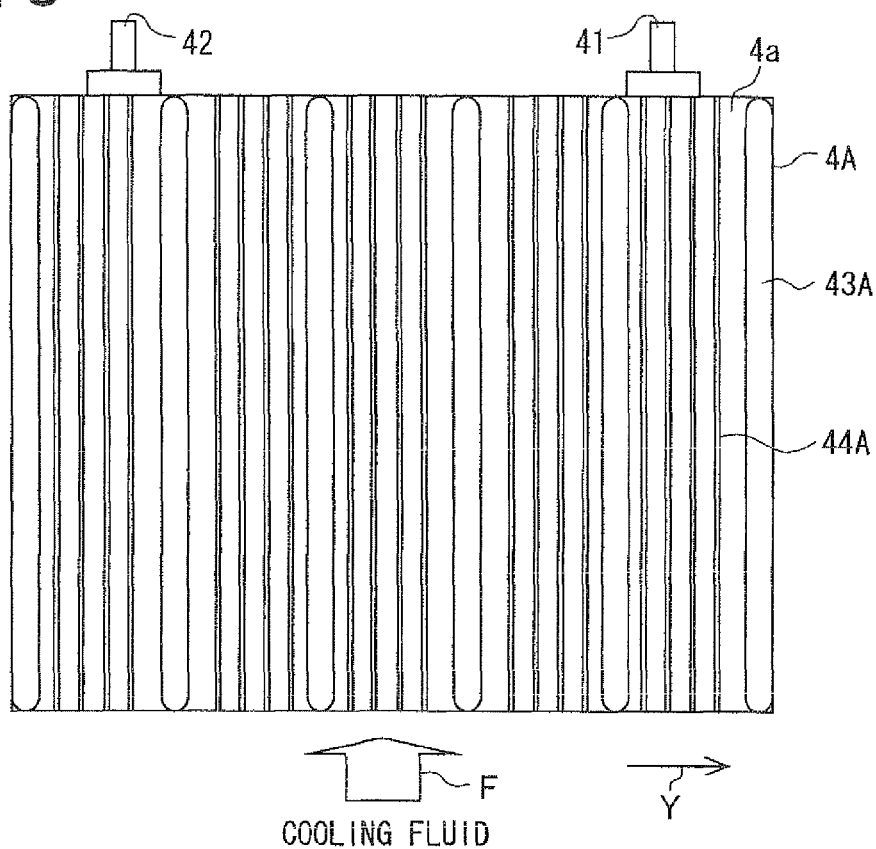
FIG. 8 is a schematic front view showing a battery cell of a battery pack according to a fourth embodiment.
Figure 9:
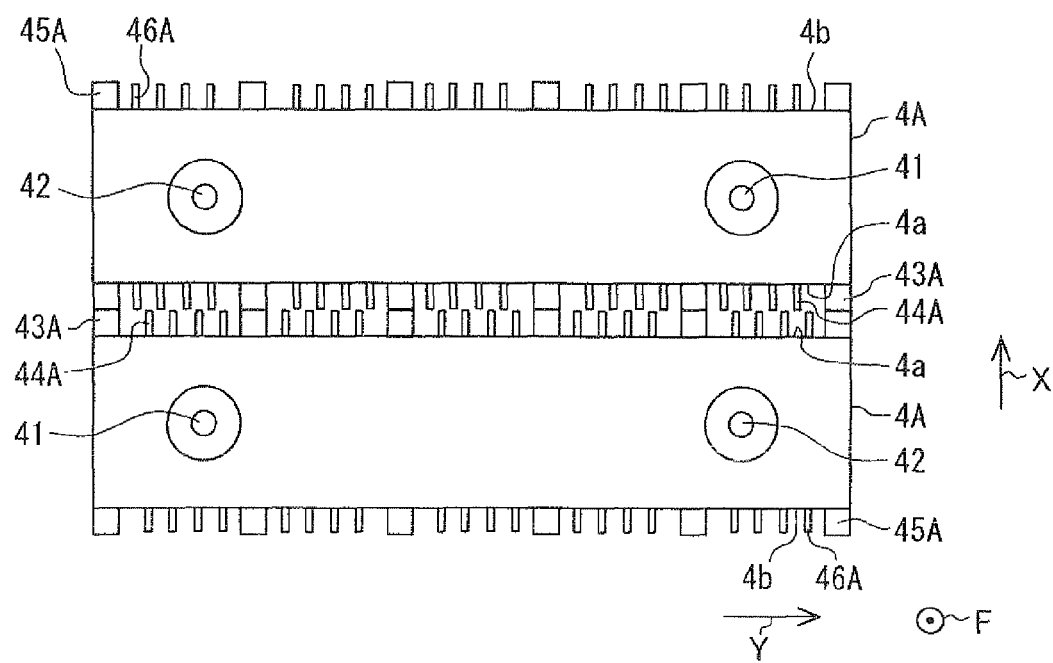
FIG. 9 is a schematic side view for explaining a layered structure of neighboring battery cells of the battery pack according to the fourth embodiment.

A layered structure of battery cells 4A according to a fourth embodiment, which is a modification of the third embodiment, will be explained with reference to FIGS. 8 and 9. FIG. 8 is a schematic front view for explaining the battery cells 4A forming a battery pack of the fourth embodiment. FIG. 9 is a schematic side view showing a part of the battery pack for explaining the layered structure of the neighboring battery cells 4A.

As shown in FIGS. 8 and 9, the layered structure of the battery cells 4A differs from that of the battery cells 4 of the third embodiment in that, when the binding force is applied to the battery pack by the binding device in the layer direction X, top surfaces of respective wall-shaped projecting portions 44A and 46A of the neighboring battery cells 4A are not opposing to each other but displaced from each other in the direction Y. Therefore, even in a case that height of the wall-shaped projecting portions 44A and 46A is larger than that of enlarged projecting portions 43A and 45A, the wall-shaped projecting portions 44A and 46A do not interfere with each other. As a result, any deformation can be prevented. The other structures, including the structures of the enlarged projecting portions 43A and 45A, are the same to those of the third embodiment and thereby the same advantages can be obtained.

Fifth Embodiment

Figure 10:
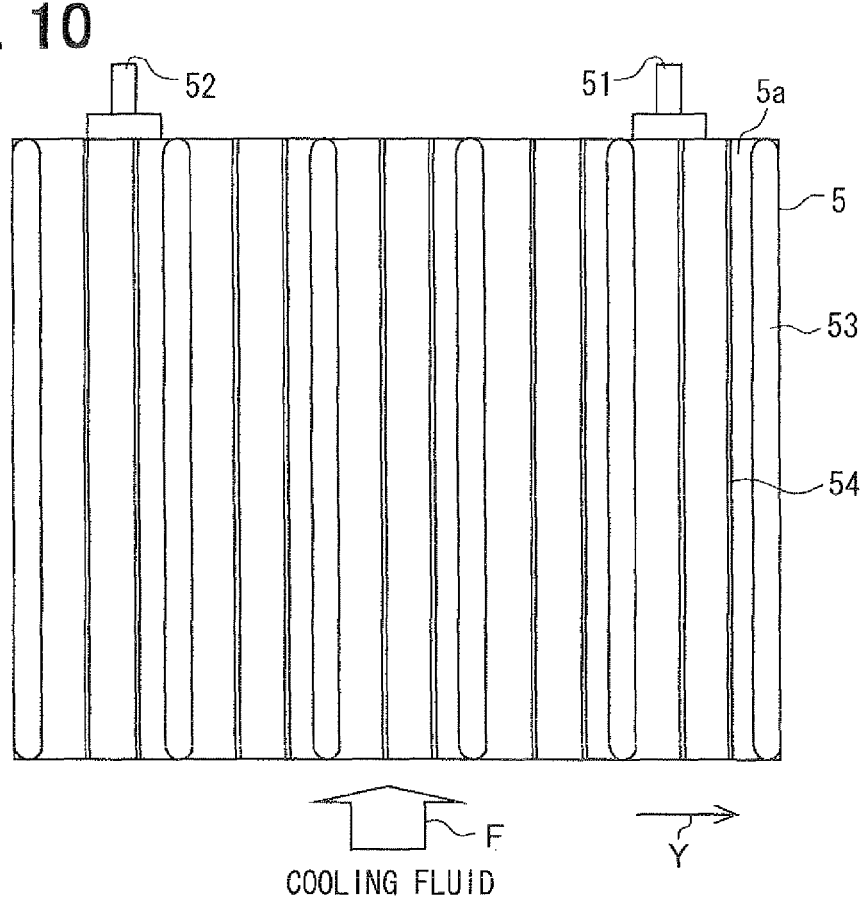
FIG. 10 is a schematic front view showing a battery cell of a battery pack according to a fifth embodiment.
Figure 11:
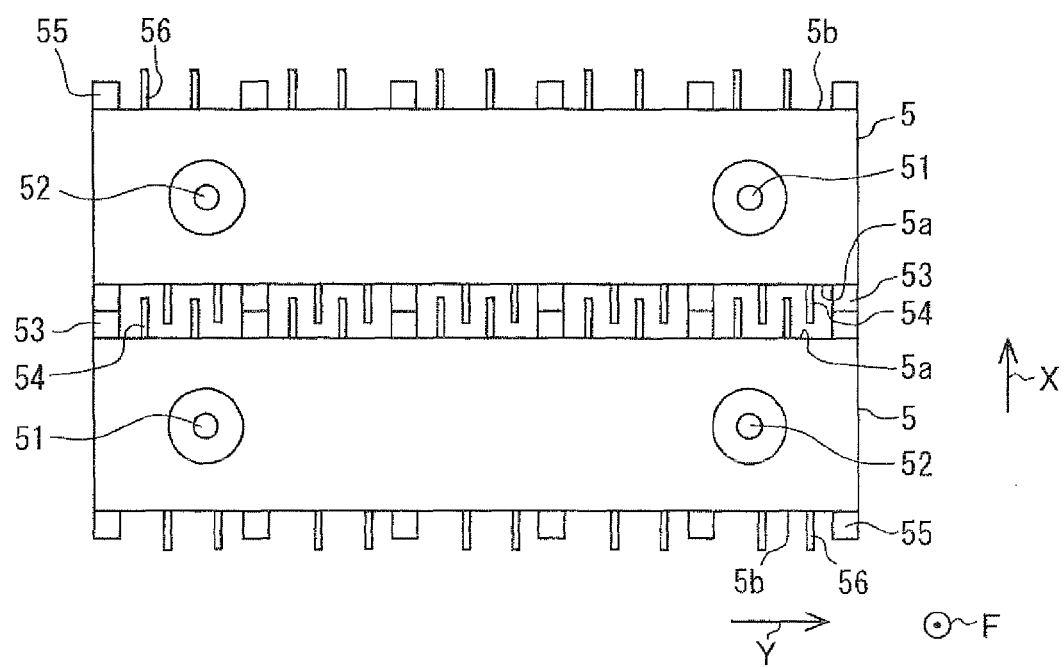
FIG. 11 is a schematic side view for explaining a layered structure of neighboring battery cells of the battery pack according to the fifth embodiment.

A layered structure of battery cells 5 according to a fifth embodiment, which is a modification of the fourth embodiment, will be explained with reference to FIGS. 10 and 11. FIG. 10 is a schematic front view for explaining the battery cells 5 forming a battery pack of the fifth embodiment. FIG. 11 is a schematic side view showing a part of the battery pack for explaining the layered structure of the neighboring battery cells 5.

As shown in FIGS. 10 and 11, the layered structure of the battery cells 5 differs from that of the battery cells 4A of the fourth embodiment in the number of wall-shaped projecting portions 54 and 56, which are arranged between enlarged projecting portions 53 and 55 formed on respective side surfaces 5a and 5b of the battery cell at intervals.

According to the present embodiment, as shown in FIGS. 10 and 11, the enlarged projecting portions 53 and 55 (six projecting portions in the embodiment) are respectively provided at predetermined intervals in the direction Y (in which the wall-shaped projecting portions are arranged). The multiple wall-shaped projecting portions 54 and 56 (two in the present embodiment) are respectively arranged between the enlarged projecting portions 53 and between the enlarged projecting portions 55. Therefore, the respective numbers of the enlarged projecting portions 53 and 55 are smaller than that of the wall-shaped projecting portions 54 and 56. In other words, the numbers of the enlarged projecting portions 53 and 55 per a unit area of the side surfaces 5a and 5b of the battery cell are respectively smaller than that of the wall-shaped projecting portions 54 and 56 per the unit area.

When the binding force is applied to the battery pack by the binding device in the layer direction X, the enlarged projecting portions 53 and 55 of the neighboring battery cells 5 are respectively brought into contact with each other. On the other hand, top surfaces of the respective wall-shaped projecting portions 54 and 56 of the neighboring battery cells 5 are not opposing to each other, but the wall-shaped projecting portions 54 and 56 of the battery cell 5 are respectively displaced from the wall-shaped projecting portions 54 and 56 of the neighboring battery cell 5 in the direction Y. In addition, heights of the wall-shaped projecting portions 54 and 56 are larger than those of the enlarged projecting portions 53 and 55. According to the present embodiment, the same advantages to the fourth embodiment can be obtained.

Sixth Embodiment

Figure 12:
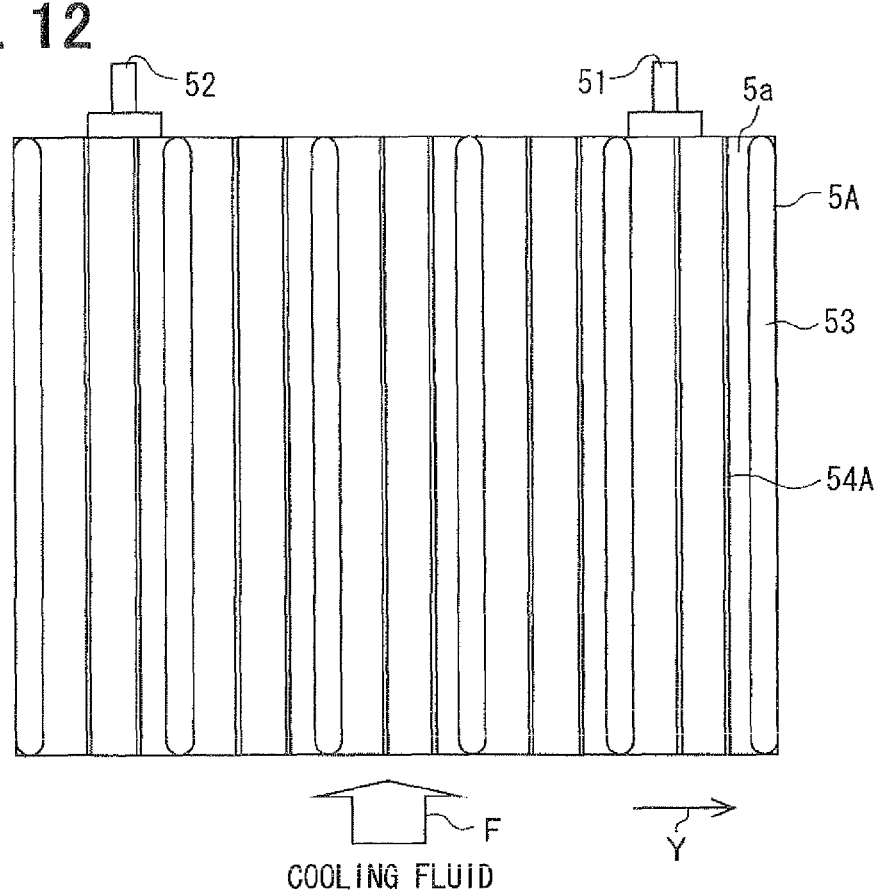
FIG. 12 is a schematic front view showing a battery cell of a battery pack according to a sixth embodiment.
Figure 13:
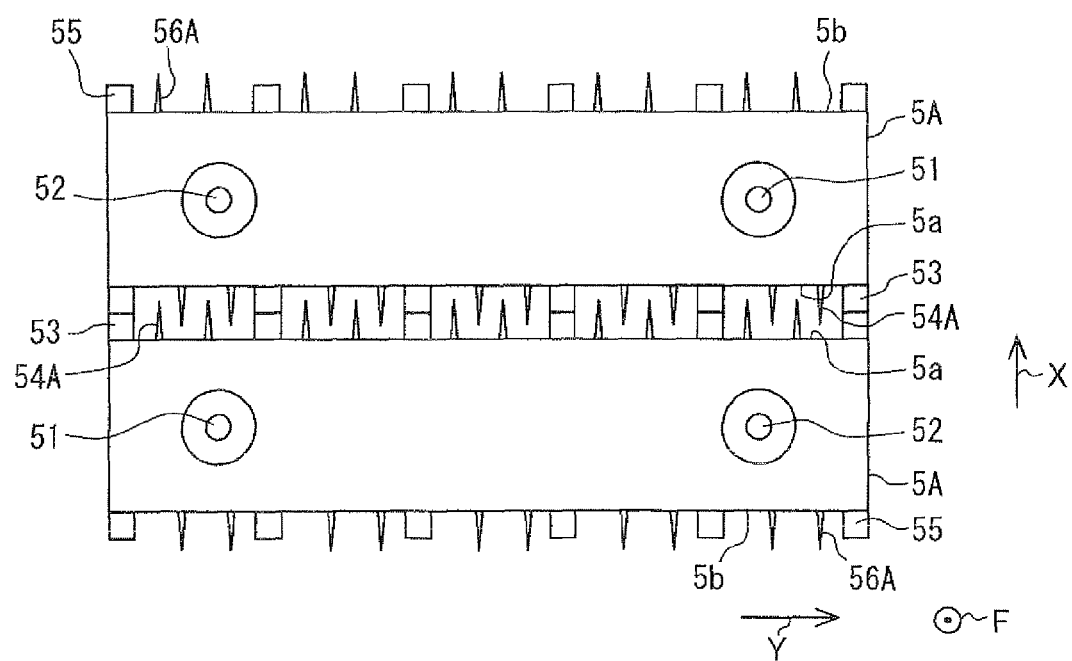
FIG. 13 is a schematic side view for explaining a layered structure of neighboring battery cells of the battery pack according to the sixth embodiment.

A layered structure of battery cells 5A according to a sixth embodiment, which is a modification of the fifth embodiment, will be explained with reference to FIGS. 12 and 13. FIG. 12 is a schematic front view for explaining the battery cells 5A forming a battery pack of the sixth embodiment. FIG. 13 is a schematic side view showing a part of the battery pack for explaining the layered structure of the neighboring battery cells 5A.

As shown in FIGS. 12 and 13, the layered structure of the battery cells 5A differs from that of the battery cells 5 of the fifth embodiment in that each of wall-shaped projecting portions 54A and 56A has across sectional shape of diminution, namely a width of the projecting portion becomes smaller toward a forward end thereof from its root. According to the above shape of the wall-shaped projecting portions 54A and 56A, a cross sectional area of the wall-shaped projecting portion can be made smaller, even in a case that the wall-shaped projecting portions 54A and 56A have the same heat radiating performance to the wall-shaped projecting portions 54 and 56 of the fifth embodiment. A fluid flow resistance can be reduced and thereby a driving power for a fluid machine (such as, an air blowing machine) as well as noise can be reduced. The other structures, including the structures of the enlarged projecting portions 53 and 55, are the same to those of the fifth embodiment and thereby the same advantages can be obtained.

Seventh Embodiment

Figure 14:
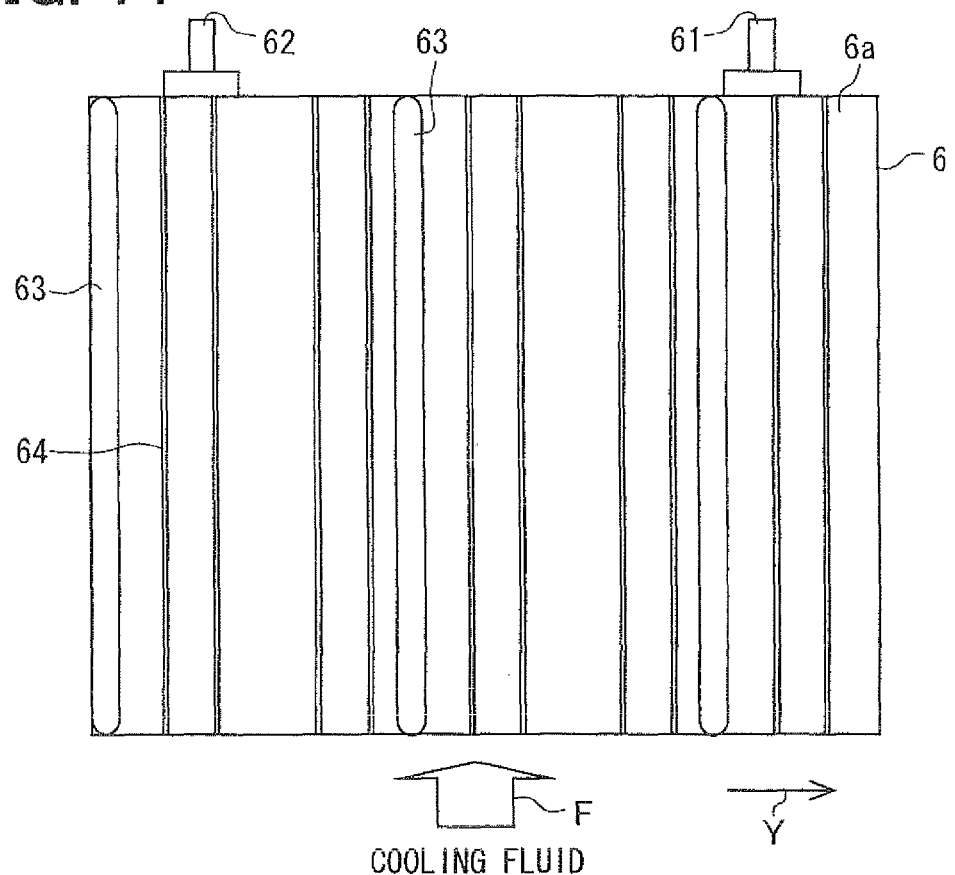
FIG. 14 is a schematic front view showing a battery cell of a battery pack according to a seventh embodiment.
Figure 15:
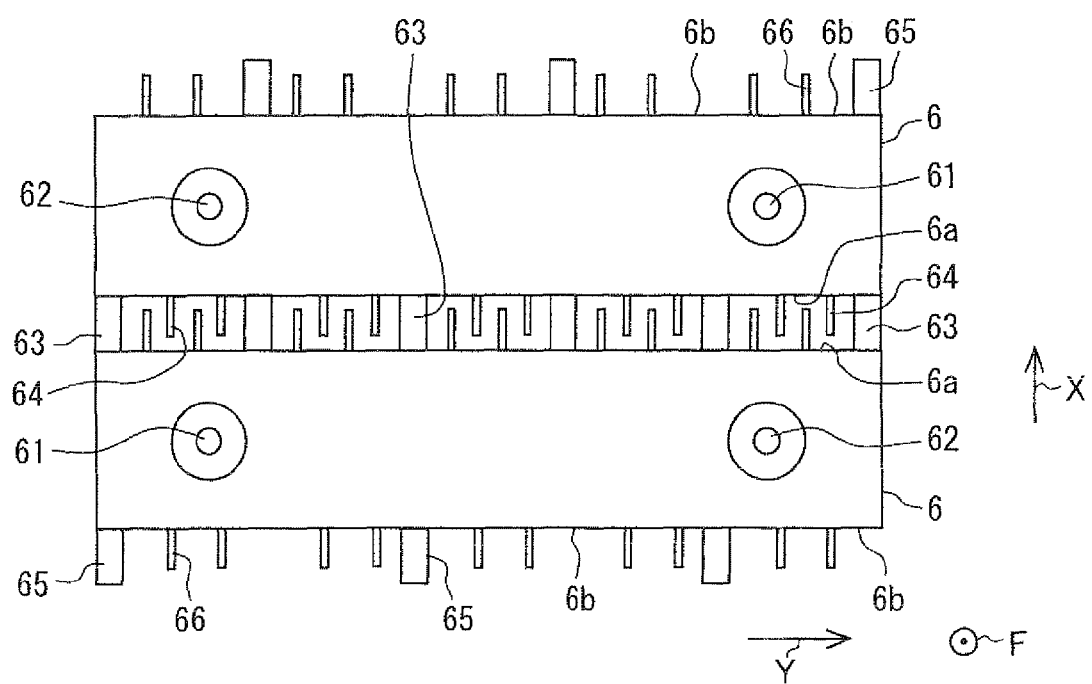
FIG. 15 is a schematic side view for explaining a layered structure of neighboring battery cells of the battery pack according to the seventh embodiment.

A battery pack using battery cells 6 according to a seventh embodiment, which is a modification of the fifth embodiment, will be explained with reference to FIGS. 14 and 15. FIG. 14 is a schematic front view for explaining the battery cells 6 forming the battery pack of the seventh embodiment. FIG. 15 is a schematic side view showing a part of the battery pack for explaining a layered structure of the neighboring battery cells 6.

As shown in FIGS. 14 and 15, the layered structure of the battery cells 6 differs from that of the battery cells 5 of the fifth embodiment in that, when the binding force is applied to the battery pack by the binding device in the layer direction X, enlarged projecting portions 63 and 65 are not respectively brought into contact with each other between the neighboring battery cells 6, but the respective enlarged projecting portions 63 and 65 are respectively brought into contact with side surfaces 6a and 6b of the battery cells 6 so as to bring out strength for resisting the binding force. The other structures are the same to the fifth embodiment and the same advantages can be obtained. According to the above structure, even when the battery cell is displaced from the neighboring battery cell in the direction Y during a process of building up the battery cells 6, an influence to be caused by such displacement is smaller than that of the fifth embodiment. As a result, it is possible to surely bring out the strength for resisting the binding force.

According to the present embodiment, as shown in FIGS. 14 and 15, the multiple (three in the present embodiment) enlarged projecting portions 63 and 65 are respectively arranged in the direction Y (in which the multiple wall-shaped projecting portions are arranged) at predetermined intervals but unevenly on one side. The multiple (four in the present embodiment) wall-shaped projecting portions 64 and 66 are arranged between the respective enlarged projecting portions 63 and 65. In other words, the numbers of the enlarged projecting portions 63 and 65 per a unit area of the side surfaces 6a and 6b of the battery cell are respectively smaller than that of the wall-shaped projecting portions 64 and 6 per the unit area.

Eighth Embodiment

Figure 16:
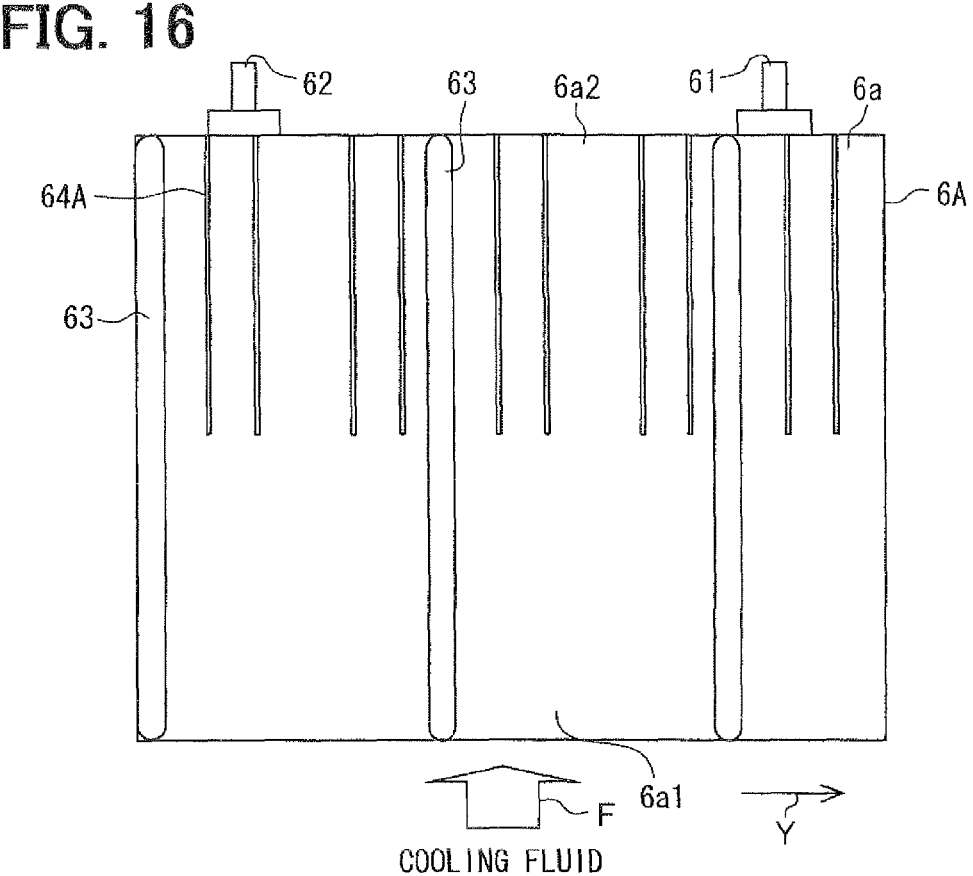
FIG. 16 is a schematic front view showing a battery cell of a battery pack according to an eighth embodiment.
Figure 17:
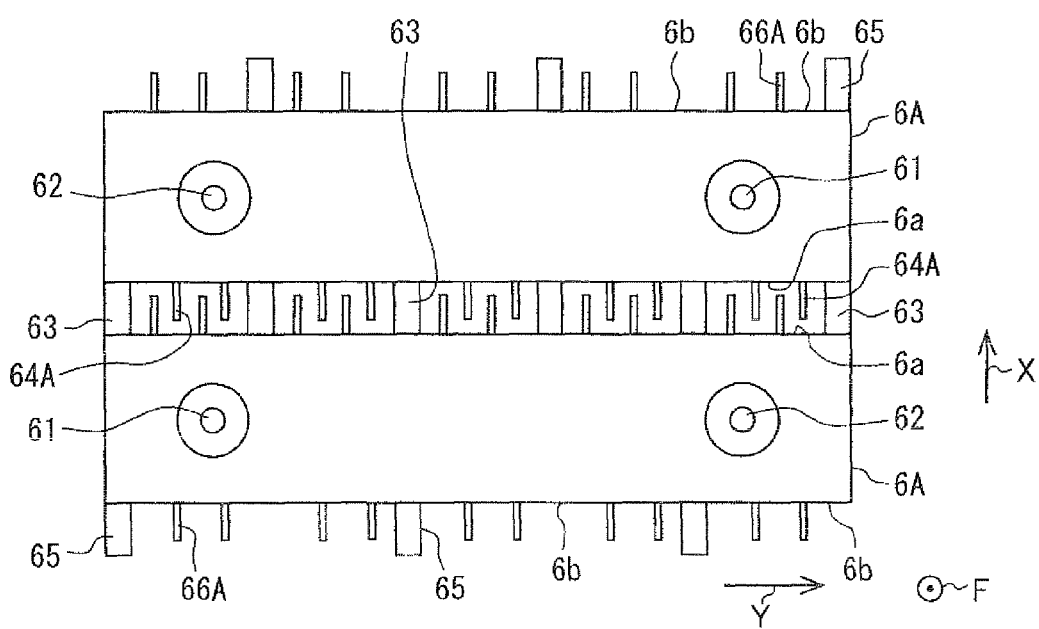
FIG. 17 is a schematic side view for explaining a layered structure of neighboring battery cells of the battery pack according to the eighth embodiment.

A battery pack using battery cells 6A according to an eighth embodiment, which is a modification of the seventh embodiment, will be explained with reference to FIGS. 16 and 17. FIG. 16 is a schematic front view for explaining the battery cells 6A forming the battery pack of the eighth embodiment. FIG. 17 is a schematic side view showing a part of the battery pack for explaining a layered structure of the neighboring battery cells 6A.

As shown in FIGS. 16 and 17, the layered structure of the battery cells 6A differs from that of the battery cells 6 of the seventh embodiment in that wall-shaped projecting portions 64A and 66A are provided on not an upstream area 6a1 but a downstream area 6a2 of side surfaces 6a and 6b of the battery cell, which are perpendicular to the layer direction X. The other structures are the same to that of the seventh embodiment and the same advantages can be obtained.

The wall-shaped projecting portions 64A and 66A are respectively provided on a whole width area of each side surface 6a and 6b of the battery cell in the direction Y (in which the multiple wall-shaped projecting portions are arranged). Each of the wall-shaped projecting portions 64A and 66A is shorter than the wall-shaped projecting portions 64 of the seventh embodiment in the flow direction F. The wall-shaped projecting portions 64A and 66A are provided not on the upstream area 6a1 of the fluid flow of the cooling fluid but only on the downstream area 6a2.

According to the above structure, the heat transfer area at the downstream area 6a2 of the respective side surfaces 6a and 6b of the battery cell can be made larger that at the upstream area 6a1. It is, therefore, possible to facilitate cool-down of the battery cells 6A by the cooling fluid at the downstream area more than at the upstream area. This means that the cooling performance at the downstream area of the fluid flow of the cooling fluid can be made closer to that at the upstream area. As a result, a difference of the cooling performance at the side surfaces 6a and 6b of the battery cell can be reduced, to thereby suppress temperature variation between the local portions of the battery cells 6A and to appropriately bring out the battery performance.

Ninth Embodiment

Figure 18:
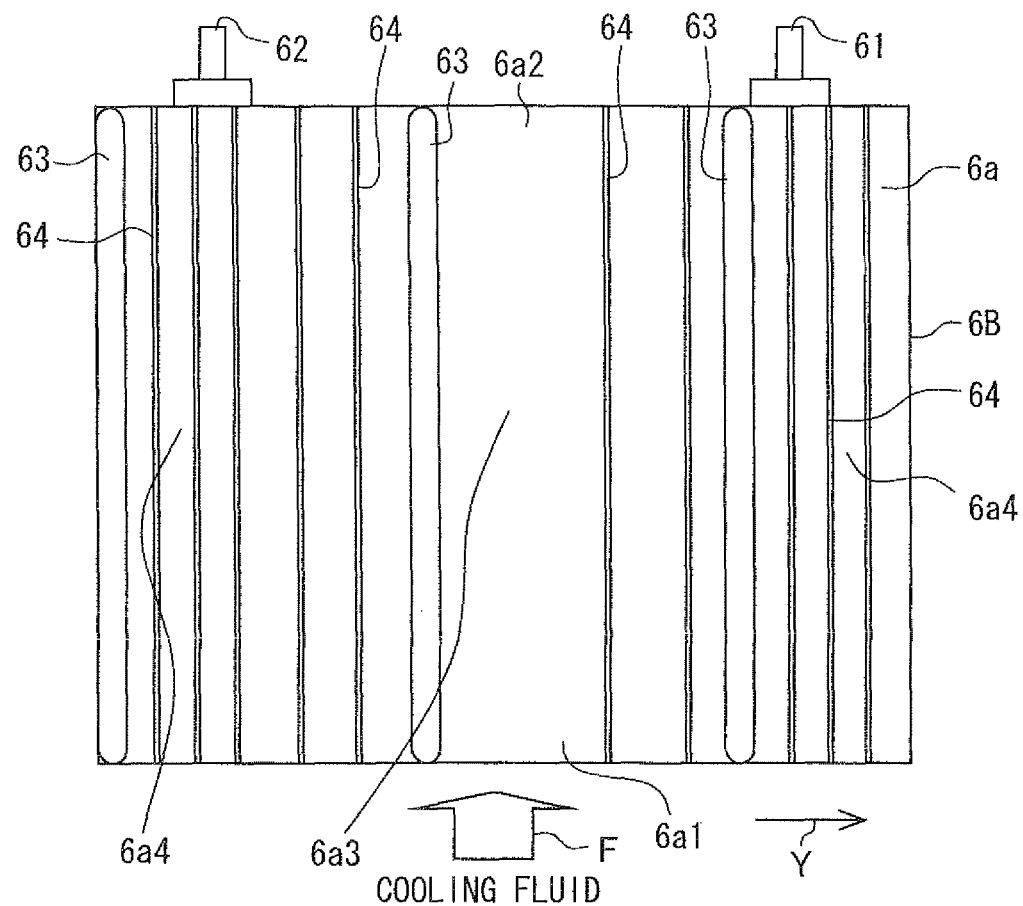
FIG. 18 is a schematic front view showing a battery cell of a battery pack according to a ninth embodiment.

A battery pack using battery cells 6B according to a ninth embodiment, which is a modification of the seventh embodiment, will be explained with reference to FIG. 18. FIG. 18 is a schematic front view for explaining the battery cells 6B forming the battery pack of the ninth embodiment.

As shown in FIG. 18, a layered structure of the battery cells 6B differs from that of the battery cells 6 of the seventh embodiment in that the heat transfer area on a side surface 6a of the battery cell is changed in the direction Y, which is perpendicular to the flow direction F of the cooling fluid. According to the ninth embodiment, which is an example of the above structure, multiple wall-shaped projecting portions are provided on the side surface 6a of the battery cell perpendicular to the layer direction X in such a way that a larger number of the wall-shaped projecting portions 64 are provided at both side areas 6a4 than an intermediate area 6a3 in the direction Y (in which the multiple wall-shaped projecting portions are arranged). The other structures are the same to that of the seventh embodiment and the same advantages can be obtained.

According to the above structure of the ninth embodiment for the locations of the wall-shaped projecting portions 64, the heat transfer area of the side surfaces 6a and 6b of the battery cell at the side areas 6a4 in the direction Y (in which the multiple wall-shaped projecting portions are arranged) can be made larger than that at the intermediate area 6a3. In other words, as shown in FIG. 18, the wall-shaped projecting portions 64 are not provided on the side surface 6a of the battery cell at a center portion (the intermediate area) of a Y-direction width but provided on the side surface at such portions (the side areas) of the Y-direction width other than the center portions (side portions). As a result, a number of the wall-shaped projecting portions per unit area on the side surface 6a of the battery cell at the side portions (6a4) is larger than that at the center portion. The heat transfer area per the unit area at the side portions is thereby larger than that at the center portion.

According to the above structure, it is possible to facilitate cool-down of the battery cells 6B by the cooling fluid at the side portions more than at the center portion, in the width direction in which the fluid passages are arranged between the battery cells 6B. In a case that heat radiation at the side portions is large or it is necessary to improve cooling performance at the side portions, the cooling capacity of the side surfaces 6a and 6b of the battery cells can be changed in the direction Y in which the multiple wall-shaped projecting portions are arranged. It is also possible to make the cooling capacities of the side portions close to that of the center portion. Thus, it is possible to change the cooling capacity of the side surface 6a of the battery cell depending on differences of local heat generating density of the battery cell 6B, to thereby suppress temperature variation between the local portions of the battery cells 6B and to appropriately bring out the battery performance.

Tenth Embodiment

Figure 19:
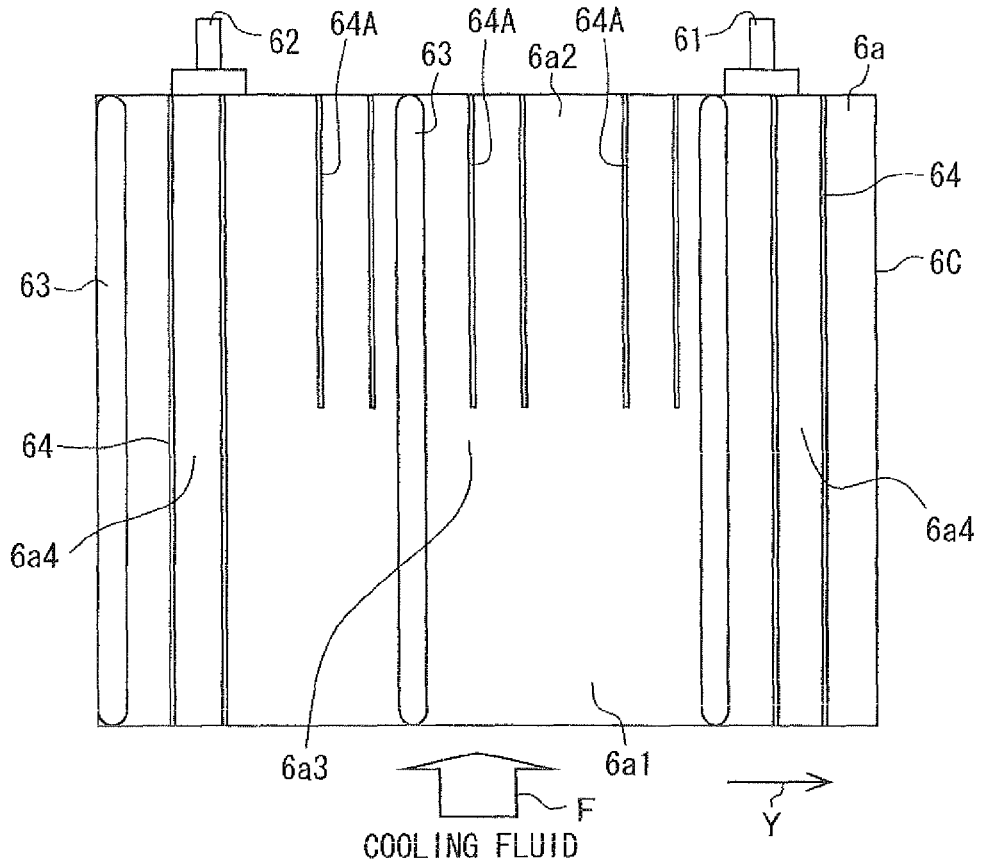
FIG. 19 is a schematic front view showing a battery cell of a battery pack according to a tenth embodiment.
Figure 20:
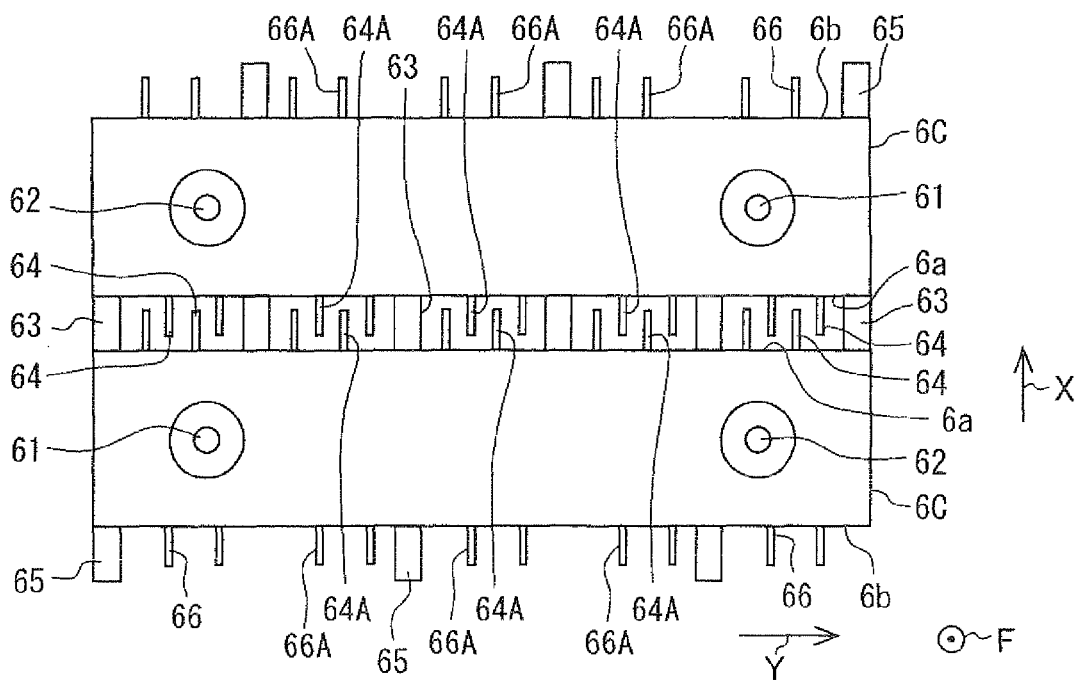
FIG. 20 is a schematic side view for explaining a layered structure of neighboring battery cells of the battery pack according to the tenth embodiment.

A battery pack using battery cells 6C according to a tenth embodiment, which is a modification of the seventh embodiment, will be explained with reference to FIGS. 19 and 20. FIG. 19 is a schematic front view for explaining the battery cells 6C forming the battery pack of the tenth embodiment. FIG. 20 is a schematic side view showing a part of the battery pack for explaining a layered structure of the neighboring battery cells 6C.

As shown in FIGS. 19 and 20, the layered structure of the battery cells 6C differs from that of the battery cells 6 of the seventh embodiment in that a larger number of the wall-shaped projecting portions 64A and 66A are provided on a downstream area 6a2 than an upstream area 6a1 of the side surfaces 6a and 6b of the battery cell, which are perpendicular to the layer direction X. The other structures are the same to that of the seventh embodiment and the same advantages can be obtained.

As shown in FIGS. 19 and 20, the respective wall-shaped projecting portions 64A and 66A, which are provided at center portions 6a3 of the side surfaces 6a and 6b of the battery cell in the direction Y, are shorter than the respective wall-shaped projecting portions 64 and 66 provided at side portions 6a4 in the flow direction F of the cooling fluid. The wall-shaped projecting portions 64A and 66A are provided not on the upstream area 6a1 but only on the downstream area 6a2 of the fluid flow of the cooling fluid. A number of the wall-shaped projecting portions per unit area of the side surfaces 6a and 6b of the battery cell at the upstream area 6a1 is smaller than that at the downstream area 6a2. Therefore, the heat transfer area per unit area at the upstream area of the center portion is smaller than that at the downstream area.

According to the above structure, the heat transfer area of the respective side surfaces 6a and 6b of the battery cell at the downstream area 6a2 of the center portion can be made larger than that at the upstream area 6a1. It becomes, thereby, possible to facilitate cool-down of the battery cells 6C by the cooling fluid at the both side portions and at the downstream side of the center portion of the battery cells 6C, in a case that heat generating density at the upstream area of the center portion of the battery cells 6C is low. Thus, it is possible to change the cooling capacity of the side surfaces 6a and 6b of the battery cell depending on differences of local heat generating density of the battery cell 6B, to thereby suppress temperature variation between the local portions of the battery cells 6C and to appropriately bring out the battery performance.

Eleventh Embodiment

Figure 21:
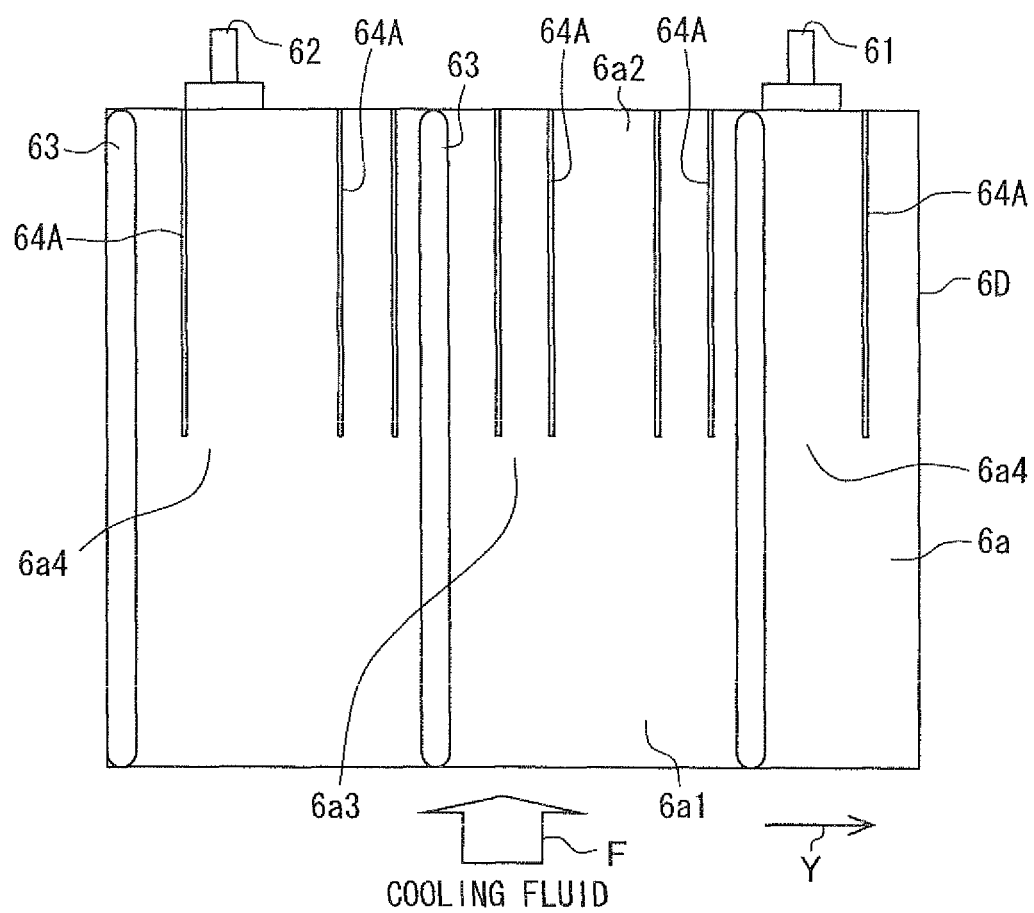
FIG. 21 is a schematic front view showing a battery cell of a battery pack according to an eleventh embodiment.

A battery pack using battery cells 6D according to an eleventh embodiment, which is a modification of the tenth embodiment, will be explained with reference to FIG. 21. FIG. 21 is a schematic front view for explaining the battery cells 6D forming the battery pack of the eleventh embodiment.

As shown in FIG. 21, a layered structure of the battery cells 6D differs from the battery cells 6C of the tenth embodiment in that the wall-shaped projecting portions 64A and 66A are provided not on the upstream area 6a1 but on downstream area, so that the wall-shaped projecting portions 64A and 66A are provided in the whole area in the direction Y, and that a larger number of the wall-shaped projecting portions 64A and 66A are provided in the center portion 6a3 than the side portions 6a4 in the direction Y (in which the wall-shaped projecting portions are arranged). Even in the eleventh embodiment, the same advantages to the tenth embodiment can be obtained.

In other words, the layered structure of the battery cells 6D differs from that of the battery cells 6 of the seventh embodiment in that the battery cell 6D has such a structure according to which the heat transfer area of the side surface 6a of the battery cell can be changed in the direction Y (in which the wall-shaped projecting portions are arranged). According to the eleventh embodiment, which is an example of the above structure, the wall-shaped projecting portions are provided on the side surface 6a of the battery cell perpendicular to the layer direction X in such a way that a larger number of the wall-shaped projecting portions 64A are provided at the center portion 6a3 than the side portions 6a4 in the direction Y (in which the multiple wall-shaped projecting portions are arranged). The other structures are the same to the seventh embodiment and the same advantages can be obtained.

According to the above structure of the eleventh embodiment for the locations of the wall-shaped projecting portions 64A, the heat transfer area of the side surfaces 6a and 6b of the battery cell at the center portion 6a3 in the direction Y (in which the multiple wall-shaped projecting portions are arranged) can be made larger than that at the side portions 6a4. According to the above structure, it is possible to facilitate cool-down of the battery cells 6D by the cooling fluid at the center portion more than the side portions, in the width direction in which the fluid passages are arranged between the battery cells 6D. In a case that heat radiation at the center portion 6a3 of the battery cell 6D is large or it is necessary to improve cooling performance at the center portion 6a3, the cooling capacity of the side surface 6a of the battery cell can be changed in the direction Y in which the multiple wall-shaped projecting portions are arranged. It is also possible to make the cooling capacities of the center portion closer to that of the side portions. Thus, it is possible to change the cooling capacity of the side surface 6a of the battery cell depending on differences of local heat generating density of the battery cell 6D, to thereby suppress temperature variation between the local portions of the battery cells 6D and to appropriately bring out the battery performance.

(Further Modifications)

In the above embodiments, the preferred embodiments are explained. The present invention, however, should not be limited to those embodiments but may be modified in various ways without departing from the spirit of the present invention.

In the above embodiments, each of the enlarged projecting portions 23, the wall-shaped projecting portions 241, the enlarged projecting portions 43, the wall-shaped projecting portions 44 and so on, may be formed on a separate member. The separate member may be bonded to the outer packaging member or integrally fixed to the side surface of the battery cell by means of integral molding, such as an insert molding process. The projecting portions may be directly formed on the outer packaging member of the battery cell.

In the above embodiments, each of the enlarged projecting portions 23, the wall-shaped projecting portions 241, the enlarged projecting portions 43, the wall-shaped projecting portions 44 and so on, which are formed on the side surface of the battery cell, is brought into contact with the neighboring battery cell. Those projecting portions may be directly brought into contact with the outer packaging member of the neighboring battery cell or directly brought into contact with the corresponding projecting portions formed on the side surface of the neighboring battery cell.

Twelfth Embodiment

Figure 22:
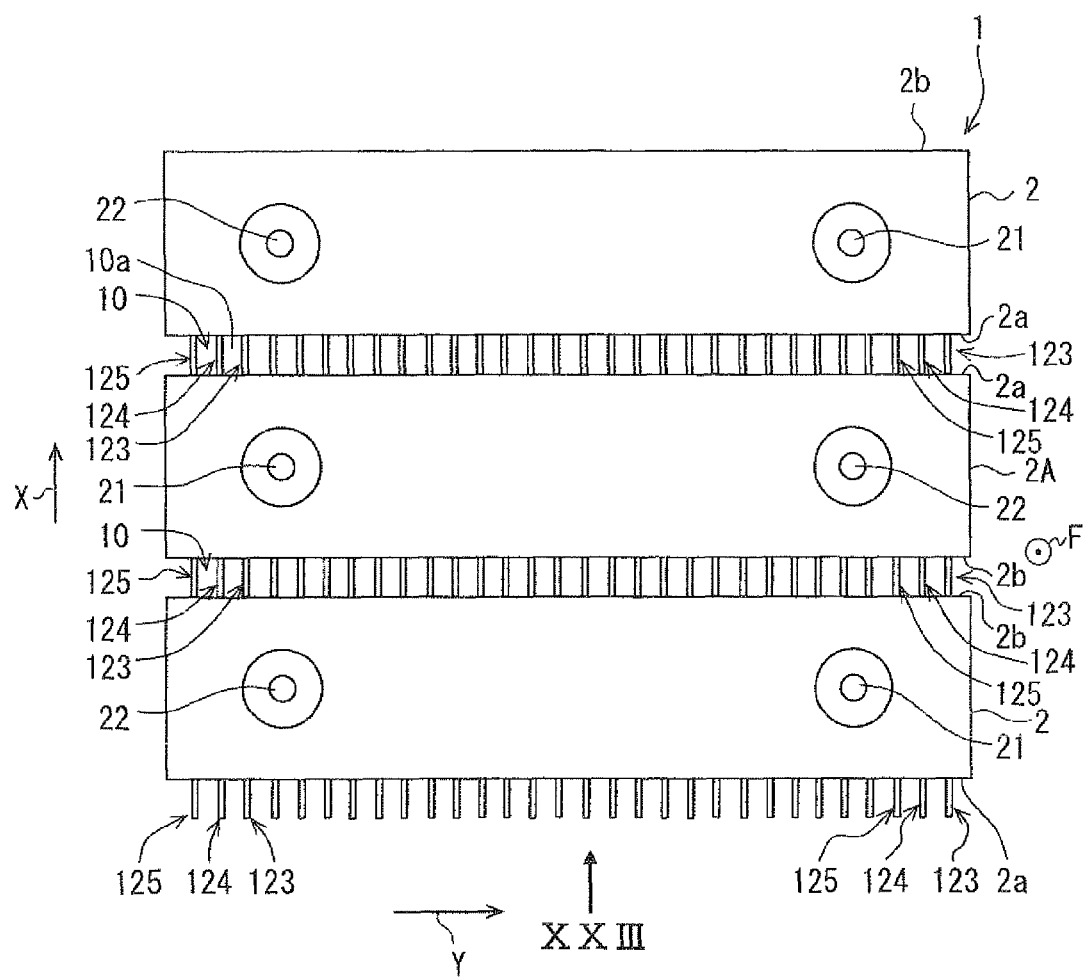
FIG. 22 is a schematic side view for explaining a layered structure of battery cells of the battery pack according to a twelfth embodiment, when viewed the battery cells on a side from which terminals are outwardly projecting.
Figure 23:
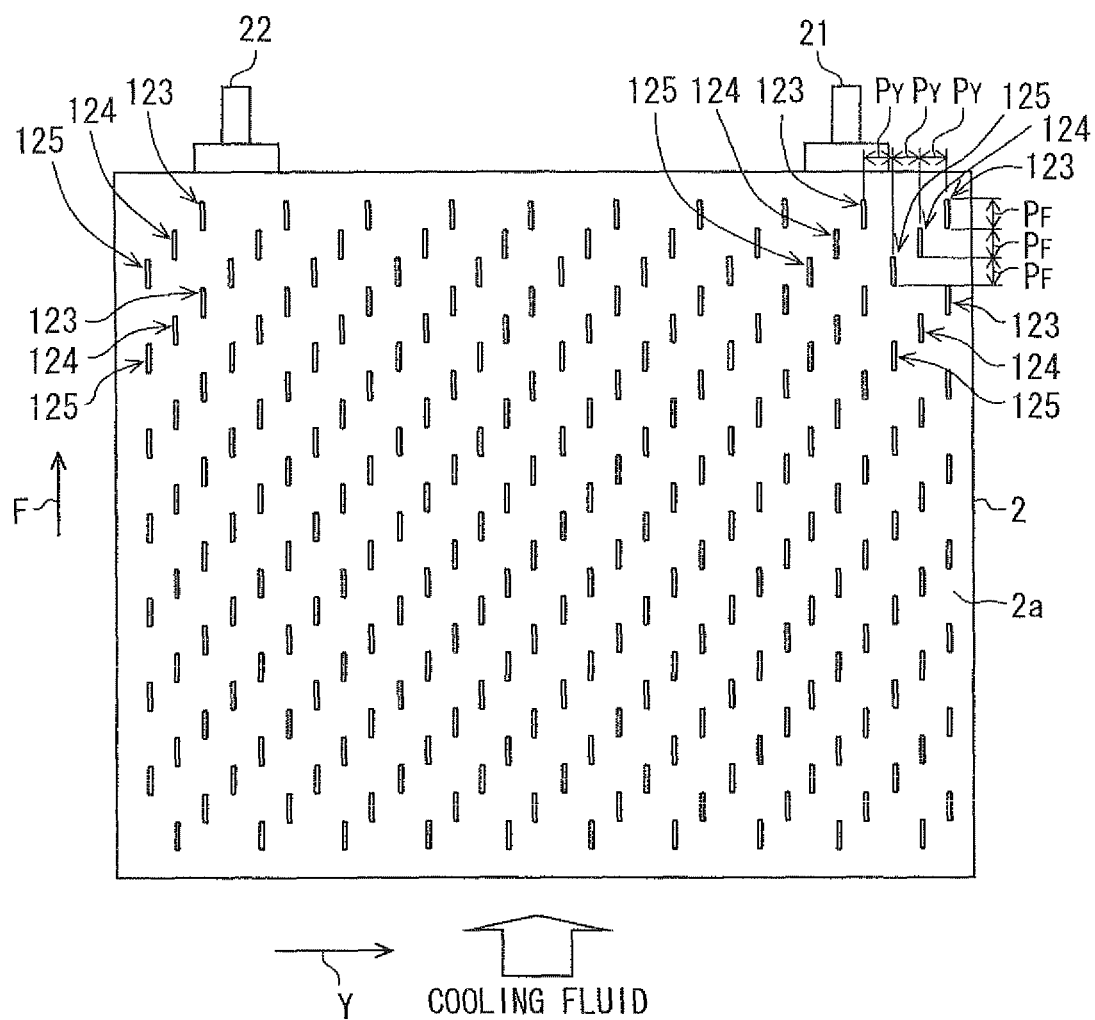
FIG. 23 is a schematic front view showing the battery cell when viewed in a direction of an arrow XXIII in FIG. 22.

A twelfth embodiment of the present invention will be explained with reference to FIGS. 22 and 23. FIG. 22 is a schematic side view of neighboring three battery cells 2 and 2A, when viewed from a projecting side of electric terminals, for the purpose of explaining a layered structure of the battery cells of the battery pack 1 according to the twelfth embodiment. FIG. 23 is a schematic front view of the battery cell 2 when viewed in a direction of an arrow XXIII in FIG. 22. FIG. 22 shows only three battery cells 2 and 2A for the purpose of easily understanding the invention, although the battery pack 1 is composed of a larger number of battery cells 2 and 2A.

As shown in FIGS. 22 and 23, wall-shaped projecting portions 123, 124 and 125 are provided on the side surface 2a of the battery cell 2, wherein the respective projecting portions 123 to 125 are arranged at intervals in the flow direction F of the cooling fluid. No projecting portions are provided on the other side surface 2b of the battery cell. The multiple wall-shaped projecting portions 123, 124 and 125 are arranged at predetermined intervals in the direction Y, which is perpendicular to the flow direction F of the cooling fluid. In a similar manner, the multiple wall-shaped projecting portions 123, 124 and 125 are provided on the side surface 2b of the battery cell 2A at intervals in the flow direction F of the cooling fluid, while no projecting portions are provided on the other side surface 2a of the battery cell 2A. As above, the wall-shaped projecting portions are respectively provided on one side surface of the battery cells 2 and 2A, however, the one side surface is different from each other.

The wall-shaped projecting portions 123, 124 and 125 of the battery cells 2 and 2A will be more in detail explained with reference to the battery cell 2 shown in FIG. 23.

As shown in FIG. 23, the wall-shaped projecting portions 123, 124 and 125 are respectively arranged in the flow direction F of the cooling fluid, so that respective multiple projecting portions are sprinkled in the flow direction F to form a line. Each of the wall-shaped projecting portions 123, 124 and 125 is so arranged that a thickness direction of each projecting portion coincides with the direction Y, which is perpendicular to the flow direction F of the cooling fluid. The multiple wall-shaped projecting portions 123, 124 and 125, each of which is projecting from the side surface 2a of the battery cell, are arranged at predetermined intervals in the flow direction F of the cooling fluid. The predetermined interval corresponds to a double of a length (dimension $P_F$) of the respective wall-shaped projecting portions 123, 124 and 125 in the flow direction F. For example, according to the embodiment shown in FIG. 23, the predetermined interval is equal to a double of the length, that is, a dimension $2P_F$.

In addition, the multiple wall-shaped projecting portions 123, 124 and 125, which are projecting from the side surface 2a of the battery cell, are arranged at predetermined intervals (dimension $P_Y$) in the direction Y perpendicular to the flow direction F of the cooling fluid.

The respective wall-shaped projecting portions 123, 124 and 125 are so arranged that multiple lines are formed in the direction Y perpendicular to the flow direction F of the cooling fluid. Each of the wall-shaped projecting portions 123, 124 and 125 is so arranged that the wall-shaped projecting portions neighboring to each other in the direction Y are displaced in the flow direction F of the cooling fluid. The multiple lines are composed of the multiple wall-shaped projecting portions 123 (a first line), the multiple wall-shaped projecting portions 124 (a second line) and the multiple wall-shaped projecting portions 125 (a third line), wherein the respective wall-shaped projecting portions are arranged along the flow direction F of the cooling fluid. In other words, line groups, each of which is composed of the first line, the second line and the third line, are arranged on the side surface 2a of the battery cell in the direction Y perpendicular to the flow direction F. According to such a structure, meandering fluid passages 10 extending in the flow direction F of the cooling fluid are formed by the multiple wall-shaped projecting portions 123, 124 and 125 between the side surfaces 2a of the battery cells.

In addition, the wall-shaped projecting portions 123, which form the line in the flow direction of the cooling fluid, corresponds to such wall-shaped projecting portions which are most closest to the electric terminals (the positive and negative electrodes 21 and 22) among the wall-shaped projecting portions 123 to 125, namely most closest to a side end of the side surface 2a of the battery cell. The wall-shaped projecting portions 125 are located at such positions, which are farthermost to the electric terminals. As above, the respective wall-shaped projecting portions 123, 124 and 125 are arranged on the side surface 2a of the battery cell 2 in an off-set pattern. In the same manner to the battery cell 2, the wall-shaped projecting portions 123, 124 and 125 are arranged on the side surface 2b of the battery cell 2A in the off-set pattern.

When the multiple battery cells 2 are built up to form the battery pack 1, all of the wall-shaped projecting portions 123, 124 and 125 are brought into contact with the respective neighboring battery cells 2A to form the fluid passages 10 having predetermined shapes between the side surfaces 2a of the battery cells. As a result, all of the wall-shaped projecting portions 123, 124 and 125 function as binding ribs between the neighboring battery cells 2 and 2A, so that the binding ribs receive the binding force applied to the respective battery cells 2 and 2A.

Each of the wall-shaped projecting portions 123, 124 and 125 of the present embodiment is integrally formed with the respective outer packaging members of the battery cells 2 and 2A. For example, in a case that the outer packaging member is composed of a metal casing (aluminum), the wall-shaped projecting portions can be integrally formed with such outer packaging member by a machining process, in which the metal is chipped off. According to such a structure, it is possible to reduce a number of parts and components as well as a manufacturing cost.

The wall-shaped projecting portions 123, 124 and 125 may be alternatively formed on a plate member, which is a separate member from the outer packaging member of the battery cells 2 and 2A. In this case, the plate member may be a metal plate having fins, which is manufactured by a chip-off machining process. The plate member is fixed to the side surface of the battery cell, so that the wall-shaped projecting portions 123, 124 and 125 projecting from the side surface of the battery cell can be formed.

In addition, in a case that the wall-shaped projecting portions 123, 124 and 125 as well as the outer packaging members of the battery cells 2 and 2A are made of conducting material, at least one of contacting portions (either the wall-shaped projecting portions or the outer packaging members) may be preferably coated with insulating material. The coating of the insulating material at such contacting portions may be formed by vapor deposition, coating, integral molding, and so on. According to such a structure, since the contacting portions of the neighboring battery cells 2 and 2A are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells.

Advantages of the battery pack 1 of the present embodiment will be explained. The multiple wall-shaped projecting portions 123, 124 and 125 are brought into contact with the outer packaging member of the opposing battery cells 2 and 2A to form the fluid passages 10 between the side surfaces of the battery cells. The multiple wall-shaped projecting portions 123, 124 and 125 are arranged on the side surfaces 2a and 2b of the battery cells at the predetermined intervals (the dimension of $2P_F$) in the flow direction F of the cooling fluid and at the predetermined intervals (the dimension of $P_Y$) in the direction Y perpendicular to the flow direction F. In addition, each of the wall-shaped projecting portions 123, 124 and 125, multiple lines of which are arranged in the direction Y perpendicular to the flow direction F, is displaced in the flow direction F (displacement distance is equal to the dimension of $P_F$) between the lines neighboring to each other in the direction Y.

According to the above structure, each line of the wall-shaped projecting portions 123, 124 and 125 is displaced in the flow direction F of the cooling fluid between the neighboring lines. The fluid passages are formed between the neighboring lines of the wall-shaped projecting portions 123, 124 and 125. Since no wall-shaped projecting portion is formed at a downstream side of each wall-shaped projecting portion 123, 124 or 125, the fluid passages are communicated with each other in the direction Y. It is, therefore, possible to form meandering flow in the fluid passages 10 between the battery cells.

It is thereby possible to suppress enlargement of the boundary layer of the cooling fluid flow at wall portions of the battery cells as well as at wall portions of the wall-shaped projecting portions, or it is possible to make thinner the boundary layer of the cooling fluid flow. It is furthermore possible to improve heat transfer performance at the downstream sides of the respective wall-shaped projecting portions 123, 124 and 125. As a result, the cooling performance of the battery cells 2 and 2A can be increased. According to the layout of the above wall-shaped projecting portions 123, 124 and 125, it is possible to bring out the necessary cooling performance with smaller amount of the cooling fluid, with smaller amount of driving power for the fluid machine, and with lower noise.

In the layered condition of the battery cells 2 and 2A, since each of the wall-shaped projecting portions 123, 124 and 125 is in contact with the opposing battery cells, the biding force is stably applied to the side surfaces of the respective battery cells. In addition, the fluid passages 10 are formed at the same time for carrying out the cool-down of the battery cells. Accordingly, the battery pack of the present embodiment realizes the function for binding the respective battery cells and improvement of the cooling performance for the battery cells 2 as a result of suppressing flow resistance.

According to the battery pack 1, since the heat transfer area of the side surfaces 2a and 2b of the battery cells is increased by the multiple wall-shaped projecting portions 123, 124 and 125, which carry out the function of cool-down, the cooling performance of the battery cells 2 can be increased. Since the wall-shaped projecting portions are made thinner as much as possible within a range of sufficiently carrying out the cooling performance, the heat transfer area can be increased without substantially decreasing cross sectional areas of the fluid passages 10 for the cooling fluid. As a result, it is possible to bring out the necessary cooling performance with smaller amount of the cooling fluid, with smaller amount of driving power for the fluid machine, and with lower noise. Therefore, the battery pack 1 is obtained, according to which it is possible not only to increase the cooling performance of the battery cells 2 but also to assure the strength against the binding force applied to the battery cells 2.

As a result of the above advantages, it is further possible to realize an improvement of battery lifetime, a reduction of number of the battery cells, a miniaturization of the battery pack 1 and low cost thereof.

Each of the wall-shaped projecting portions 123, 124 and 125 is arranged in the flow direction F at the interval equal to a double of the dimension of the wall-shaped projecting portion (or almost equal to the double of the dimension). According to the above structure, since the wall-shaped projecting portions 123, 124 and 125 are sprinkled in the direction F at the substantial intervals, such areas at which no wall-shaped projecting portions are formed can be sufficiently obtained at the downstream sides of the respective wall-shaped projecting portions 123, 124 and 125. Therefore, the advantages for suppressing the enlargement of the boundary layer of the cooling fluid flow (or making thinner the boundary layer of the cooling fluid flow) and the advantages for improving the heat transfer performance at the downstream sides of the respective wall-shaped projecting portions can be expected.

The wall-shaped projecting portions 123, 124 and 125 not only function as the ribs for binding the battery cells but also function as heat radiating fins. Therefore, when the thickness of the respective wall-shaped projecting portions is made as thinner as possible, the cross sectional area of the fluid passages 10 can be enlarged. In addition, heat radiating amount of each wall-shaped projecting portion 123 to 125 is increased to thereby improve the cooling performance.

When the wall-shaped projecting portions 123 to 125 are integrally formed with the outer packaging members of the battery cells 2 and 2A, the number of parts and components as well as the manufacturing cost can be reduced.

Thirteenth Embodiment

Figure 24:
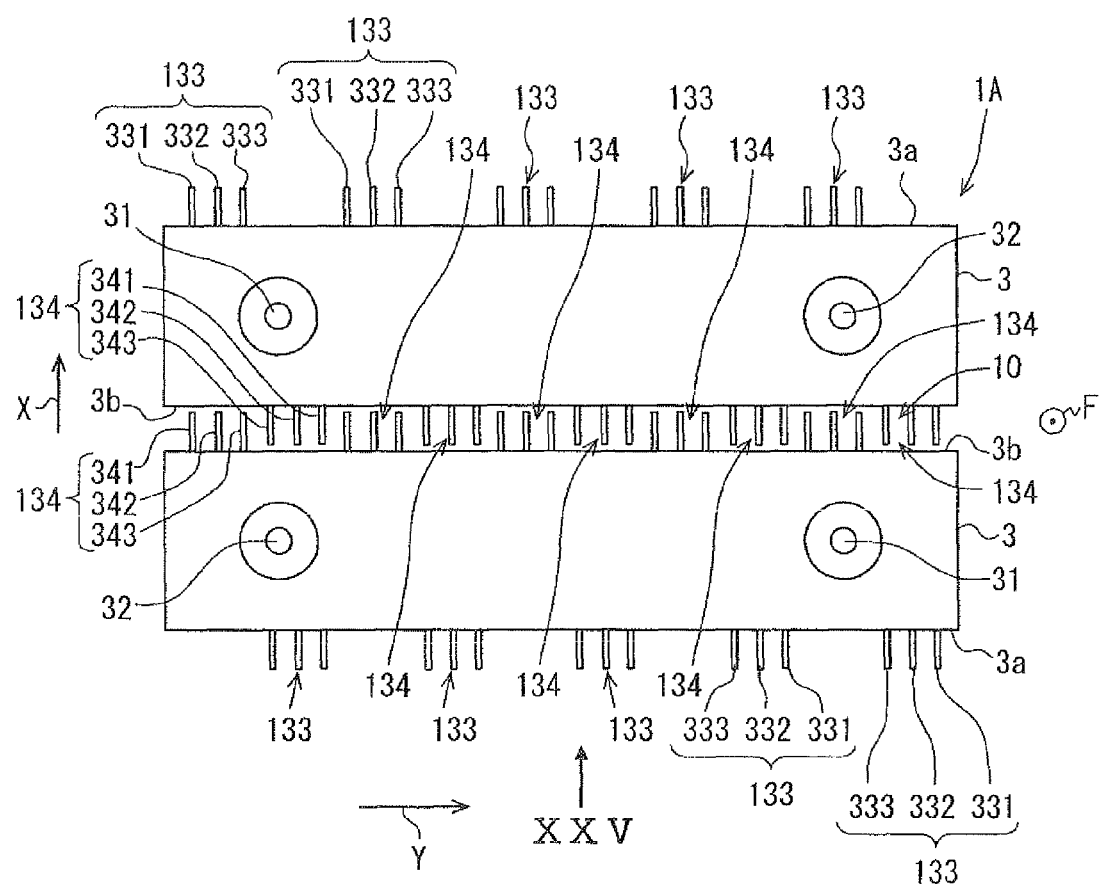
FIG. 24 is a schematic side view for explaining a layered structure of battery cells of the battery pack according to a thirteenth embodiment, when viewed the battery cells on a side from which terminals are outwardly projecting.
Figure 25:
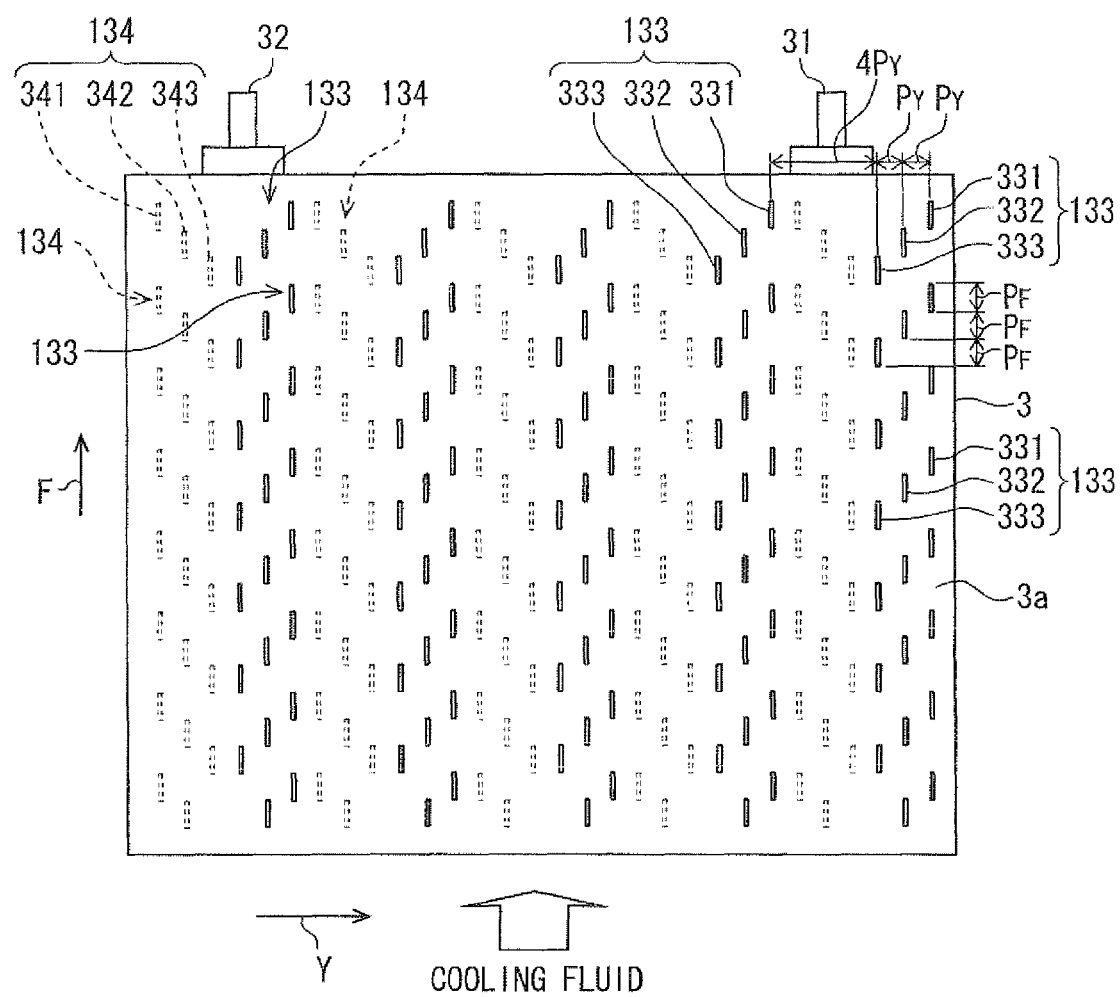
FIG. 25 is a schematic front view showing the battery cell when viewed in a direction of an arrow XXV in FIG. 24.

A battery pack 1A according to a thirteenth embodiment, which is a modification of the twelfth embodiment and in which battery cells 3 are built up, will be explained with reference to FIGS. 24 and 25. Such structures and functions, which are different from the battery pack 1 of the twelfth embodiment, will be explained. FIG. 24 is a schematic side view of neighboring two battery cells 3, when viewed from a projecting side of electric terminals, for the purpose of explaining a layered structure of the battery cells of the battery pack 1A according to the thirteenth embodiment. FIG. 25 is a schematic front view of the battery cell 3 when viewed in a direction of an arrow XXV in FIG. 24. For the purpose of easily understanding respective structures of the neighboring battery cells 3, FIG. 24 shows a condition of the battery cells 3 which are not bound to each other but separated from each other. Positive and negative electrodes 31 and 32 respectively correspond to the positive and negative electrodes 21 and 22 of the twelfth embodiment.

As shown in FIGS. 24 and 25, first line groups 133 are provided on the side surface 3a of the battery cell, wherein each first line group 133 is composed of three lines of wall-shaped projecting portions 331, 332 and 333 among multiple lines arranged in the direction Y perpendicular to the flow direction F of the cooling fluid. In other words, each of the first line groups 133 is a line group, which is composed of the line of the wall-shaped projecting portions 331, the line of the wall-shaped projecting portions 332 and the line of the wall-shaped projecting portions 333, wherein the wall-shaped projecting portions 331 to 333 are arranged in the direction Y. The multiple first line groups 133 are arranged on the side surface 3a of the battery cell in the direction Y perpendicular to the flow direction F at predetermined group intervals (dimension of $4P_Y$ in the present embodiment). Each of the first line groups 133 is arranged in an offset pattern on the side surface 3a of the battery cell.

Second line groups 134 are provided on the other side surface 3b of the battery cell, wherein each second line group 134 is composed of three lines of wall-shaped projecting portions 341, 342 and 343 among multiple lines arranged in the direction Y perpendicular to the flow direction F of the cooling fluid. Namely, each of the second line groups 134 is a line group, which is composed of the line of the wall-shaped projecting portions 341, the line of the wall-shaped projecting portions 342 and the line of the wall-shaped projecting portions 343, wherein the wall-shaped projecting portions 341 to 343 are arranged in the direction Y. The multiple second line groups 134 are arranged on the side surface 3b of the battery cell in the direction Y perpendicular to the flow direction F at predetermined group intervals (dimension of $4P_Y$ in the present embodiment). Each of the second line groups 134 is arranged in an offset pattern on the side surface 3b of the battery cell. As shown in FIG. 25, the second line groups 134 are located on the side surface 3b of the battery cell at such portions, which correspond to intermediate portions between the first line groups 133, namely at which the wall-shaped projecting portions are not provided. In other words, the locations of the respective wall-shaped projecting portions 341, 342 and 343 correspond to such locations of the wall-shaped projecting portions 331, 332 and 333 when the battery cell is rotated by 180 degrees.

According to the above structure, when the multiple battery cells 3 are built up, each of the wall-shaped projecting portions 331, 332 and 333 of the first line group 133 are brought into contact with the side surface 3a of the neighboring battery cell to thereby form the fluid passages 10 between the opposing side surfaces 3a of the battery cells. In the same manner, each of the wall-shaped projecting portions 341, 342 and 343 of the second line group 134 are brought into contact with the side surface 3b of the neighboring battery cell to thereby form the fluid passages 10 between the opposing side surfaces 3b of the battery cells. Therefore, the fluid passages 10 meandering in the flow direction F of the cooling fluid are formed by the multiple wall-shaped projecting portions 331, 332 and 333 between the side surfaces 3a of the battery cells, while the fluid passages 10 meandering in the flow direction F of the cooling fluid are formed by the multiple wall-shaped projecting portions 341, 342 and 343 between the side surfaces 3b of the battery cells.

As above, the wall-shaped projecting portions 331 to 333 and 341 to 343 are located such that each of them is brought into contact with the side surfaces 3a and 3b of the neighboring battery cells when the binding force is applied by the binding device to the battery cells in the layer direction X and thereby each of them receives the action force from the neighboring battery cells 3. Therefore, each of the wall-shaped projecting portions 331 to 333 and 341 to 343 has a function to bring out strength for resisting the binding force applied to the respective battery cells 3. In addition, the heat transfer area of the battery cell 3 is increased by bringing the wall-shaped projecting portions into contact with the cooling fluid flowing through the fluid passages 10, so that the wall-shaped projecting portions function as heat transmitting paths for radiating the heat from the battery cells 3 to the cooling fluid.

In addition, in a case that the wall-shaped projecting portions 331 to 333 and 341 to 343 as well as the outer packaging members of the battery cells 3 are made of conducting material, at least one of contacting portions (either the wall-shaped projecting portions or the outer packaging members) may be preferably coated with insulating material. The coating of the insulating material at such contacting portions may be formed by vapor deposition, coating, integral molding, and so on. According to such a structure, since the contacting portions of the neighboring battery cells 3 are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells.

Advantages of the battery pack 1A of the present embodiment will be explained. Each of the battery cells 3 forming the battery pack 1A, has the first line groups 133 on the side surface 3a of the battery cell, wherein the first line group 133 is composed of a predetermined number of the lines (for example, three lines) of the wall-shaped projecting portions among the multiple lines arranged in the direction Y perpendicular to the flow direction F. In addition, the battery cell 3 has the second line groups 134 on the other side surface 3b of the battery cell, wherein the second line group 134 is composed of a predetermined number of the lines (for example, three lines) of the wall-shaped projecting portions among the multiple lines arranged in the direction Y perpendicular to the flow direction F. The multiple first line groups 133 are located on the side surface 3a of the battery cell in the direction Y at the predetermined line intervals (dimension of $4P_Y$ in the present embodiment), while the multiple second line groups 134 are located on the side surface 3b of the battery cell in the direction Y at the predetermined line intervals (dimension of $4P_Y$ in the present embodiment). The multiple second line groups 134 are located on the side surface 3b of the battery cell at such positions, which correspond to the portions arranged in the direction Y at the predetermined line intervals (dimension of $4P_Y$ in the present embodiment) and correspond to the intermediate portions between the first line groups 133.

According to the above structure, when the multiple battery cells 3 are built up in the layer direction X, the first line groups 133 of the battery cells 3 are brought into contact with intermediate areas of the side surface 3a between the first line groups 133 of the opposing battery cell 3. On the other hand, the second line groups 134 are brought into contact with intermediate areas of the side surface 3b between the second line groups 134 of the opposing battery cell 3. According to such a layout of the first and second line groups, even when the locations of the wall-shaped projecting portions of the battery cells are not precisely manufactured, it is possible to assure the cooling performance and binding force by the respective wall-shaped projecting portions. As a result, the battery pack 1A having the desired functions can be obtained.

In addition, the first line groups 133 and the second line groups 134, which are projecting from the battery cells 3 and arranged at the predetermined line intervals, are in contact with the outer packaging members of the neighboring battery cells 3 to thereby form the fluid passages 10 between the neighboring battery cells. Therefore, even when the opposing battery cells are built up but its relative position is displaced from each other, it is possible to stably apply the binding force to the respective battery cells 3 and to surely bring out the effect for binding the respective battery cells 3.

Each of the first and second line groups 133 and 134 is composed of three lines of the wall-shaped projecting portions. At both ends of the built-up battery cells, more exactly at outer side surfaces of battery cells to which no opposing battery cell is existing, there is little distribution in the cooling density and the binding force. It is possible to realize high performance in the cooling and binding operation.

Fourteenth Embodiment

Figure 26:
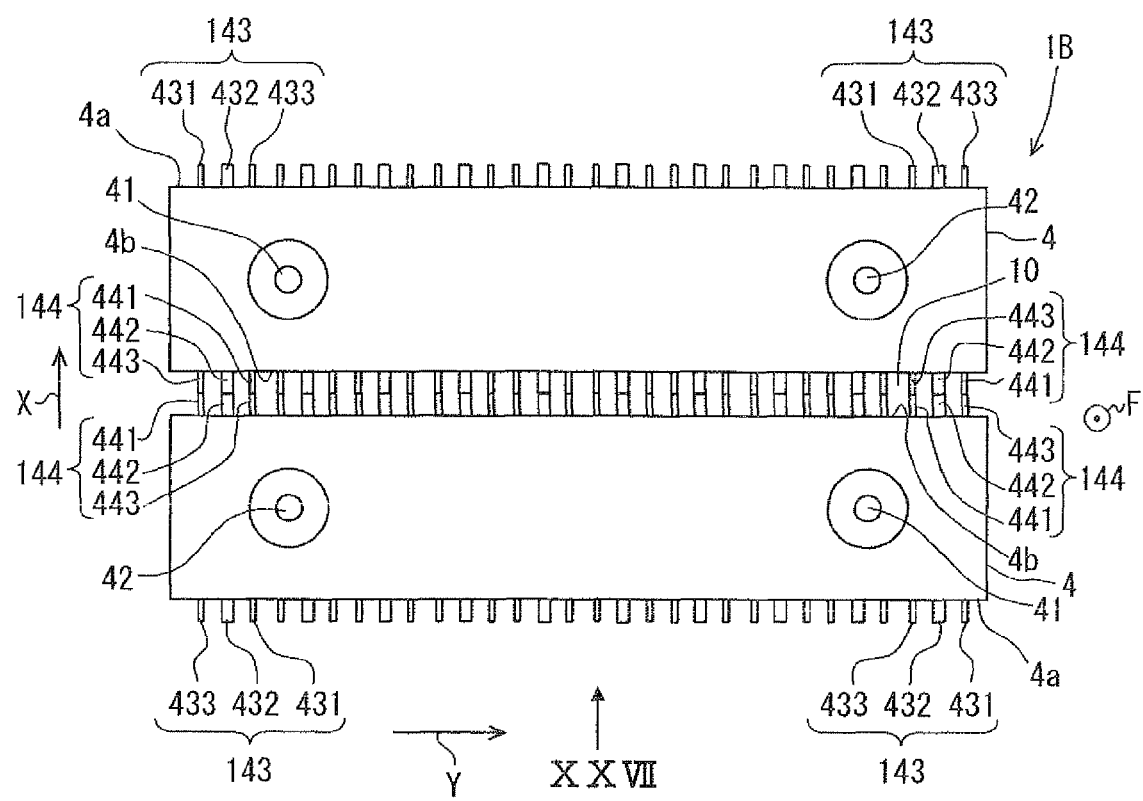
FIG. 26 is a schematic side view for explaining a layered structure of battery cells of the battery pack according to a fourteenth embodiment, when viewed the battery cells on a side from which terminals are outwardly projecting.
Figure 27:
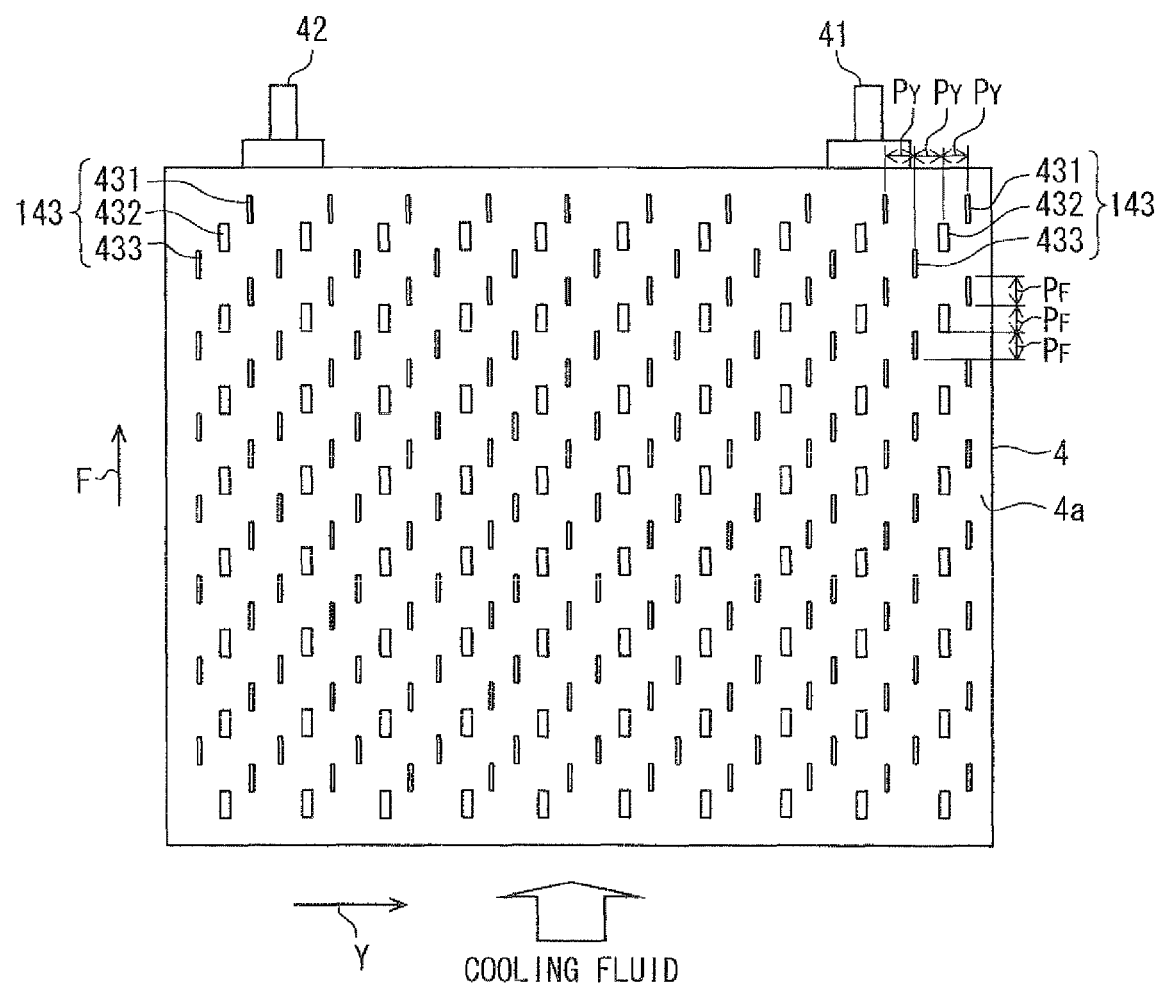
FIG. 27 is a schematic front view showing the battery cell when viewed in a direction of an arrow XXVII in FIG. 26.

A battery pack 1B according to a fourteenth embodiment, which is a modification of the twelfth embodiment and in which battery cells 4 are built up, will be explained with reference to FIGS. 26 and 27. Such structures and operations, which are different from the battery pack 1 of the twelfth embodiment, will be explained. FIG. 26 is a schematic side view of neighboring two battery cells 4, when viewed from a projecting side of electric terminals, for the purpose of explaining a layered structure of the battery cells of the battery pack 1B according to the fourteenth embodiment. FIG. 27 is a schematic front view of the battery cell 4 when viewed in a direction of an arrow XXVII in FIG. 26. Positive and negative electrodes 41 and 42 respectively correspond to the positive and negative electrodes 21 and 22 of the twelfth embodiment.

As shown in FIGS. 26 and 27, multiple projecting portions provided on the battery cell 4 include predetermined numbers of wall-shaped projecting portions 431, enlarged projecting portions 432 and wall-shaped projecting portions 433, which are respectively provided on a side surface 4a of the battery cell. The multiple projecting portions further include predetermined numbers of wall-shaped projecting portions 441, enlarged projecting portions 442 and wall-shaped projecting portions 443, which are respectively provided on the other side surface 4b of the battery cell. Each of first line groups 143 is composed of the wall-shaped projecting portions 431, the enlarged projecting portions 432 and the wall-shaped projecting portions 433. Each of second line groups 144 is composed of the wall-shaped projecting portions 441, the enlarged projecting portions 442 and the wall-shaped projecting portions 443. Locations of the wall-shaped projecting portions 431, the enlarged projecting portions 432 and the wall-shaped projecting portions 433 correspond to those of the wall-shaped projecting portions 123, 124 and 125 of the twelfth embodiment. Locations of the wall-shaped projecting portions 441, the enlarged projecting portions 442 and the wall-shaped projecting portions 443 correspond to those of the wall-shaped projecting portions 431, the enlarged projecting portions 432 and the wall-shaped projecting portions 433, when the battery cell is rotated by 180 degrees.

As shown in FIG. 26, at least one of lines (for example, the lines for the enlarged projecting portions 432 and 442), among the multiple lines which respectively form the first and second line groups 143 and 144 and arranged in the direction Y perpendicular to the flow direction F of the cooling fluid, is brought into contact with the neighboring battery cell 4 to thereby form the fluid passages 10. The enlarged projecting portions 432 and 442, which form the above one line, have thickness larger than those of the wall-shaped projecting portions 431, 433, 441 and 443, which are not in contact with the neighboring battery cells.

Each of the enlarged projecting portions 432 is located at an intermediate position of the respective wall-shaped projecting portions 431 and 433 in the directions F and Y. When the multiple battery cells 4 are built up to form the battery pack 1B, only the enlarged projecting portions 432 are brought into contact with each other between the neighboring battery cells 4, to thereby form the fluid passages having a predetermined shape between the side surfaces 4a of the battery cells. In the same manner, each of the enlarged projecting portions 442 is located at an intermediate position of the respective wall-shaped projecting portions 441 and 443 in the directions F and Y. When the multiple battery cells 4 are built up to form the battery pack 1B, only the enlarged projecting portions 442 are brought into contact with each other between the neighboring battery cells 4, to thereby form the fluid passages having a predetermined shape between the side surfaces 4b of the battery cells. Namely, each of the enlarged projecting portions 432 is formed on the side surface 4a of the battery cell at such a position at which each enlarged projecting portion 432 is brought into contact with the respective enlarged projecting portion 432 of the neighboring battery cell 4. Likewise, each of the enlarged projecting portions 442 is formed on the side surface 4b of the battery cell at such a position at which each enlarged projecting portion 442 is brought into contact with the respective enlarged projecting portion 442 of the neighboring battery cell 4.

According to the above structure, top surfaces of the enlarged projecting portions 432 as well as top surfaces of the enlarged projecting portions 442 are so located that they are brought into contact with each other between the neighboring battery cells 4, respectively. Each of the enlarged projecting portions 432 and 442 receives the action force from the respective enlarged projecting portions 432 and 442 of the neighboring battery cells 4, when the binding force in the layer direction X is applied to the battery cells by the binding device. Each of the enlarged projecting portions 432 and 442 has a function of bringing out the strength for resisting the binding force applied to the respective battery cells 4. In addition, the heat transfer area of the battery cell 4 is increased by bringing the wall-shaped projecting portions into contact with the cooling fluid flowing through the fluid passages 10, so that the wall-shaped projecting portions function as heat transmitting paths for radiating the heat from the battery cells 4 to the cooling fluid.

The wall-shaped projecting portions 431, the enlarged projecting portions 432 and the wall-shaped projecting portions 433 are located on the side surface 4a of the battery cell in an offset pattern, while the wall-shaped projecting portions 441, the enlarged projecting portions 442 and the wall-shaped projecting portions 443 are located on the side surface 4b of the battery cell in an offset pattern.

In addition, in a case that the enlarged projecting portions 432 and 442, which are in contact with each other, are made of conducting material, at least one of contacting portions of the enlarged projecting portions 432 and 442 to be in contact with each other may be preferably coated with insulating material. The coating of the insulating material at such contacting portions may be formed by vapor deposition, coating, integral molding, and so on. According to such a structure, since the contacting portions of the neighboring battery cells 4 are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells.

Advantages of the battery pack 1B of the present embodiment will be explained. According to the battery pack 1B, at least one of the lines of the respective line groups (the first and second line groups 143 and 144) arranged in the direction Y perpendicular to the flow direction F of the cooling fluid is brought into contact with the neighboring battery cell 4 to form the fluid passages 10. The enlarged projecting portions 432 and 442, which form the above one line, have thickness larger than those of the wall-shaped projecting portions 431, 433, 441 and 443, which are not in contact with the neighboring battery cells.

According to the above structure, since the multiple enlarged projecting portions 432 and 442, which have the larger thickness than the wall-shaped projecting portions and which are provided on the side surfaces 4a and 4b of the battery cell, are divided into a necessary number of projecting portions, the projecting portions can carryout the function of stably applying the necessary binding force to the battery cells 4. In addition, since the enlarged projecting portions 432 and 442 receive the binding force, the multiple wall-shaped projecting portions 431, 433, 441 and 443 can be made as thinner as possible in a range of sufficiently carrying out the cooling performance. Since it is possible to enlarge the heat transfer area without decreasing the cross sectional area of the fluid passages, it is possible to bring out the necessary cooling performance with smaller amount of the cooling fluid, with smaller amount of driving power for the fluid machine and with lower noise.

Fifteenth Embodiment

Figure 28:
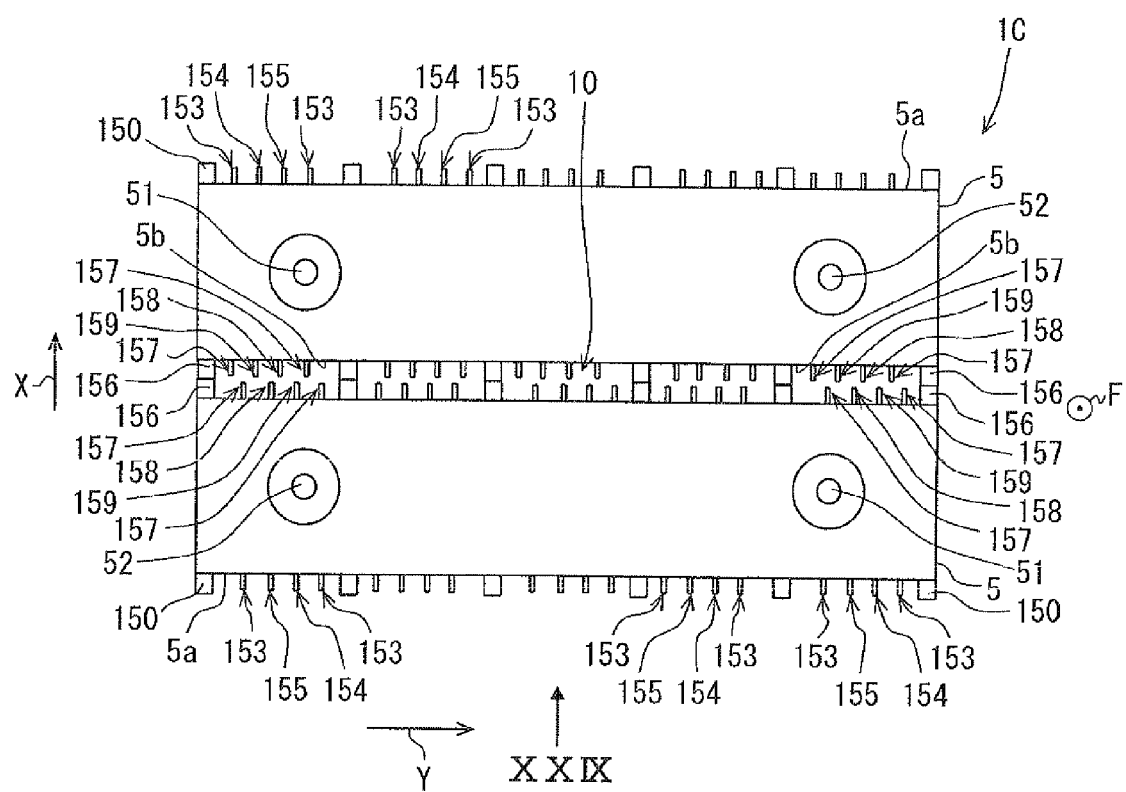
FIG. 28 is a schematic side view for explaining a layered structure of battery cells of the battery pack according to a fifteenth embodiment, when viewed the battery cells on a side from which terminals are outwardly projecting.
Figure 29:
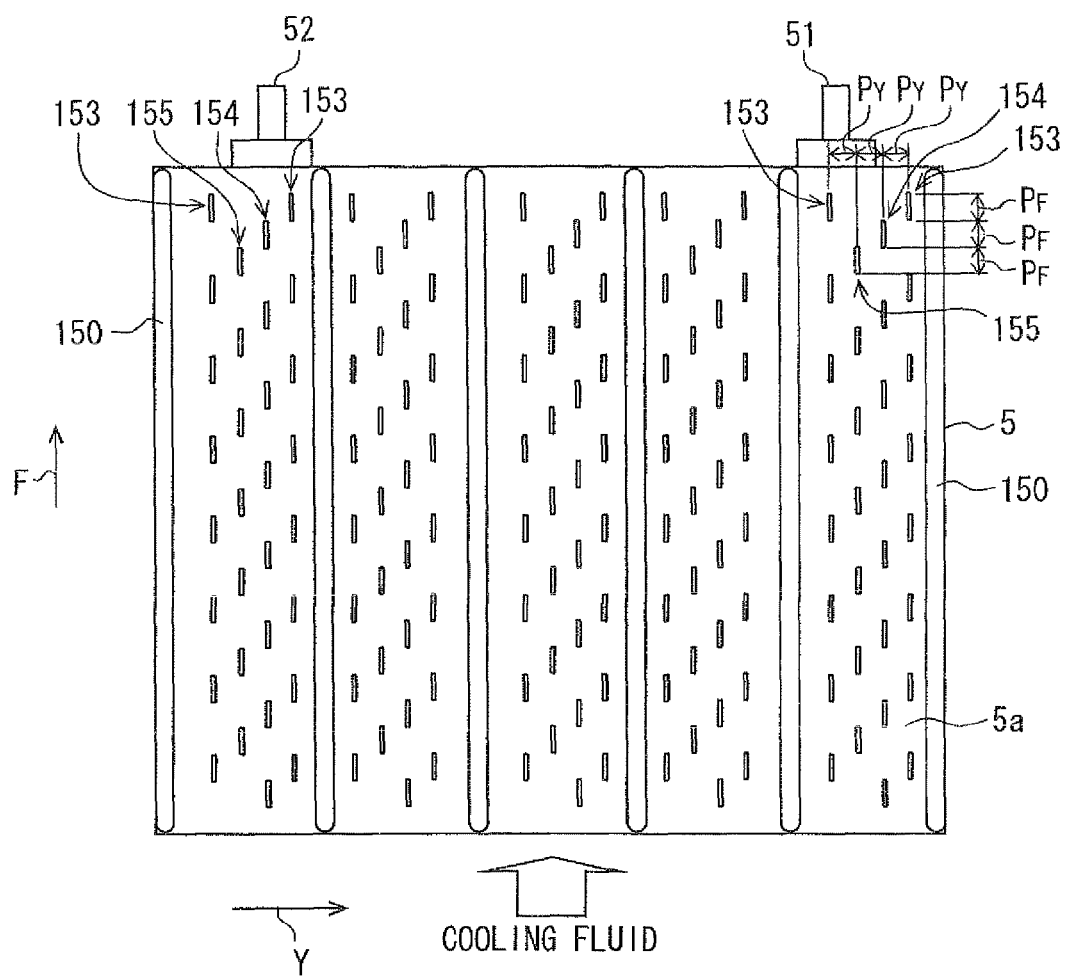
FIG. 29 is a schematic front view showing the battery cell when viewed in a direction of an arrow XXIX in FIG. 28.

A battery pack 10 according to a fifteenth embodiment, which is a modification of the twelfth embodiment and in which battery cells 5 are built up, will be explained with reference to FIGS. 28 and 29. Such structures and advantages, which are different from the battery pack 1 of the twelfth embodiment, will be explained. FIG. 28 is a schematic side view of neighboring two battery cells 5, when viewed from a projecting side of electric terminals, for the purpose of explaining a layered structure of the battery cells of the battery pack 1C according to the fifteenth embodiment. FIG. 29 is a schematic front view of the battery cell 5 when viewed in a direction of an arrow XXIX in FIG. 28. Positive and negative electrodes 51 and 52 respectively correspond to the positive and negative electrodes 21 and 22 of the twelfth embodiment.

As shown in FIGS. 28 and 29, the layered structure of the battery cells 5 differs from that of the battery cells 2 of the twelfth embodiment in that, when the binding force is applied to the battery pack by the binding device in the layer direction X, top surfaces of respective wall-shaped projecting portions 153, 154 and 155 as well as the wall-shaped projecting portions 157, 158 and 159 of the neighboring battery cells 5 are not opposing to each other but displaced from each other in the direction Y. In addition, the battery pack 10 differs from that of the twelfth embodiment in that enlarged projecting portions 150 and 156 are provided on side surfaces 5a and 5b of the battery cell in a form of a rail shape extending in the flow direction F of the cooling fluid, so that the enlarged projecting portions 150 and 156 are brought into contact with each other between the neighboring battery cells. Therefore, even in a case that height of the wall-shaped projecting portions 153 to 155 or height of the wall-shaped projecting portions 157 to 159 is larger than that of the enlarged projecting portions 150 or 156, the wall-shaped projecting portions 150 and 156 do not interfere with each other.

The enlarged projecting portions 150 and 156 extend in the flow direction F of the cooling fluid along a whole length of the side surfaces 5a and 5b of the battery cells. The multiple enlarged projecting portions 150 and 156 are respectively arranged at certain intervals in the direction Y perpendicular to the flow direction F. When the binding force is applied to the respective battery cells 5 by the binding device in the layer direction X, the respective enlarged projecting portions 150 and 156 are brought into contact with the enlarged projecting portions of the neighboring battery cell so as to receive the action force from the neighboring battery cell 5. In addition, the width dimension of the respective enlarged projecting portions 150 and 156 in the direction Y (in which the multiple wall-shaped projecting portions are arranged) is made larger than the thickness dimension of the wall-shaped projecting portions. In other words, since the thickness of the enlarged projecting portions 150 and 156 is larger than that of the wall-shaped projecting portions 153 to 155 and 157 to 159, the battery cells have larger strength so that the respective enlarged projecting portions are hardly deformed by the force acting in the layer direction X.

As shown in FIGS. 28 and 29, multiple lines (six lines in the present embodiment) of the enlarged projecting portions 150 and 156 are respectively arranged at the predetermined intervals in the direction Y (in which the multiple wall-shaped projecting portions are arranged). In each of areas between the enlarged projecting portions 150, multiple lines (four lines in the present embodiment) of the wall-shaped projecting portions 153 to 155 are arranged, wherein the lines of the wall-shaped projecting portions 153 to 155 are gradually displaced in the flow direction F. Namely, a number of the lines for the enlarged projecting portions 150 is smaller than a number of the lines for the wall-shaped projecting portions 153 to 155 arranged in the direction Y. Therefore, the number of the enlarged projecting portions 150 per unit area of the side surface 5a of the battery cell is smaller than the number of the wall-shaped projecting portions 153 to 155 per the unit area. In the same manner, in each of areas between the enlarged projecting portions 156, multiple lines (four lines in the present embodiment) of the wall-shaped projecting portions 157 to 159 are arranged, wherein the lines of the wall-shaped projecting portions 157 to 159 are gradually displaced in the flow direction F. Namely, a number of the lines for the enlarged projecting portions 156 is smaller than a number of the lines for the wall-shaped projecting portions 157 to 159 arranged in the direction Y. Therefore, the number of the enlarged projecting portions 156 per unit area of the side surface 5b of the battery cell is smaller than the number of the wall-shaped projecting portions 157 to 159 per the unit area.

In addition, since the enlarged projecting portions 150 and 156 are so made that the thickness thereof in the direction Y is larger, when the enlarged projecting portions are brought into contact with the enlarged projecting portions provided on the neighboring battery cell 5, the enlarged projecting portions 150 and 156 have the function of bringing out the strength against the force in the compression direction. Furthermore, the wall-shaped projecting portions 153 to 155 and 157 to 159 respectively provided in the areas between the enlarged projecting portions 150 and 156 have the function for increasing the heat transfer area in the fluid passages of the cooling fluid between the neighboring battery cells 5, to thereby increase the heat radiating performance.

The enlarged projecting portions 150 and the wall-shaped projecting portions 153 to 155 as well as the enlarged projecting portions 156 and the wall-shaped projecting portions 157 to 159 are evenly arranged in the direction Y, which is perpendicular to the flow direction F, along the whole area of the side surface of the battery cell. The wall-shaped projecting portions may be so formed that they are brought into contact with each other between the neighboring battery cells 5 or may be separated from each other.

The enlarged projecting portions 150 and the wall-shaped projecting portions 153 to 155 as well as the enlarged projecting portions 156 and the wall-shaped projecting portions 157 to 159 may be integrally formed with the outer packaging members of the battery cells 5. For example, in a case that the outer packaging member is composed of a metal casing (aluminum), the enlarged projecting portions as well as the wall-shaped projecting portions can be integrally formed with such outer packaging member by a machining process, in which the metal is chipped off.

Alternatively, the enlarged projecting portions 150 and 156 may be integrally formed with the outer packaging member of the battery cell 5, while the wall-shaped projecting portions 153 to 155 and 157 to 159 may be formed on metal plate members, which are separate members from the battery cell 5. In each of the metal plate members, the wall-shaped projecting portions 153 to 155 or 157 to 159 as well as multiple rectangular and slender openings, through which the enlarged projecting portions 150 or 156 pass, are formed by press working or the like. In other words, each of the metal plate members is a metal plate having fins and openings, through which all of the enlarged projecting portions 150 or 156 pass.

The plate member may be integrally fixed to the side surface 5a of the battery cell perpendicular to the layer direction X, for example, by integral molding process. The outer packaging member, with which the enlarged projecting portions 150 and 156 are integrally formed, may be made of any kind of resin having insulating performance.

Further alternatively, the multiple wall-shaped projecting portions 153 to 155 and 157 to 159 may be provided on the outer packaging members of the battery cell 5 in the form of fins, while the enlarged projecting portions 150 and 156 may be formed in plate members, which are separate from the battery cell 5. Furthermore, the enlarged projecting portions and the wall-shaped projecting portions may be formed on the common member. The common member may be a plate member separate from the battery cell 5.

In addition, in a case that the enlarged projecting portions 150 and 156, which are respectively in contact with each other, are made of conducting material, at least one of contacting portions of the enlarged projecting portions 150 and 156 to be in contact with each other may be preferably coated with insulating material. The coating of the insulating material at such contacting portions may be formed by vapor deposition, coating, integral molding, and so on. According to such a structure, since the contacting portions of the neighboring battery cells 5 are in contact with each other via the coating of the insulating material, it is possible to assure the electrical insulation between the battery cells 5 and thereby to assure the exhibition of the battery performance as well as the electrical safety. It is also possible to suppress corrosion of such portions made of the conducting material due to electric potential difference between the neighboring battery cells 5.

Advantages of the battery pack 1C of the present embodiment will be explained. According to the battery pack 1C, the multiple enlarged projecting portions 150 and 156 are provided on the side surfaces 5a and 5b of the battery cell in such a manner that the enlarged projecting portions are arranged at the intervals in the direction Y perpendicular to the flow direction F so as to form the multiple lines and that the enlarged projecting portions are brought into contact with each other between the neighboring battery cells 5 so as to receive the acting force from the neighboring battery cell. The multiple wall-shaped projecting portions 153 to 155 or 157 to 159 are arranged in the respective areas between the enlarged projecting portions 150 or the enlarged projecting portions 156. The outside dimension of the enlarged projecting portions 150 and 156 in the direction Y perpendicular to the flow direction F is made larger than the thickness dimension of the wall-shaped projecting portions 153 to 155 and 157 to 159. According to the above structure, the necessary number of the enlarged projecting portions 150 and 156 are provided on the side surfaces 5a and 5b of the battery cell, wherein the enlarged projecting portions are dispersed at the necessary intervals, so that the battery pack can bring out the function of stably applying the necessary binding force to the battery cells 5.

Sixteenth Embodiment

Figure 30:
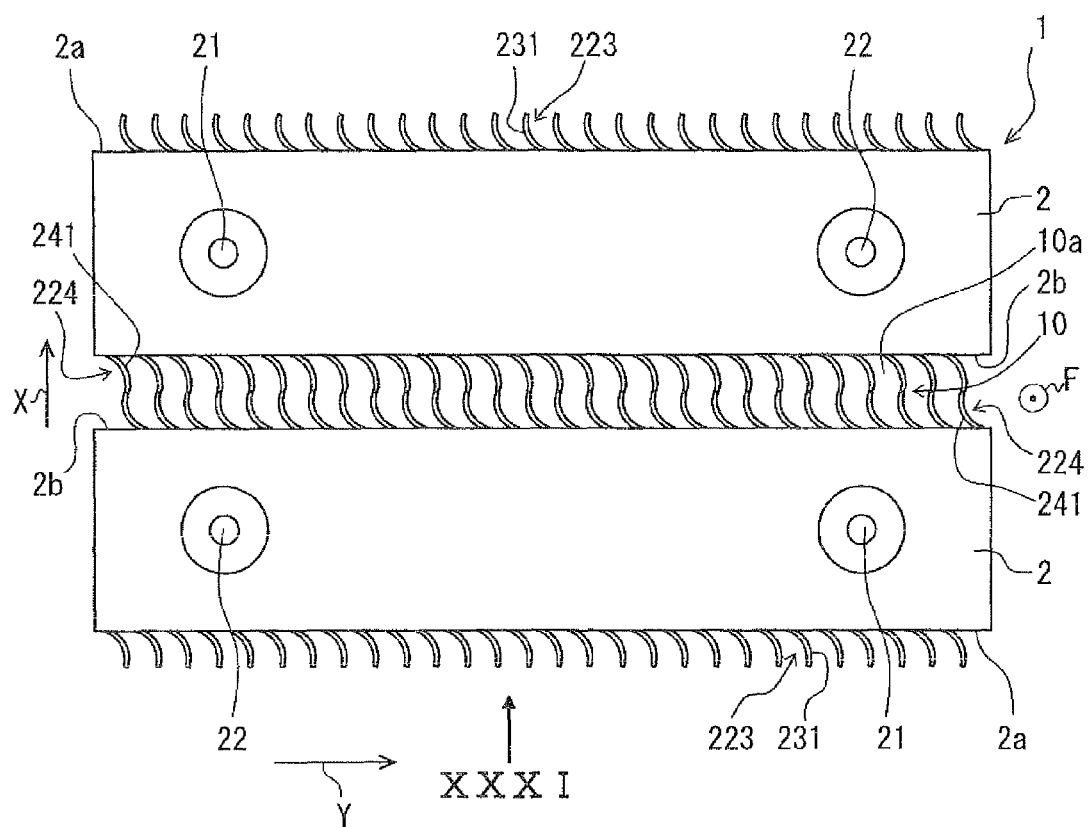
FIG. 30 is a schematic side view for explaining a layered structure of battery cells of the battery pack according to a sixteenth embodiment, when viewed the battery cells on a side from which terminals are outwardly projecting.
Figure 31:
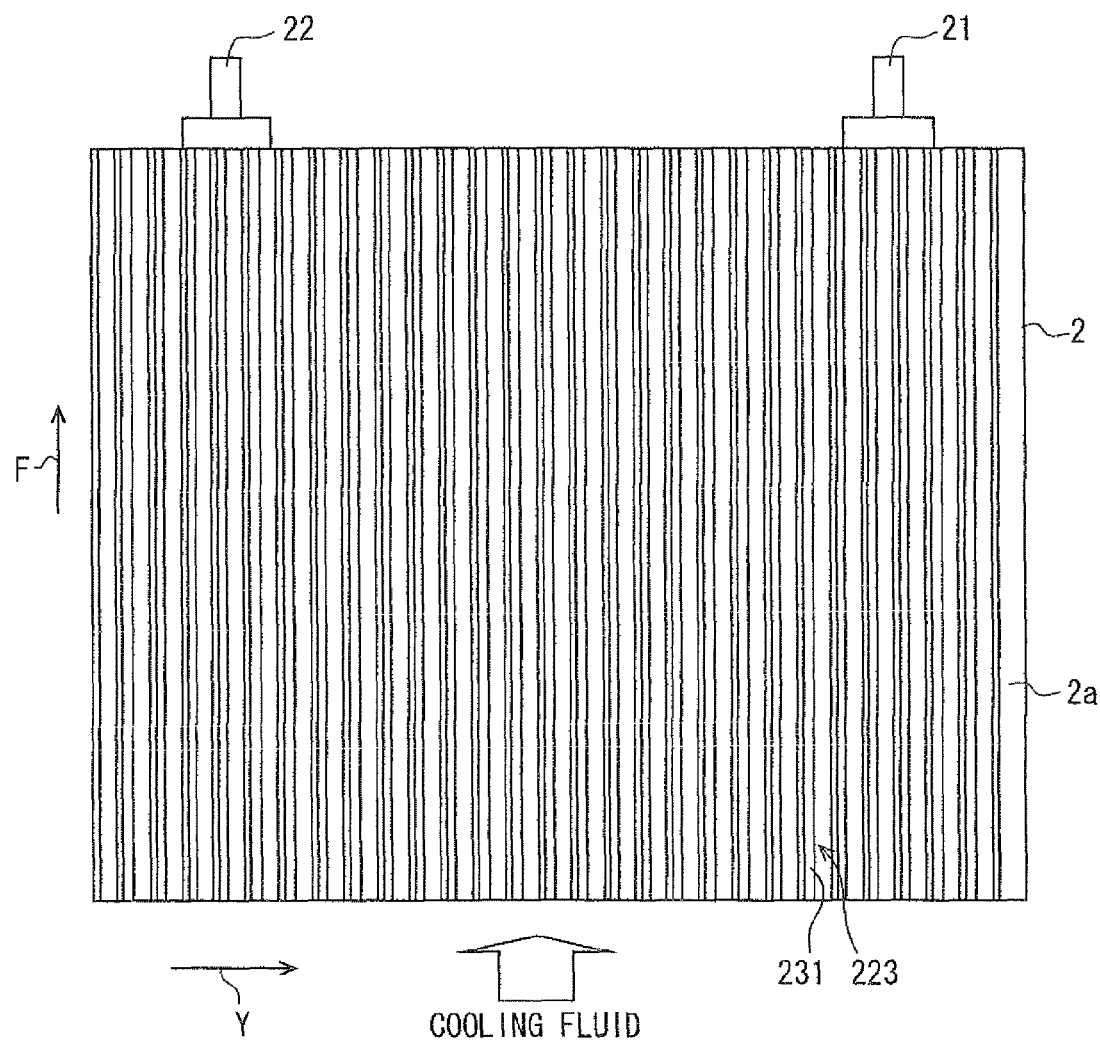
FIG. 31 is a schematic front view showing the battery cell when viewed in a direction of an arrow XXXI in FIG. 30.

A sixteenth embodiment of the present invention will be explained with reference to FIGS. 30 and 31. FIG. 30 is a schematic side view of neighboring two battery cells 2, when viewed from a projecting side of electric terminals, for the purpose of explaining a layered structure of the battery cells of the battery pack 1 according to the sixteenth embodiment. FIG. 31 is a schematic front view of the battery cell 2 when viewed in a direction of an arrow XXXI in FIG. 30. FIG. 30 shows only two battery cells 2 for the purpose of easily understanding the invention, although the battery pack 1 is composed of a larger number of battery cells 2.

As shown in FIGS. 30 and 31, multiple wall-shaped projecting portions 223 and 224, which extend in the flow direction F of the cooling fluid, are respectively provided on side surfaces 2a and 2b of the battery cell, wherein the side surfaces 2a and 2b are perpendicular to the layer direction X. The multiple wall-shaped projecting portions 223 and 224 are arranged at predetermined intervals in the direction Y perpendicular to the flow direction F of the cooling fluid.

Each of the wall-shaped projecting portions 223 and 224, which are provided on the side surfaces 2a and 2b of the battery cell perpendicular to the layer direction X, is formed in a rail shape extending in the flow direction F of the cooling fluid along a whole area of the side surfaces 2a and 2b in the same direction.

The multiple wall-shaped projecting portions 223 are brought into contact with the wall-shaped projecting portions 223 of the neighboring battery cell 2, to thereby form fluid passages 10 between the opposing side surfaces 2a and 2b of the battery cells. In the same manner, the multiple wall-shaped projecting portions 224 are brought into contact with the wall-shaped projecting portions 224 of the neighboring battery cell 2, to thereby form fluid passages 10 between the opposing side surfaces 2a and 2b of the battery cells. Namely, the respective wall-shaped projecting portions 223 are provided on the side surface 2a at such positions, at which the respective wall-shaped projecting portions 223 are brought into contact with the wall-shaped projecting portions 223 of the neighboring battery cell 2, while the respective wall-shaped projecting portions 224 are provided on the side surface 2b at such positions, at which the respective wall-shaped projecting portions 224 are brought into contact with the wall-shaped projecting portions 224 of the neighboring battery cell 2.

Each of the wall-shaped projecting portions 223 has a curved portion 231 which is bent in an arc shape, so that the wall-shaped projecting portion 223 is a fin having an arched cross section as a whole or as a part thereof. In the same manner, each of the wall-shaped projecting portions 224 has a curved portion 241 which is bent in an arc shape, so that the wall-shaped projecting portion 224 is a fin having an arched cross section as a whole or as a part thereof. In addition, respective forward portions of the wall-shaped projecting portions 223 and 224 are brought into contact with each other, and the respective curved portions 231 and 241 are bulging in reversed directions from each other in spaces between the side surfaces of the neighboring battery cells, to thereby divide the fluid passage 10 into small passages 10a.

As above, the wall-shaped projecting portions 223 and 224 are respectively brought into contact with the wall-shaped projecting portions 223 and 224 provided on the neighboring battery cells 2 to thereby form the fluid passages 10 between the side surfaces 2a and 2b of the opposing battery cells. In addition, each of the wall-shaped projecting portions 223 and 224 has the curved portion 231 and 241, which is bent in a way of describing an arc around a virtual axis parallel to the flow direction F of the cooling fluid. The wall-shaped projecting portions 223 and 224 respectively divide the fluid passage 10 so as to define multiple small passages 10a of the arc shape in its cross section.

The respective wall-shaped projecting portions 223 and 224 are so located that they are brought into contact with the wall-shaped projecting portions 223 and 224 of the neighboring battery cells 2, respectively, when the binding force in the layer direction X is applied to the battery pack by the binding device. Each of the wall-shaped projecting portions 223 and 224 receives the action force from the neighboring battery cells 2. The multiple wall-shaped projecting portions 223 and 224 have the function of bringing out the strength for resisting the binding force applied to the respective battery cells 2. In addition, the heat transfer area of the battery cell 2 is increased by bringing the wall-shaped projecting portions into contact with the cooling fluid flowing through the fluid passages 10, so that the wall-shaped projecting portions function as heat transmitting paths for radiating the heat from the battery cells 2 to the cooling fluid.

The respective wall-shaped projecting portions 223 and 224 of the present embodiment are integrally formed with the outer packaging members of the battery cells 2. For example, in a case that the outer packaging member is composed of a metal casing (aluminum), the wall-shaped projecting portions can be integrally formed with such outer packaging member by a machining process, in which the metal is chipped off. According to such a structure, it is possible to reduce a number of parts and components as well as a manufacturing cost.

The wall-shaped projecting portions 223 and 224 may be alternatively formed on a plate member, which is a separate member from the outer packaging member of the battery cells 2. In this case, the plate member may be a metal plate having fins, which is manufactured by a chip-off machining process. The plate member is fixed to the side surface of the battery cell, so that the wall-shaped projecting portions 223 and 224 projecting from the side surface of the battery cell can be formed.

In addition, in a case that the wall-shaped projecting portions 223 and 224 are made of conducting material, at least one of contacting portions of the wall-shaped projecting portions 223 as well as at least one of contacting portions of the wall-shaped projecting portions 224 may be preferably coated with insulating material. The coating of the insulating material at such contacting portions may be formed by vapor deposition, coating, integral molding, and so on. According to such a structure, since the contacting portions of the neighboring battery cells 2 are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells.

Advantages of the battery pack 1 of the present embodiment will be explained. The battery pack 1 has the multiple wall-shaped projecting portions 223 and 224, which extend in the flow direction F of the cooling fluid and which are arranged on the side surfaces 2a and 2b of the battery cells perpendicular to the layer direction X at the predetermined intervals. The wall-shaped projecting portions 223 and 224 are brought into contact with the wall-shaped projecting portions 223 and 224 of the neighboring battery cells 2, to thereby form the fluid passages 10 between the side surfaces of the opposing battery cells (between the side surfaces 2a as well as between the side surfaces 2b). In addition, each of the wall-shaped projecting portions 223 and 224 has the curved portion 231 and 241, which is bent in the way of describing the arc around the virtual axis parallel to the flow direction F of the cooling fluid.

According to the above structure, since the wall-shaped projecting portions 223 and 224 are brought into contact with the neighboring battery cells 2 to form the fluid passages 10 between the side surfaces of the battery cells, it is possible to stably apply the binding force to the respective battery cells 2 and to form the passages for the cooling operation. In addition, since each of the wall-shaped projecting portions 223 and 224 has the curved portion 231 and 241, which is bent in the way of describing the arc around the virtual axis parallel to the flow direction F of the cooling fluid, the heat transfer area for the cooling function of the battery cells 2 by the multiple wall-shaped projecting portions 223 and 224 is increased. The cooling performance of the battery cells 2 is thereby improved. As above, it is possible to realize not only the function for binding the respective battery cells 2 but also the function for improving the cooling performance by suppressing the flow resistance. Furthermore, since the wall-shaped projecting portions 223 and 224 are made of plates and can be made as thinner as possible within a range of sufficiently carrying out the cooling performance, it is possible to enlarge the heat transfer area without decreasing the cross sectional area of the fluid passages 10. As a result, it is possible to bring out the necessary cooling performance with smaller amount of the cooling fluid, with smaller amount of driving power for the fluid machine and with lower noise.

According to the above structure and function, it is possible to elongate the lifetime of the battery, to reduce the number of the battery cells, to miniaturize the battery pack 1 and to reduce the manufacturing cost.

According to the battery pack 1, since the heat transfer area for bringing out the cooling performance at the side surfaces of the battery cells 2 can be increased by the wall-shaped projecting portions extending in the flow direction F of the cooling fluid and arranged in the direction Y perpendicular to the flow direction F, the cooling performance can be increased.

In addition, the multiple projecting portions 223 and 224 are projecting from the respective neighboring battery cells 2 and brought into contact with the respective projecting portions 223 and 224 of the opposing battery cells, to thereby form the fluid passages 10 between the opposing side surfaces of the battery cells. According to the structure, since the multiple projecting portions 223 and 224 projecting from the respective battery cells 2 are brought into contact with each other in the fluid passages 10 between the opposing battery cells 2, the heat transfer area of the fluid passages 10 is increased to thereby increase the cooling performance of the battery cells 2.

In addition, the wall-shaped projecting portions 223 and 224, each of which has the curved portion 231 or 241, not only have the function of increasing the heat transfer area as the fins but also assure the strength equal to those of the fins having no curved portion. Accordingly, the wall-shaped projecting portions have the function of the binding ribs for assuring the necessary strength resisting the binding force. The battery pack, which hardly receives influence of vibration and so on, can be provided. It is, therefore, possible not only to increase the cooling performance of the battery cells 2 but also to assure the strength against the binding force applied to the battery cells 2.

Since the wall-shaped projecting portions 223 and 224 have the curved portions 231 and 241, the wall-shaped projecting portions 223 and 224 can be made as thinner as possible within the range of sufficiently carrying out the cooling performance. Therefore, it is possible to enlarge the heat transfer area without decreasing the cross sectional area of the fluid passage 10. As a result, it is possible to bring out the necessary cooling performance with smaller amount of the cooling fluid, with smaller amount of driving power for the fluid machine and with lower noise.

Seventeenth Embodiment

Figure 32:
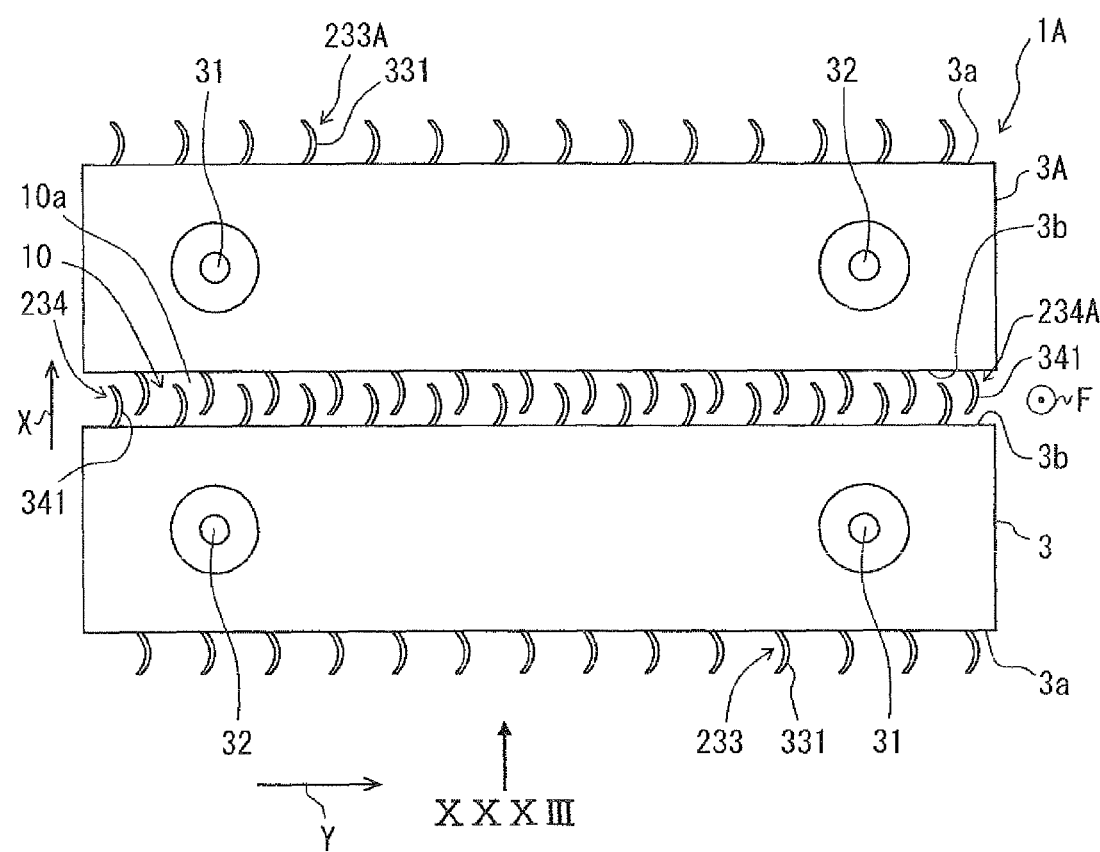
FIG. 32 is a schematic side view for explaining a layered structure of battery cells of the battery pack according to a seventeenth embodiment, when viewed the battery cells on a side from which terminals are outwardly projecting.
Figure 33:
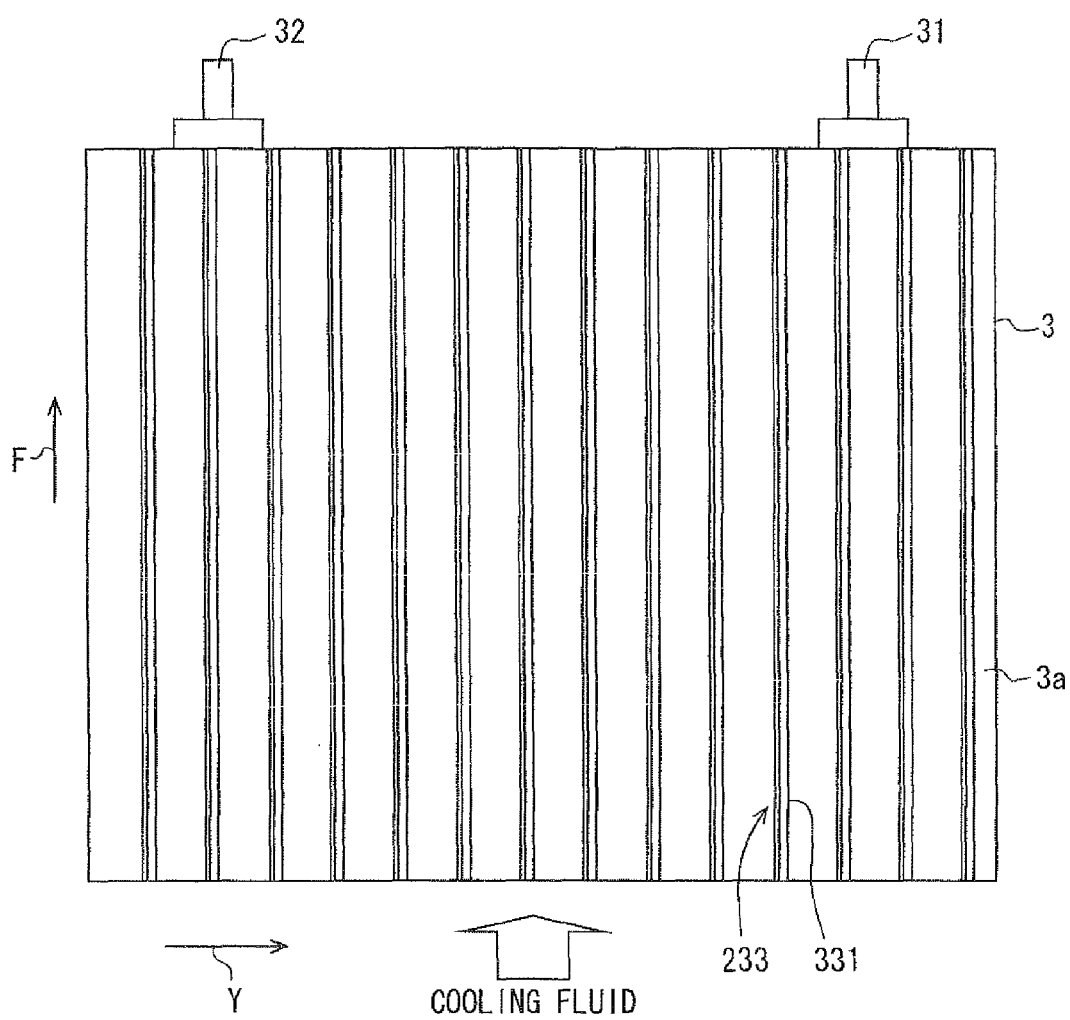
FIG. 33 is a schematic front view showing the battery cell when viewed in a direction of an arrow XXXIII in FIG. 32.

Battery cells 3 of a seventeenth embodiment, which is a modification of the sixteenth embodiment, as well as a battery pack 1A using the battery cells 3 will be explained with reference to FIGS. 32 and 33. Such structures and functions different from the sixteenth embodiment will be hereinafter explained. FIG. 32 is a schematic side view of neighboring two battery cells 3 and 3A, when viewed from a projecting side of electric terminals, for the purpose of explaining a layered structure of the battery cells 3 and 3A of the battery pack 1 according to the seventeenth embodiment. FIG. 33 is a schematic front view of the battery cell 3 when viewed in a direction of an arrow XXXIII in FIG. 32. FIG. 32 shows a condition in which the battery cell 3 and the battery cell 3A are not bound to but separated from each other, for the purpose of easily understanding the respective structures of the battery cells 3 and 3A. Positive electrodes 31 and negative electrodes 32 respectively correspond to the positive and negative electrodes 21 and 22 of the sixteenth embodiment.

As shown in FIG. 32, the layered structure of the battery cells 3 and 3A differs from that of the battery cells 2 shown in FIG. 30 in that, when the binding force in the layer direction X is applied by the binding device, neither the wall-shaped projecting portions 234 and 234A nor the wall-shaped projecting portions 233 and 233A are brought into contact with each other as in the manner of the sixteenth embodiment, but the respective wall-shaped projecting portions 233, 233A, 234 and 234A are brought into contact with side surfaces of the battery cells, respectively, so as to bring out the strength against the binding force. More exactly, as shown in FIG. 32, the wall-shaped projecting portions 233 and 233A as well as the wall-shaped projecting portions 234 and 234A are respectively provided on the side surfaces of the battery cells in such a manner that bulging directions of the respective curved portions 331 and 341 are reversed to each other between the battery cell 3 and the battery cell 3A. Namely, the battery cell 3 and the battery cell 3A have the different structures from each other.

Each of the wall-shaped projecting portions 233 and 233A are brought into contact with the side surfaces 3a of the neighboring battery cells to form the fluid passages 10 between the opposing side surfaces 3a of the battery cells. In the same manner, each of the wall-shaped projecting portions 234 and 234A are brought into contact with the side surfaces 3b of the neighboring battery cells to form the fluid passages 10 between the opposing side surfaces 3b of the battery cells. Namely, the wall-shaped projecting portions 233 and 233A are so arranged as to alternately divide the fluid passage 10 formed between the side surfaces 3a of the battery cells, to thereby define the multiple small passages 10a arranged in the direction Y. In the same manner, the wall-shaped projecting portions 234 and 234A are so arranged as to alternately divide the fluid passage 10 formed between the side surfaces 3b of the battery cells, to thereby define the multiple small passages 10a arranged in the direction Y.

As above, the wall-shaped projecting portions 233 and 233A are brought into contact with the side surfaces 3a of the neighboring battery cells to form the fluid passage 10 defining the multiple small passages 10a between the opposing side surfaces 3a of the battery cells. And a curved portion 331, which is bent in a way of describing an arc around a virtual axis parallel to the flow direction F of the cooling fluid, is formed in each of the wall-shaped projecting portions 233 and 233A. Each of the curved portions 331 is bulging in the same direction. In the same manner, the wall-shaped projecting portions 234 and 234A are brought into contact with the side surfaces 3b of the neighboring battery cells to form the fluid passage 10 defining the multiple small passages 10a between the opposing side surfaces 3b of the battery cells. And a curved portion 341, which is bent in a way of describing an arc around a virtual axis parallel to the flow direction F of the cooling fluid, is formed in each of the wall-shaped projecting portions 234 and 234A. Each of the curved portions 341 is bulging in the same direction.

The respective wall-shaped projecting portions 233, 233A, 234 and 234A are so located that they are brought into contact with the side surfaces 3a and 3b of the neighboring battery cells, when the binding force in the layer direction X is applied to the battery pack by the binding device. Each of the wall-shaped projecting portions 233, 233A, 234 and 234A receives the action force from the neighboring battery cells 3 and 3A. The multiple wall-shaped projecting portions 233, 233A, 234 and 234A have the function of bringing out the strength for resisting the binding force applied to the respective battery cells 3 and 3A. In addition, the heat transfer areas of the battery cells 3 and 3A are increased by bringing the wall-shaped projecting portions into contact with the cooling fluid flowing through the fluid passages 10, so that the wall-shaped projecting portions function as heat transmitting paths for radiating the heat from the battery cells 3 and 3A to the cooling fluid.

Advantages of the battery pack 1A of the present embodiment will be explained. The multiple wall-shaped projecting portions 233, 233A, 234 and 234A provided on the battery cells 3 and 3A, which form the battery pack 1A, are brought into contact with the outer packaging members of the opposing battery cells 3 and 3A to form the fluid passages 10 between the side surfaces of the battery cells. According to such structure, since the multiple wall-shaped projecting portions 233, 233A, 234 and 234A projecting from the respective battery cells 3 and 3A are in contact with the outer packaging members of the battery cells 3 and 3A, it is possible to stably apply the binding force to the respective battery cells 3 and 3A, even in a case that the battery cells are built up in a condition that physical relationship of the opposing battery cells 3 and 3A is displaced or in a case that dimensional relationship of the respective portions of the battery cells 3 and 3A does not satisfy a predetermined relationship in the manufacturing process. As a result, the effect for surly binding the battery cells 3 and 3A can be obtained.

In addition, each of the curved portions 331 and 341, which are provided in the wall-shaped projecting portions 233, 233A, 234 and 234A for forming the fluid passages 10, is formed in a shape of bulging in the same direction in the spaces between the opposing side surfaces of the battery cells (in the space between the side surfaces 3a as well as in the space between the side surfaces 3b). According to the structure, each of the small passages 10a of the respective fluid passages 10 defined by the respective wall-shaped projecting portions 233, 233A, 234 and 234A has the same cross sectional shape. Accordingly, the small passages 10a having the uniform cross sectional area can be obtained to thereby suppress flow resistance for the cooling fluid. Therefore, it can be expected to further improve the cooling performance of the battery cells 3 and 3A.

As in the same manner to the sixteenth embodiment, the respective wall-shaped projecting portions 233, 233A, 234 and 234A of the present embodiment may be integrally formed with the outer packaging members of the battery cells 3 and 3A, or formed on a plate member separate from the battery cells. In a case that respective the wall-shaped projecting portions 233, 233A, 234 and 234A are integrally formed with the outer packaging members of the battery cells 3 and 3A, it is possible to reduce a number of parts and components as well as a manufacturing cost.

The outer packaging members of the battery cells 3 and 3A as well as multiple wall-shaped projecting portions 233, 233A, 234 and 234A are made of conducting material. At least either one of the contacting portions of the wall-shaped projecting portions being in contact with the neighboring battery cell or the contacting portions of the battery cells being in contact with the wall-shaped projecting portions of the neighboring battery cells is coated with insulating material. The coating of the insulating material at such contacting portions may be formed in the same manner to the sixteenth embodiment. According to such a structure, since the contacting portions of the neighboring battery cells 3 and 3A are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells.

Eighteenth Embodiment

Figure 34:
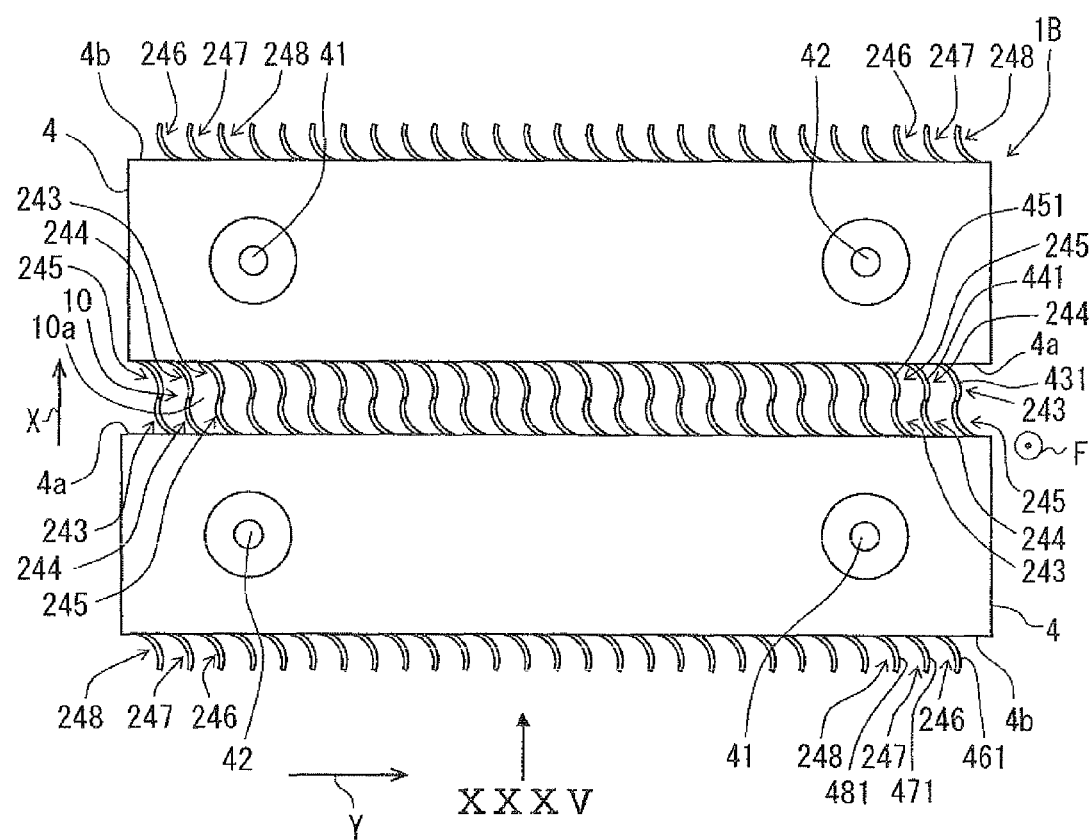
FIG. 34 is a schematic side view for explaining a layered structure of battery cells of the battery pack according to an eighteenth embodiment, when viewed the battery cells on a side from which terminals are outwardly projecting.
Figure 35:
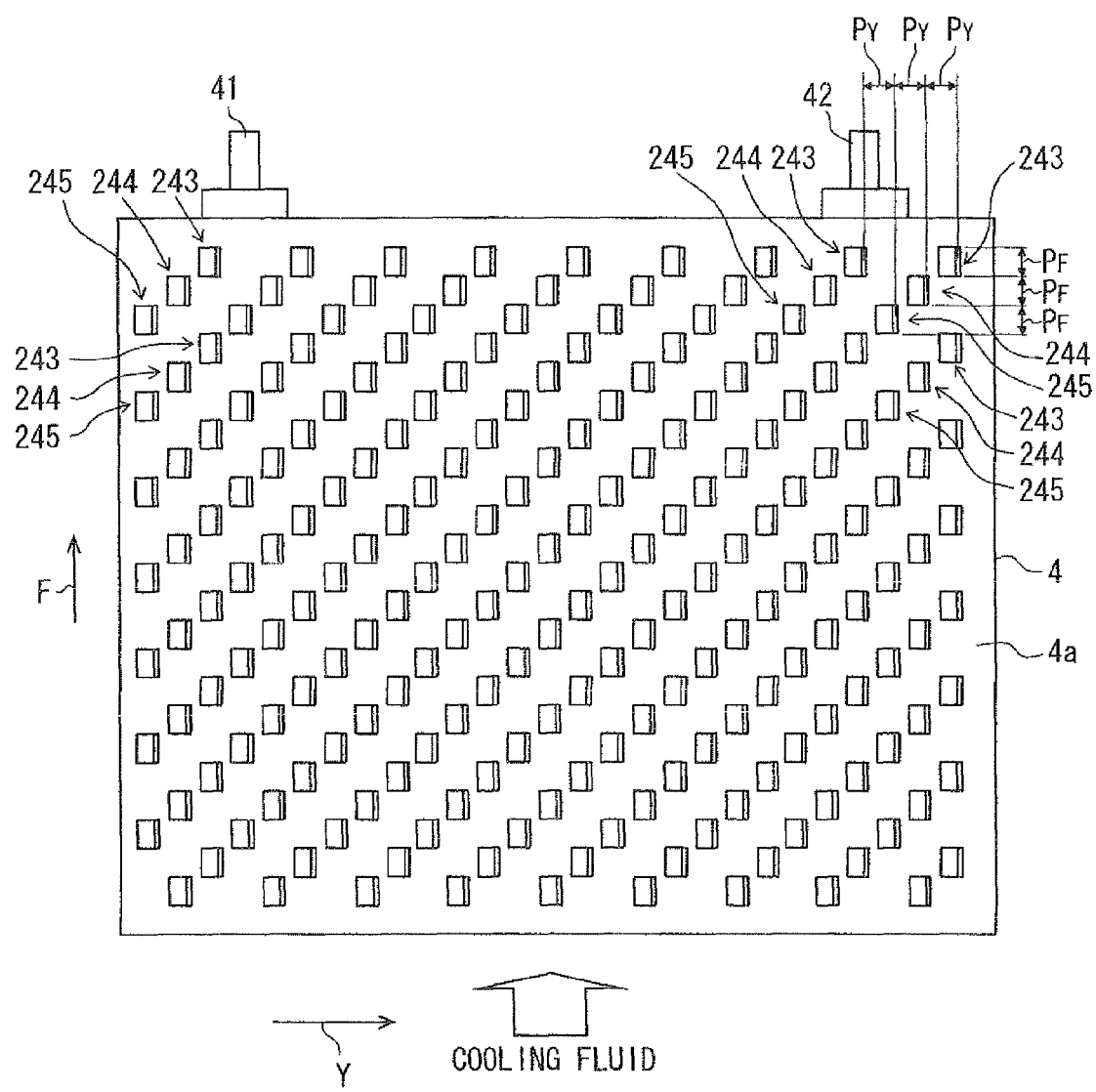
FIG. 35 is a schematic front view showing the battery cell when viewed in a direction of an arrow XXXV in FIG. 34.

A battery pack 1B using battery cells 4 of an eighteenth embodiment, which is a modification of the sixteenth embodiment, will be explained with reference to FIGS. 34 and 35. Such structures and functions different from the sixteenth embodiment will be hereinafter explained. FIG. 34 is a schematic side view of neighboring two battery cells 4, when viewed from a projecting side of electric terminals, for the purpose of explaining a layered structure of the battery cells 4 of the battery pack 1B according to the eighteenth embodiment. FIG. 35 is a schematic front view of the battery cell 4 when viewed in a direction of an arrow XXXV in FIG. 34.

As shown in FIG. 35, the battery cell 4 differs from the battery cell 2 shown in FIG. 31 in that the wall-shaped projecting portions 243, 244 and 245 are respectively arranged in the flow direction F of the cooling fluid, in such a way that respective multiple projecting portions are sprinkled in the flow direction F to form a line. More exactly, the multiple wall-shaped projecting portions 243, 244 and 245, which project from the side surface 4a of the battery cell, are arranged at predetermined intervals in the flow direction F. The predetermined interval corresponds to almost a double of a length (a dimension of $P_F$) of each wall-shaped projecting portion 243, 244 or 245 in the direction F. For example, according to the present embodiment shown in FIG. 35, the predetermined interval is set at the double of the length, namely $2P_F$.

In addition, the multiple wall-shaped projecting portions 243, 244 and 245 are also arranged at predetermined intervals (a dimension of $P_Y$) in the direction Y perpendicular to the flow direction F of the cooling fluid.

Each of the wall-shaped projecting portions 243 to 245, which are arranged in the direction Y perpendicular to the flow direction F to respectively form the multiple lines, is displaced in the flow direction from the wall-shaped projecting portions of the neighboring lines in the direction Y. The multiple lines are composed of the multiple wall-shaped projecting portions 243 (a first line) arranged in the flow direction F, the multiple wall-shaped projecting portions 244 (a second line) arranged in the flow direction F, and the multiple wall-shaped projecting portions 245 (a third line) arranged in the flow direction F.

The wall-shaped projecting portions 243, which form the line extending in the flow direction F, are such wall-shaped projecting portions closest to the electric terminals (the positive and negative electrodes 41 and 42) among the wall-shaped projecting portions 243 to 245 on the side surface 4a of the battery cell. The wall-shaped projecting portions 245 are such projecting portions which are farthest from the electric terminals. The wall-shaped projecting portions 244 are arranged between the wall-shaped projecting portions 243 and the wall-shaped projecting portion 245 in the flow direction F. When the battery pack 1B is formed by building up the multiple battery cells 4, only the wall-shaped projecting portions 244 are brought into contact with the wall-shaped projecting portions 244 projecting from the neighboring battery cell 4, to thereby form the multiple small passages 10a in the fluid passage 10 between the side surfaces 4a of the battery cells, wherein the small passages 10a are not closed in the direction Y.

The multiple wall-shaped projecting portions 246, 247 and 248, which project from the other side surface 4b of the battery cell, have the same or corresponding locations, structures, functions and advantages to the wall-shaped projecting portions 243, 244 and 245. Therefore, the wall-shaped projecting portions 246 forming lines in the flow direction F are such projecting portions closest to the electric terminals (the positive and negative electrodes 41 and 42) on the side surface 4b of the battery cell among the wall-shaped projecting portions 246 to 248, while the wall-shaped projecting portions 248 are located at positions farthest from the electric terminals. The wall-shaped projecting portions 247 are arranged between the wall-shaped projecting portions 246 and 248 in the flow direction F.

Accordingly, the wall-shaped projecting portions 244 as well as the wall-shaped projecting portions 247 are respectively located so that top portions of the respective projecting portions are brought into contact with each other, wherein the respective wall-shaped projecting portions 244 and 247 have function as the binding ribs for receiving the binding force applied to the battery cells 4. The respective wall-shaped projecting portions 243, 244 and 245 are arranged on the side surface 4a of the battery cell in an offset pattern, while the respective wall-shaped projecting portions 246, 247 and 248 are arranged on the side surface 4b of the battery cell in an offset pattern.

Advantages of the battery pack 1B of the present embodiment will be explained. The multiple wall-shaped projecting portions 243 to 245 and 246 to 248 are respectively arranged at predetermined intervals in the flow direction F of the cooling fluid and in the direction Y perpendicular to the flow direction F on the side surfaces 4a and 4b opposing to each other in the layer direction X. In addition, the wall-shaped projecting portions 243 to 245 and 246 to 248, which are located to form the multiple lines arranged in the direction Y, are displaced in the flow direction F of the cooling fluid between the neighboring lines in the direction Y.

According to the above structure, each line of the wall-shaped projecting portions 243, 244, 245, 246, 247 and 248 is displaced in the flow direction F of the cooling fluid between the neighboring lines in the direction Y. Such a passage area is formed at the downstream side of each wall-shaped projecting portion, at which no wall-shaped projecting portion is existing. As a result of forming the above passage areas at the downstream side of the respective wall-shaped projecting portions, it is possible to form meandering flow in the fluid passages 10 between the battery cells 4. It is thereby possible to suppress enlargement of the boundary layer of the cooling fluid flow at wall portions of the battery cells as well as at wall portions of the wall-shaped projecting portions, or it is possible to make thinner the boundary layer of the cooling fluid flow. It is furthermore possible to improve heat transfer performance at the downstream sides of the respective wall-shaped projecting portions. As a result, the cooling performance of the battery cells 4 can be increased.

Each of the wall-shaped projecting portions 243 to 248 is arranged in the flow direction F at the interval almost equal to the double of the length of the wall-shaped projecting portion. According to the above structure, since the wall-shaped projecting portions 243 to 248 are sprinkled in the direction F at the substantial intervals, such areas at which no wall-shaped projecting portions are formed can be sufficiently obtained at the downstream sides of the respective wall-shaped projecting portions 243 to 248. Therefore, the advantages for suppressing the enlargement of the boundary layer of the cooling fluid flow (or making thinner the boundary layer of the cooling fluid flow) and the advantages for improving the heat transfer performance at the downstream sides of the respective wall-shaped projecting portions can be expected.

The wall-shaped projecting portions 243 to 245 and 246 to 248 also function as heat radiating fins. Therefore, when the thickness of the respective wall-shaped projecting portions is made as thinner as possible, the cross sectional area of the fluid passages 10 can be enlarged. In addition, heat radiating amount of each wall-shaped projecting portion 243 to 245 and 246 to 248 is increased to thereby improve the cooling performance.

As in the same manner to the sixteenth embodiment, the respective wall-shaped projecting portions 243 to 245 and 246 to 248 may be integrally formed with the outer packaging members of the battery cells 4, or formed on a plate member separate from the battery cells. In a case that respective the wall-shaped projecting portions 243 to 245 and 246 to 248 are integrally formed with the outer packaging members of the battery cells 4, it is possible to reduce a number of parts and components as well as a manufacturing cost.

In a case that the outer packaging members of the battery cells 4 as well as the wall-shaped projecting portions 243 to 245 and 246 to 248 are made of conducting material, a contacting portion of at least one of the wall-shaped projecting portions 244 which are in contact with each other as well as a contacting portion of at least one of the wall-shaped projecting portions 247 which are in contact with each other may be preferably coated with insulating material. The coating of the insulating material at such contacting portion may be formed by vapor deposition, coating, integral molding, and so on. According to such a structure, since the contacting portions of the neighboring battery cells 4 are in contact with each other via the coating of the insulating material, it is possible to assure the electrical insulation between the battery cells and thereby to assure the exhibition of the battery performance as well as the electrical safety. It is also possible to suppress corrosion of such portions made of the conducting material due to electric potential difference between the neighboring battery cells 4.

What is claimed is:
1. A battery pack comprising:
multiple battery cells built-up in a layer direction and held as one unit by a binding force in the layer direction;
fluid passages respectively formed between neighboring battery cells, so that cooling fluid flows through the fluid passages to cool-down the respective battery cells;
multiple wall-shaped projecting portions provided on a side surface of the battery cell perpendicular to the layer direction, each of which extends in a flow direction of the cooling fluid, the multiple wall-shaped projecting portions being arranged in a direction perpendicular to the flow direction so as to form the fluid passages respectively between the neighboring battery cells; and
multiple enlarged projecting portions provided at intermediate portions of each wall-shaped projecting portion extending in the flow direction, so that the enlarged projecting portions and the wall-shaped projecting portions are alternately arranged in the flow direction, the enlarged projecting portions being in contact with the neighboring battery cell to receive action force from the neighboring battery cell,
wherein an outer dimension of the enlarged projecting portion in the direction in which multiple wall-shaped projecting portions are arranged is made larger than a thickness dimension of the wall-shaped projecting portion.

2. The battery pack according to the claim 1, wherein the enlarged projecting portions and the wall-shaped projecting portions are alternately located in the direction in which the multiple wall-shaped projecting portions are arranged.

3. The battery pack according to the claim 1, wherein the enlarged projecting portions or the wall-shaped projecting portions are provided on a separate member from the battery cell and the separate member is provided at the side surface of the battery cell perpendicular to the layer direction.

4. The battery pack according to the claim 1, wherein the enlarged projecting portions and the wall-shaped projecting portions are provided on a common member, which is provided at the side surface of the battery cell perpendicular to the layer direction.

5. The battery pack according to the claim 4, wherein the common member is a spacer interposed between the neighboring battery cells.

6. The battery pack according to the claim 1, wherein:
the enlarged projecting portions or the wall-shaped projecting portions and an outer packaging member of the battery cell are made of conducting material, and
a contacting portion of the enlarged projecting portion or the wall-shaped projecting portion1 which is in contact with the neighboring battery cell, or a contacting portion of the battery cell, which is in contact with the enlarged projecting portion or the wall-shaped projecting portion of the neighboring battery cell, is coated with insulating material.

7. The battery pack according to the claim 1, wherein the enlarged projecting portions and the wall-shaped projecting portions are integrally formed with an outer packaging member of the battery cell.

8. A battery pack comprising:
multiple battery cells built-up in a layer direction and held as one unit by a binding force in the layer direction;
fluid passages respectively formed between neighboring battery cells, so that cooling fluid flows through the fluid passages to cool-down the respective battery cells;
multiple wall-shaped projecting portions formed in the fluid passages and provided on a side surface of the battery cell perpendicular to the layer direction, each of which extends in a flow direction of the cooling fluid, the multiple wall-shaped projecting portions being arranged in a direction perpendicular to the flow direction so as to form the fluid passages respectively between the neighboring battery cells; and
multiple enlarged projecting portions formed in the fluid passages and provided on the side surface of the battery cell perpendicular to the layer direction, each of which extends in the flow direction of the cooling fluid, the enlarged projecting portions being arranged at predetermined intervals in the direction perpendicular to the flow direction, and the enlarged projecting portions being in contact with the neighboring battery cell to receive action force from the neighboring battery cell,
wherein a width dimension of each enlarged projecting portion in the direction in which the multiple wall-shaped projecting portions are arranged is made larger than a thickness dimension of the wall-shaped projecting portion, and
wherein multiple wall-shaped projecting portions are located in each space between the enlarged projecting portions, which are arranged at the predetermined intervals.

9. The battery pack according to the claim 8, wherein a number of the wall-shaped projecting portions at a downstream side of flow of the cooling fluid is larger than that at an upstream side of the flow of the cooling fluid, on the side surface of the battery cell perpendicular to the layer direction.

10. The battery pack according to the claim 8, wherein a number of the wall-shaped projecting portions at a center area in the direction in which the multiple wall-shaped projecting portions are arranged is larger than that at side areas of the same direction, on the side surface of the battery cell perpendicular to the layer direction.

11. The battery pack according to the claim 8, wherein a number of the wall-shaped projecting portions at side areas in the direction in which the multiple wall-shaped projecting portions are arranged is larger than that at a center area of the same direction, on the side surface of the battery cell perpendicular to the layer direction.

12. The battery pack according to the claim 8, wherein the enlarged projecting portions or the wall-shaped projecting portions are provided on a separate member from the battery cell and the separate member is provided at the side surface of the battery cell perpendicular to the layer direction.

13. The battery pack according to the claim 8, wherein the enlarged projecting portions and the wall-shaped projecting portions are provided on a common member, which is provided at the side surface of the battery cell perpendicular to the layer direction.

14. The battery pack according to the claim 13, wherein the common member is a spacer interposed between the neighboring battery cells.

15. The battery pack according to the claim 8, wherein:
the enlarged projecting portions or the wall-shaped projecting portions and an outer packaging member of the battery cell are made of conducting material, and
a contacting portion of the enlarged projecting portion or the wall-shaped projecting portion, which is in contact with the neighboring battery cell, or a contacting portion of the battery cell, which is in contact with the enlarged projecting portion or the wall-shaped projecting portion of the neighboring battery cell, is coated with insulating material.

16. The battery pack according to the claim 8, wherein the enlarged projecting portions and the wall-shaped projecting portions are integrally formed with an outer packaging member of the battery cell.

17. The battery pack according to the claim 1, wherein each of the wall-shaped projecting portions has a shape of diminution.

18. The battery pack according to the claim 1, wherein multiple wall-shaped projecting portions are formed on the side surface of the battery cell.

19. The battery pack according to the claim 8, wherein the multiple enlarged projecting portions are formed on the side surface of the battery cell.

20. The battery pack according to the claim 19, wherein multiple wall-shaped projecting portions are formed on the side surface of the battery cell.

* * * * *